United States Patent
Baek et al.

(10) Patent No.: US 10,575,041 B2
(45) Date of Patent: Feb. 25, 2020

(54) METHOD FOR CONTROLLING SOURCE DEVICE AT SINK DEVICE AND APPARATUS FOR THE SAME

(71) Applicant: LG ELECTRONICS INC., Seoul (KR)

(72) Inventors: Sanghyun Baek, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/675,628

(22) Filed: Aug. 11, 2017

(65) Prior Publication Data
US 2018/0070122 A1   Mar. 8, 2018

(30) Foreign Application Priority Data

Sep. 2, 2016   (KR) .................. 10-2016-0113175

(51) Int. Cl.
*H04N 21/41*   (2011.01)
*G09G 5/00*   (2006.01)
(Continued)

(52) U.S. Cl.
CPC ......... *H04N 21/4122* (2013.01); *G09G 5/003* (2013.01); *H04N 5/4403* (2013.01);
(Continued)

(58) Field of Classification Search
CPC ........... H04N 21/4122; H04N 21/4126; H04N 21/42224; H04N 21/4227;
(Continued)

(56) References Cited

U.S. PATENT DOCUMENTS

2006/0050090 A1*   3/2006   Ahmed ................. G09G 5/391
                                                   345/660
2008/0079754 A1*   4/2008   Kuroki ..................... H04N 5/45
                                                   345/660

(Continued)

FOREIGN PATENT DOCUMENTS

CN   105100907   11/2015
EP   2682859    1/2014

(Continued)

OTHER PUBLICATIONS

English Machine Translation of KR 2016 0025308 (Lee et al.) Mar. 8, 2016.*

(Continued)

*Primary Examiner* — John R Schnurr
(74) *Attorney, Agent, or Firm* — Lee, Hong, Degerman, Kang & Waimey PC

(57) ABSTRACT

A sink device includes: a network transceiver configured to communicate with a source device; a display; and a controller configured to: receive video content from the source device via the network transceiver, wherein a source display of the source device corresponds to original display coordinates; cause the display to display the video content, wherein the display corresponds to changed display coordinates; receive a control signal for selecting a first coordinate of the display; generate a second coordinate with respect to the original display coordinates, wherein the second coordinate corresponds to the first coordinate; and cause the network transceiver to transmit the second coordinate to the source device.

22 Claims, 42 Drawing Sheets

(51) Int. Cl.
*H04N 5/44* (2011.01)
*H04N 21/4363* (2011.01)

(52) U.S. Cl.
CPC ... *H04N 21/43637* (2013.01); *G09G 2370/16* (2013.01); *H04N 2005/443* (2013.01)

(58) Field of Classification Search
CPC ..... H04N 21/43637; H04N 21/440263; H04N 21/4438; H04N 5/4403; H04N 2005/443; G06F 3/1454; G06F 3/1462; G06F 13/14; G09G 5/003; G09G 2370/16
See application file for complete search history.

(56) References Cited

U.S. PATENT DOCUMENTS

| | | | | |
|---|---|---|---|---|
| 2013/0138728 A1* | 5/2013 | Kim | ........................ | G06F 15/16 709/203 |
| 2014/0009394 A1* | 1/2014 | Lee | ...................... | H04N 5/4403 345/157 |
| 2016/0253142 A1* | 9/2016 | Choi | ..................... | G06F 3/1423 345/1.3 |
| 2017/0155946 A1* | 6/2017 | Coenen | ............ | H04N 21/42224 |

FOREIGN PATENT DOCUMENTS

| | | |
|---|---|---|
| EP | 3062214 | 8/2016 |
| KR | 1020160025308 | 3/2016 |

OTHER PUBLICATIONS

European Patent Office Application Serial No. 17188822.5, Search Report dated Oct. 19, 2017, 13 pages.

"Using Lookup Tables to Perform Gamma Correction on LEDs", retrieved from Maxim Integrated Products, Inc., Application Note 3667, XP055414674, Nov. 2005, 4 pages.

* cited by examiner

FIG. 32
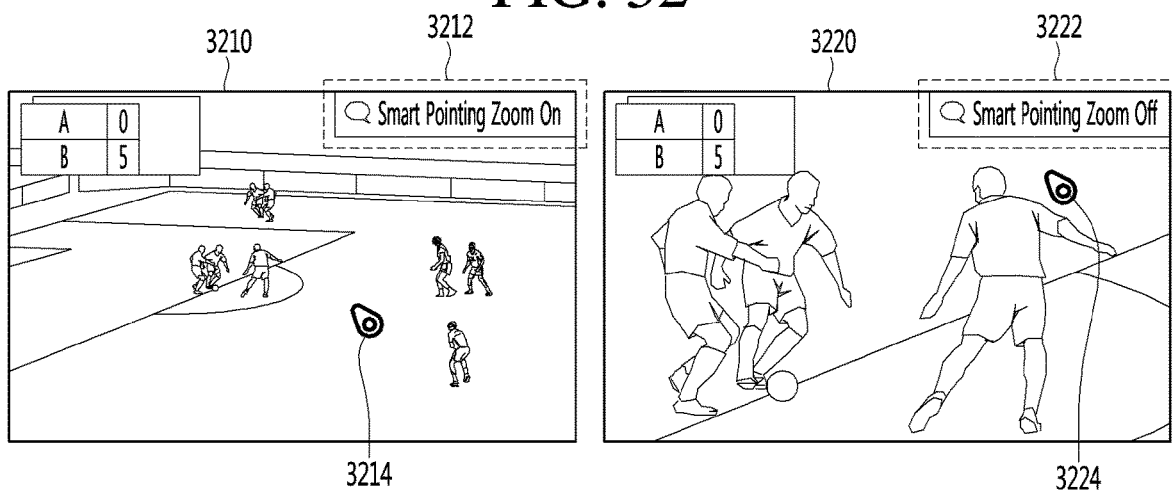
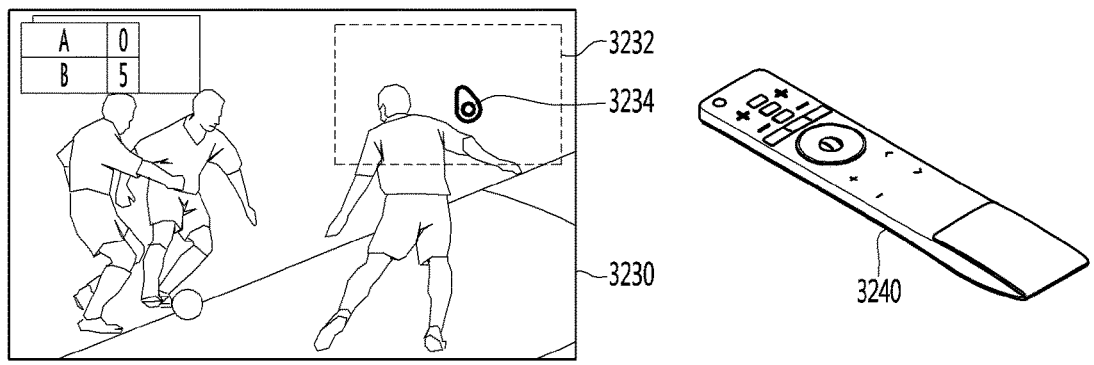

FIG. 33
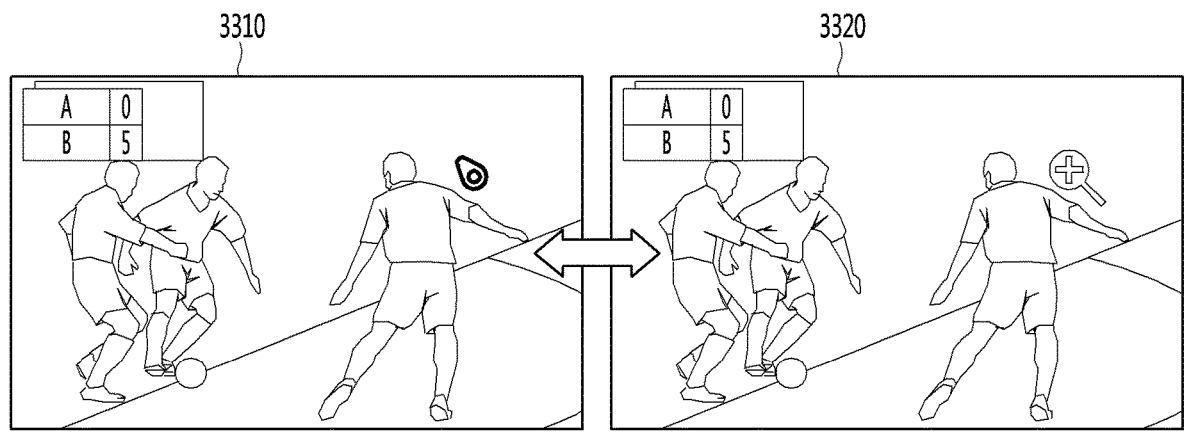
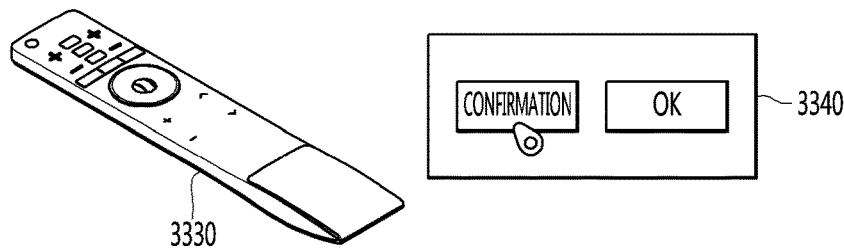

FIG. 36
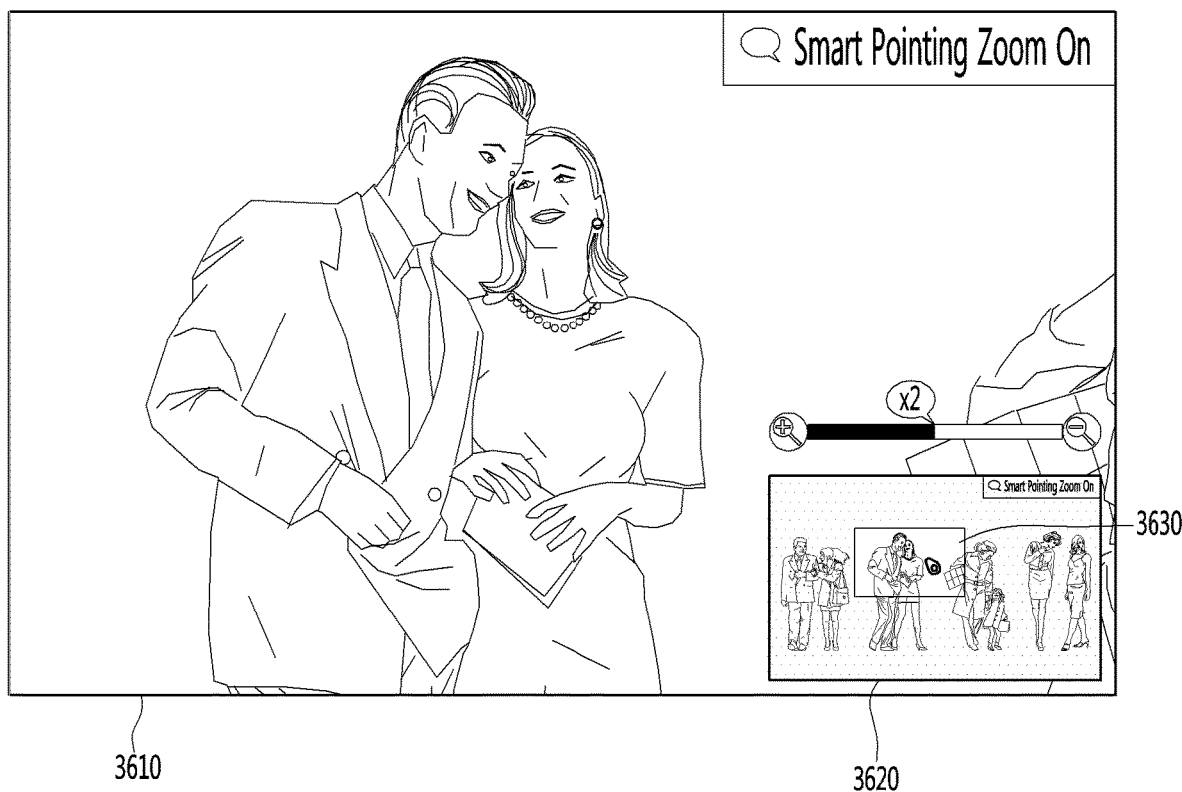
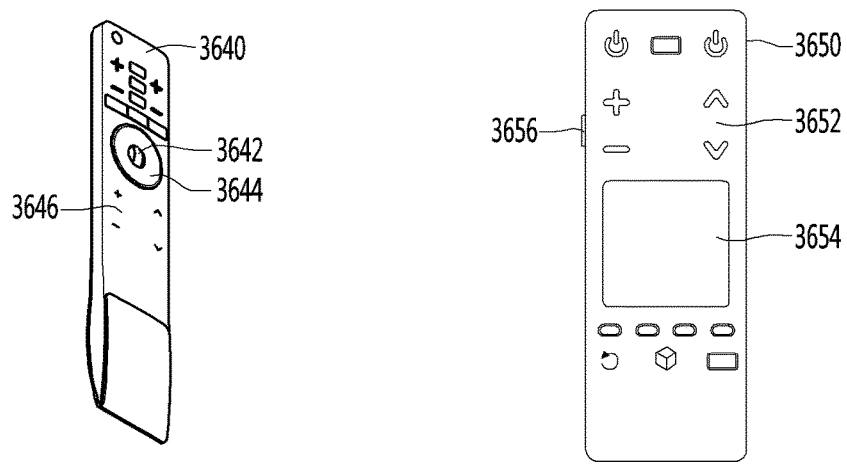

FIG. 44
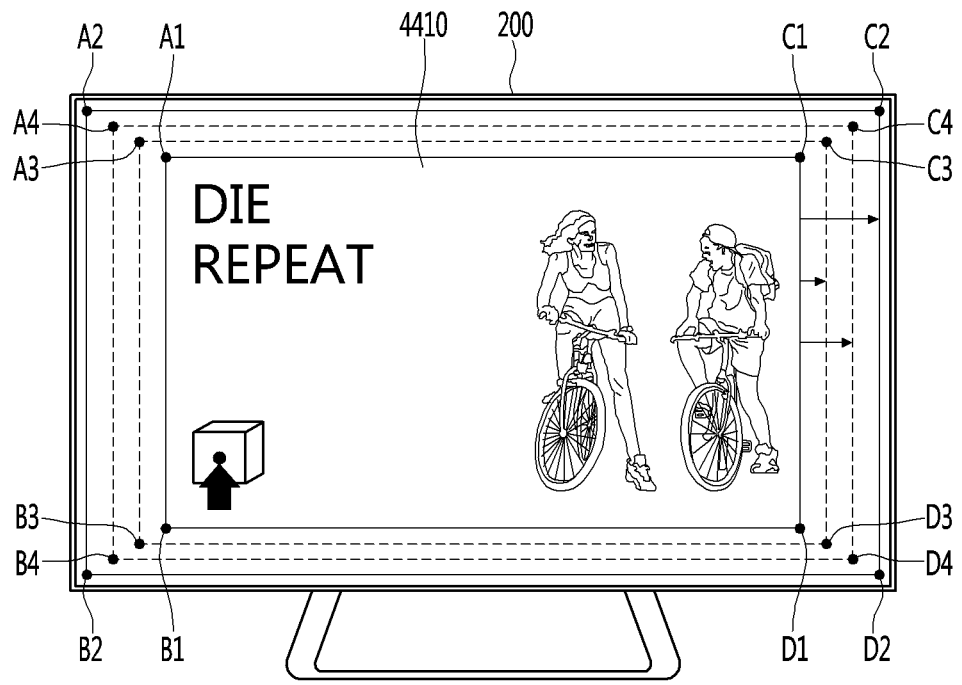
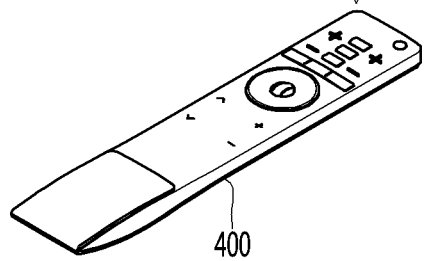
A3 (0, 0, 1280, 720)
B3 (0, 719, 1280, 720)
C3 (1279, 0, 1280, 720)
D3 (1279, 719, 1280, 720)
A4 (0, 0, 1600, 900)
B4 (0, 899, 1600, 900)
C4 (1599, 0, 1600, 900)
D4 (1599, 899, 1600, 900)

METHOD FOR CONTROLLING SOURCE DEVICE AT SINK DEVICE AND APPARATUS FOR THE SAME

CROSS-REFERENCE TO RELATED APPLICATIONS

Pursuant to 35 U.S.C. § 119, this application claims the benefit of earlier filing date and right of priority to Korean Patent Application No. 10-2016-0113175, filed on Sep. 2, 2016, which is hereby incorporated by reference in its entirety.

BACKGROUND

The present disclosure relates to a display device and an operating method thereof.

Recently, digital TV services using wired or wireless communication networks are more common. The digital TV services can provide various services which have not been provided in the existing analog broadcasting services.

For example, an Internet protocol television (IPTV) or smart TV service that is one type of the digital TV services is a bidirectional service which allows a user to actively select the kind, viewing time, or the like of a program to be watched. The IPTV or smart TV service can provide various additional services, e.g., Internet search, home shopping, on-line games, and the like, based on such bidirectional service capability.

Screen mirroring refers to a technique for mirroring a screen of a source device such as a mobile terminal on a screen of a sink device such as a TV as it is, using wireless communication. A picture, image, or the like, which a user enjoys through the mobile terminal having a small-sized display unit can be enjoyed as it is through the TV having a relatively large display unit, using the mirroring technique.

Typically, a screen of a source device could not be controlled at a sink device, and hence a command was input through only the source device. Recently, a method has been used in which a predetermined command for controlling a screen of the source device is transmitted from the sink device to the source device through a user input back channel (UIBC).

SUMMARY

Embodiments provide a sink device which enables a user to easily control a mobile terminal through a remote control device during Miracast connection between the mobile terminal and a display device.

Embodiments also provide a sink device which enables a user to accurately control a mobile terminal through a display device during Miracast connection between the mobile device and the display device, which have different coordinate tables and resolutions.

Embodiments also provide a sink device which enables user's control of a mobile terminal not to be influenced even when a screen mode of the mobile terminal is changed during Miracast connection.

In one embodiment, a sink device includes: a network transceiver configured to communicate with a source device; a display; and a controller configured to: receive video content from the source device via the network transceiver, wherein a source display of the source device corresponds to original display coordinates; cause the display to display the video content, wherein the display corresponds to changed display coordinates; receive a control signal for selecting a first coordinate of the display; generate a second coordinate with respect to the original display coordinates, wherein the second coordinate corresponds to the first coordinate; and cause the network transceiver to transmit the second coordinate to the source device.

A display resolution of the source device may be less than a display resolution of the display of the sink device, and the controller may be further configured to scale the received video content for full screen display on the display corresponding to the changed display coordinates.

The controller may be further configured to cause the display to display the received video content in an unscaled size before the video content is displayed full screen display on the display.

The controller may be further configured to cause the display to switch to full screen display of the video content from displaying the video content in the unscaled size in response to a resolution control input.

The second coordinate may be generated using scaling information of the received video content.

The controller may be further configured to identify an object of an image of the displayed video content, the object corresponding to the selected first coordinate.

The controller may be further configured to cause the network transceiver to transmit the second coordinate and the identified object to the source device when the identified object is a source device-based object.

The controller may be further configured to perform a control operation corresponding to the identified object when the identified object is a sink device-based object.

The control signal may be received from a remote control device associated with the sink device.

The control signal may be for selection of a third coordinate of a touch pad of the remote control device, wherein a position of the third coordinate of the touch pad corresponds to a position of the first coordinate of the display, and the second coordinate may be generated by converting the third coordinate to the first coordinate with respect to the changed coordinates and generating the second coordinate based on the first coordinate for transmitting to the source device.

The controller may be further configured to: receive, via the network transceiver, at least one original menu display coordinate from the source device for displaying a menu in response to the selection of the first coordinate of the displayed video content; generate at least one changed menu display coordinate with respect to the changed display coordinates, wherein the at least one changed menu display coordinate corresponds to the at least one original menu display coordinate; and cause the display to display a menu at the at least one changed menu display coordinate.

In another embodiment, a sink device includes: a network transceiver configured to communicate with a source device; a memory; a display; and a controller configured to: receive video content from the source device via the network transceiver; generate a first coordinate mapping table by mapping a coordinate table of the source device and a coordinate table of the sink device; store the first coordinate mapping table in the memory; cause the display to display the received video content; receive a control signal for selecting a first coordinate of the display; identify a second coordinate with respect to the original display coordinates using the first coordinate mapping table, wherein the second coordinate corresponds to the first coordinate; and cause the network transceiver to transmit the second coordinate to the source device.

A display resolution of the source device may be less than a display resolution of the display of the sink device, and the controller may be further configured to scale the received video content for full screen display on the display corresponding to the changed display coordinates.

The controller may be further configured to cause the display to display the received video content in an unscaled size before the video content is displayed full screen display on the display.

The controller may be further configured to cause the display to switch to full screen display of the video content from displaying the video content in the unscaled size in response to a resolution control input.

The controller may be further configured to identify an object of an image of the displayed video content, the object corresponding to the selected first coordinate.

The controller may be further configured to cause the network transceiver to transmit the second coordinate and the identified object to the source device when the identified object is a source device-based object.

The controller may be further configured to perform a control operation corresponding to the identified object when the identified object is a sink device-based object.

The control signal may be received from a remote control device associated with the sink device.

The control signal may be for selection of a third coordinate of a touch pad of the remote control device, wherein a position of the third coordinate of the touch pad corresponds to a position of the first coordinate of the display, and the controller may be further configured to: receive a touch pad coordinate table of the remote control device; generate a second coordinate mapping table by mapping the touch pad coordinate table and the coordinate table of the sink device; and identify the first coordinate as a selection based on the second coordinate mapping table.

The controller may be further configured to: receive, via the network transceiver, at least one original menu display coordinate from the source device for displaying a menu in response to the selection of the first coordinate of the displayed video content; identify at least one changed menu display coordinate with respect to the changed display coordinates using the first coordinate mapping table, wherein the at least one changed menu display coordinate corresponds to the at least one original menu display coordinate; and cause the display to display a menu at the at least one changed menu display coordinate.

The controller is further configured to: receive orientation change information from the source device via the network transceiver when a display orientation of the video content at the source device is changed; and update the stored first coordinate mapping table using the received orientation change information.

The present disclosure has advantages as follows.

According to the present disclosure, a user can easily control the mobile terminal during Miracast connection between the mobile terminal and the display device using a UIBC technique.

According to the present disclosure, a coordinate conversion process is performed in the display device or the mobile terminal, so that the user can accurately control the mobile terminal through the display device during the Miracast connection between the mobile terminal and the display device, which have different coordinate tables and resolutions.

According to the present disclosure, when a screen mode of the mobile terminal is changed by the user during the Miracast connection, a coordinate table and a coordinate conversion algorithm are newly set, so that user's control of the mobile terminal is not influenced.

According to the present disclosure, when the size of a video content displayed in the display device is changed during mirroring, coordinates selected with respect to the size-changed video content are changed to those of the video content having the original size, and the changed coordinates are transmitted to the mobile terminal, so that user's control of the mobile terminal is not influenced.

The details of one or more embodiments are set forth in the accompanying drawings and the description below. Other features will be apparent from the description and drawings, and from the claims.

BRIEF DESCRIPTION OF THE DRAWINGS

FIG. 32 is a view illustrating a case where the display device activates the specific area enlargement mode according to an embodiment.

FIG. 33 is a view illustrating a state in which a pointer shape is changed when the display device activates the specific area enlargement mode according to an embodiment.

FIG. 36 is a view illustrating a state in which a screen is controlled using a remote control device when the display device activates the specific area enlargement mode according to an embodiment.

FIGS. 42 to 44 are exemplary views illustrating a control method of the display device according to the embodiment of FIG. 41.

DETAILED DESCRIPTION OF THE EMBODIMENTS

Figure 1:
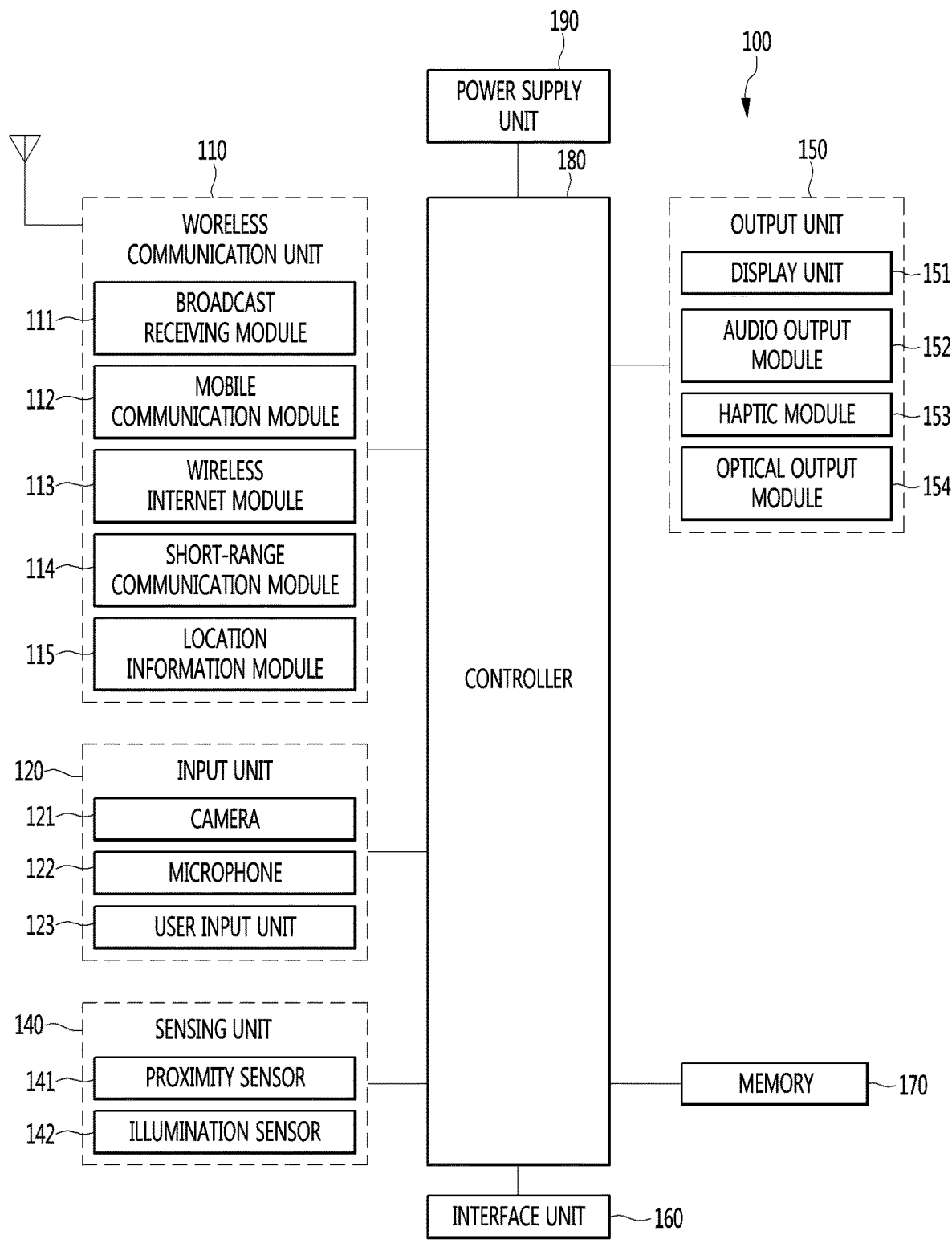
FIG. 1 is a block diagram of a mobile terminal in accordance with the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

The suffix "module" and "unit" for components, which are used in the description below, are assigned and mixed in consideration of only the easiness in writing the specification. That is, the suffix itself does not have different meanings or roles.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

In the entire specification, when an element is referred to as being "connected" or "coupled" to another element, it can be directly connected or coupled to the another element or be indirectly connected or coupled to the another element with one or more intervening elements interposed therebetween.

Singular forms in the present disclosure are intended to include the plural forms as well, unless the context clearly indicates otherwise.

It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

A display device according to an embodiment, for example, as an intelligent display device having both of the broadcast reception function and the computer assisted function, may include more convenient user-friendly interface than a handwriting input device, a touch screen or space remote controller, and the like, by adding an Internet function while fulfilling a broadcasting receiving function. In addition, the display device may also perform on E-mail, a web browsing, Internet banking or games, and the like by connecting to an Internet and computer supporting a wired or wireless internet function. In order to perform various functions described above, a general purpose operation system (OS) may be used.

Therefore, in the display device described in the present disclosure, since various applications may be freely added or deleted on a general OS Kernel, various user-friendly functions may be performed. More specifically, the display device may be, for example, a network TV, a HBBTV, a smart TV, an LED TV, an OLED TV, and the like, and may be applied in a smart phone in some cases.

Mobile terminals described in this specification may include a mobile phone, a smart phone, a laptop computer, a terminal for digital broadcast, a personal digital assistant (PDA), a portable multimedia player (PMP), a navigator, a slate PC, a tablet PC, an ultrabook, a wearable device (e.g., a watch type terminal (smart watch), a glass type terminal (smart glass), a head mounted display (HMD)), and the like.

However, it will be readily understood by those skilled in the art that the configuration according to the embodiments of this specification can also be applied to stationary terminals such as a digital TV, a desktop computer, and a digital signage, excluding a case of being applicable only to the mobile terminals.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast- Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Figure 2:
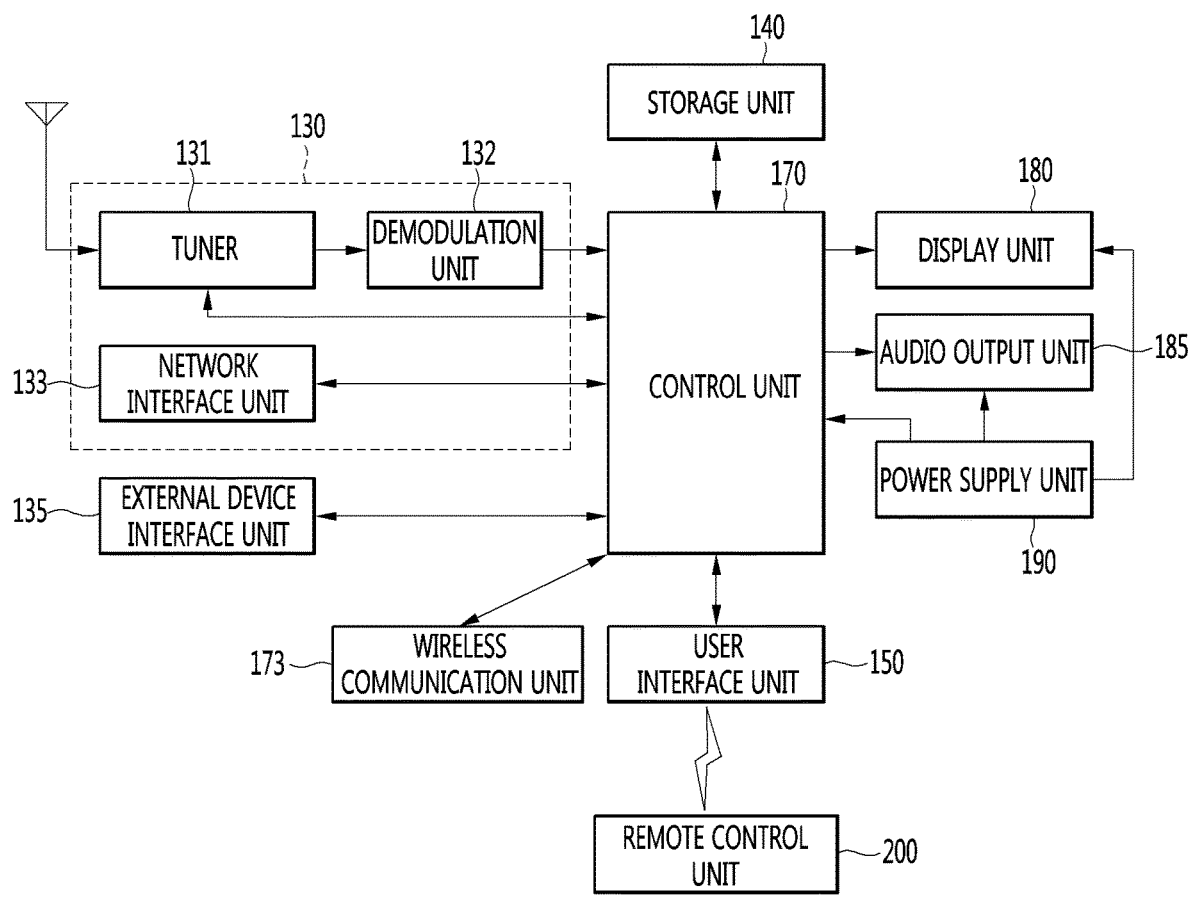
FIG. 2 is a block diagram illustrating a configuration of a display device according to an embodiment.

FIG. 2 is a block diagram illustrating a configuration of a display device according to an embodiment.

Referring to FIG. 2, a display device 200 can include a broadcast reception unit 230, an external device interface unit 235, a storage unit 240, a user input interface unit 250, a control unit 270, a wireless communication unit 273, a display unit 280, an audio output unit 285, and a power supply unit 290.

The broadcast reception unit 230 can include a tuner 231, a demodulation unit 232, and a network interface unit 233.

The tuner 231 can select a specific broadcast channel according to a channel selection command. The tuner 231 can receive broadcast signals for the selected specific broadcast channel.

The demodulation unit 232 can divide the received broadcast signals into video signals, audio signals, and broadcast program related data signals and restore the divided video signals, audio signals, and data signals to an output available form.

The external device interface unit 235 can receive an application or an application list in an adjacent external device and deliver it to the control unit 270 or the storage unit 240.

The external device interface 235 can provide a connection path between the display device 200 and an external device. The external device interface 235 can receive at least one of image and audio output from an external device that is wirelessly or wiredly connected to the display device 200 and deliver it to the control unit. The external device interface unit 235 can include a plurality of external input terminals. The plurality of external input terminals can include an RGB terminal, at least one High Definition Multimedia Interface (HDMI) terminal, and a component terminal.

An image signal of an external device inputted through the external device interface unit 235 can be output through the display unit 280. A sound signal of an external device inputted through the external device interface unit 235 can be output through the audio output unit 285.

An external device connectable to the external device interface unit 230 can be one of a set-top box, a Blu-ray player, a DVD player, a game console, a sound bar, a smartphone, a PC, a USB Memory, and a home theater system but this is just exemplary.

The network interface unit 233 can provide an interface for connecting the display device 200 to a wired/wireless network including internet network. The network interface unit 233 can transmit or receive data to or from another user or another electronic device through an accessed network or another network linked to the accessed network.

Additionally, some content data stored in the display device 200 can be transmitted to a user or an electronic device, which is selected from other users or other electronic devices pre-registered in the display device 200.

The network interface unit 233 can access a predetermined webpage through an accessed network or another network linked to the accessed network. That is, it can transmit or receive data to or from a corresponding server by accessing a predetermined webpage through network.

Then, the network interface unit 233 can receive contents or data provided from a content provider or a network operator. That is, the network interface unit 233 can receive contents such as movies, advertisements, games, VODs, and broadcast signals, which are provided from a content provider or a network provider, through network and information relating thereto.

Additionally, the network interface unit 233 can receive firmware update information and update files provided from a network operator and transmit data to an internet or content provider or a network operator.

The network interface unit 233 can select and receive a desired application among applications open to the air, through network.

The storage unit 240 can store signal-processed image, voice, or data signals stored by a program in order for each signal processing and control in the control unit 270.

Additionally, the storage unit 240 can perform a function for temporarily store image, voice, or data signals output from the external device interface unit 235 or the network interface unit 233 and can store information on a predetermined image through a channel memory function.

The storage unit 240 can store an application or an application list inputted from the external device interface unit 135 or the network interface unit 233.

The display device 200 can play content files (for example, video files, still image files, music files, document files, application files, and so on) stored in the storage unit 240 and provide them to a user.

The user input interface unit 250 can deliver signals inputted from a user to the control unit 270 or deliver signals from the control unit 270 to a user. For example, the user input interface unit 250 can receive or process control signals such as power on/off, channel selection, and screen setting from the remote control device 400 or transmit control signals from the control unit 270 to the remote control device 200 according to various communication methods such as Bluetooth, Ultra Wideband (WB), ZigBee, Radio Frequency (RF), and IR.

Additionally, the user input interface unit 250 can deliver, to the control unit 270, control signals inputted from local keys (not shown) such as a power key, a channel key, a volume key, and a setting key.

Image signals that are image-processed in the control unit 270 can be inputted to the display unit 280 and displayed as an image corresponding to corresponding image signals. Additionally, image signals that are image-processed in the control unit 270 can be inputted to an external output device through the external device interface unit 235.

Voice signals processed in the control unit 270 can be output to the audio output unit 285. Additionally, voice signals processed in the control unit 270 can be inputted to an external output device through the external device interface unit 235.

Besides that, the control module 270 can control overall operations in the display device 200.

Additionally, the control unit 270 can control the display device 200 by a user command or internal program inputted through the user input interface unit 250 and download a desired application or application list into the display device 200 in access to network.

The control unit 270 can output channel information selected by a user together with processed image or voice signals through the display unit 280 or the audio output unit 285.

Additionally, according to an external device image playback command received through the user input interface unit 250, the control unit 270 can output image signals or voice signals of an external device such as a camera or a camcorder, which are inputted through the external device interface unit 235, through the display unit 280 or the audio output unit 285.

Moreover, the control unit 270 can control the display unit 280 to display images and control broadcast images inputted through the tuner 231, external input images inputted through the external device interface unit 235, images inputted through the network interface unit, or images stored in the storage unit 240 to be displayed on the display unit 280. In this case, an image displayed on the display unit 280 can be a still image or video and also can be a 2D image or a 3D image.

Additionally, the control unit 270 can play content stored in the display device 200, received broadcast content, and external input content inputted from the outside, and the content can be in various formats such as broadcast images, external input images, audio files, still images, accessed web screens, and document files.

Moreover, the wireless communication unit 273 can perform a wired or wireless communication with an external electronic device. The wireless communication unit 273 can perform short-range communication with an external device. For this, the wireless communication unit 273 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 273 can support wireless communication between the display device 200 and a wireless communication system, between the display device 200 and another display device 200, or between networks including the display device 200 and another display device 200 (or an external server) through wireless area networks. The wireless area networks can be wireless personal area networks.

Herein, the other display device 200 can be a mobile terminal such as a wearable device (for example, a smart watch, a smart glass, and a head mounted display (HMD)) or a smartphone, which is capable of exchanging data (or inter-working) with the display device 200. The wireless communication unit 273 can detect (or recognize) a communicable wearable device around the display device 200. Furthermore, if the detected wearable device is a device authenticated to communicate with the display device 200, the control unit 270 can transmit at least part of data processed in the display device 200 to the wearable device through the wireless communication unit 273. Accordingly, a user of the wearable device can use the data processed in the display device 200 through the wearable device.

The wireless communication unit 273 can be provided separated from the external device interface unit 235 and can be included in the external device interface unit 235.

The display unit 280 can convert image signals, data signals, or OSD signals, which are processed in the control unit 270, or images signals or data signals, which are received in the external device interface unit 235, into R, G, and B signals to generate driving signals.

Furthermore, the display device 200 shown in FIG. 2 is just one embodiment and thus, some of the components shown can be integrated, added, or omitted according to the specification of the actually implemented display device 200.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment, unlike FIG. 2, the display device 200 can receive images through the network interface unit 233 or the external device interface unit 235 and play them without including the tuner 231 and the demodulation unit 232.

For example, the display device 200 can be divided into an image processing device such as a set-top box for receiving broadcast signals or contents according to various network services and a content playback device for playing contents inputted from the image processing device.

In this case, an operating method of a display device according to an embodiment described below can be performed by one of the display device described with reference to FIG. 2, an image processing device such as the separated set-top box, and a content playback device including the display unit 280 and the audio output unit 285.

Figure 3:
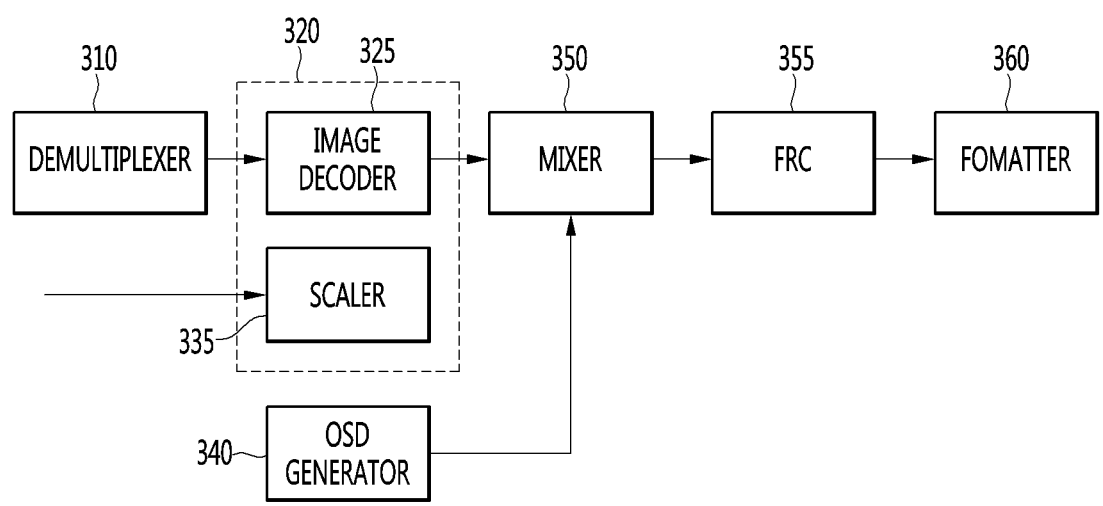
FIG. 3 is a block diagram illustrating a detailed configuration of a control unit of FIG. 2 according to an embodiment.

FIG. 3 is a block diagram illustrating a detailed configuration of a control unit of FIG. 2 according to an embodiment.

An example of the control unit 270 may include a demultiplexer 310, an image processor 320, an OSD generator 340, a mixer 350, a frame rate converter 355, and a formatter 360. In addition, the control unit may further include a voice processor (not shown) and a data processor (not shown).

The demultiplexer 310 demultiplexes a stream signal input thereto. For example, the demultiplexer 310 may demultiplex the input stream signal into MPEG-2 TS, voice, and data signals. Here, the stream signal input to the demultiplexer 310 may be a stream signal output from a tuner, a demodulator, or a external device interface unit.

The image processor performs image processing of a multiplexed image signal. To this end, the image processor 320 may include an image decoder 325 and a scaler 335.

The image decoder 325 decodes a demultiplxed image signal, and the scaler 335 scales a resolution of the decoded image signal to be capable of being output on the display unit.

The image decoder 325 may support various standards. For example, when an image signal is encoded in an MPEG-2 standard, the image decoder 325 may perform a function of an MPEG-2 decoder. When an image signal is encoded in a digital multimedia broadcasting (DMB) scheme or H.264 standard, the image decoder 325 may perform a function of an H.264 decoder.

Meanwhile, the image signal decoded by the image processor 320 is input to the mixer 350.

The OSD generator 340 generates OSD data based on a user input or autonomously. For example, the OSD generator 340 generates data for displaying various types of data in a graphic or text form on a screen of the display unit 280, based on a control signal of the user input interface unit. The generated OSD data includes various data including user interface screens, various menu screens, widgets, icons, viewing rate information, and the like of a digital device. The OSD generator 340 may generate data for displaying broadcast information based on subtitles or EPG of a broadcast image.

The mixer 350 mixes the OSD data generated by the OSD generator 340 and the image signal image-processed by the image processor 320 and provides them to the formatter 360. As the decoded image signal and the OSD data are mixed, OSD is displayed to be overlaid on a broadcast image or external input image.

The FRC 355 converts a frame rate of an image input thereto. For example, the FRC 355 may convert a frame rate of a 60 Hz image into a frame rate of 120 Hz or 240 Hz according to the output frequency of the display unit. As described above, a method for converting a frame rate may vary. As an example, when a frame rate is converted from 60 Hz to 120 Hz, the FRC 355 may convert the frame rate by inserting a first frame between the first frame and a second frame or inserting a third frame predicted from the first frame and the second frame. As another example, when a frame rate is converted from 60 Hz to 240 Hz, the FRC 355 may convert the frame rate by further inserting three same frames or three predicted frames. Meanwhile, when a separate frame conversion is not performed, the FRC 355 may be bypassed.

The formatter 360 changes an output of the FRC 355 to be suitable for an output format of the display unit. For example, the formatter 360 may output an R, G, and B data signal. The R, G, and B data signal may be output as a low voltage differential signal (LVDS) or mini-LVDS. When the output of the FRC 355 is a 3D image signal, the formatter 360 may change and output the output of the FRC 355 in a 3D form to be suitable for the output format of the display unit, so that a 3D service can be supported through the display unit.

Meanwhile, the voice processor (not shown) in the control unit may perform voice processing of a demultiplexed voice signal. The voice processor (not shown) may be supported to process various audio formats. As an example, even when a voice signal is encoded in a format such as MPEG-2, MPEG-4, AAC, HE-AAC, AC-3, or BSAC, the voice signal may be processed by providing a decoder corresponding to the format.

In addition, the voice processor (not shown) in the control unit may process a base, a treble, volume control, and the like.

The data processor (not shown) in the control unit may perform data processing of a demultiplexed data signal. For example, even when the demultiplexed data signal is encoded, the data processor may decode the encoded data signal. Here, the encoded data signal may be EPG information including broadcast information on a start time, an end time, and the like of a broadcast program broadcasted in each channel.

Meanwhile, the above-described digital device is an exemplary embodiment according to the present disclosure, and each component of the digital device may be integrated, added, or omitted according to specifications of an actually implemented digital device. That is, if necessary, two or more components may be integrated as one component, or one component may be segmentalized into two or more components. In addition, a function performed in each block is for the purpose of describing embodiments of the present disclosure, and its detailed operation or device does not limit the scope of the present disclosure.

Meanwhile, the digital device may be an image signal processing device that performs signal processing of an image stored in the device or an image input to the device. Other examples of the image signal processing device may further include a set-top box (STB), a DVD player, a blue-ray player, a game device, a computer, and the like, except the display unit 280 and the audio output unit 285, shown in FIG. 2.

According an embodiment, the display device 200 operating as a sink device may include a voice signal receiving unit (not shown). The voice signal receiving unit of the display device 200 receives a voice signal. The voice signal receiving unit may include a microphone to directly receive an external voice signal and convert the received voice signal into an electrical voice signal. The voice signal receiving unit may receive an electrical voice signal from an external device. In the latter, the voice signal receiving unit may be implemented as at least one of the network interface unit 233, the external device interface unit 235, and the user interface unit 250.

Meanwhile, according to an embodiment, the storage unit 240 may store a text conversion algorithm that converts a received voice signal into a text. The control unit 270 may convert the received voice signal into a text using the text conversion algorithm stored in the storage unit 240.

In addition, according to an embodiment, the storage unit 240 may store an algorithm for recognizing texts displayed on a screen of the display unit 280 and recognizing objects in an image.

Figure 4:
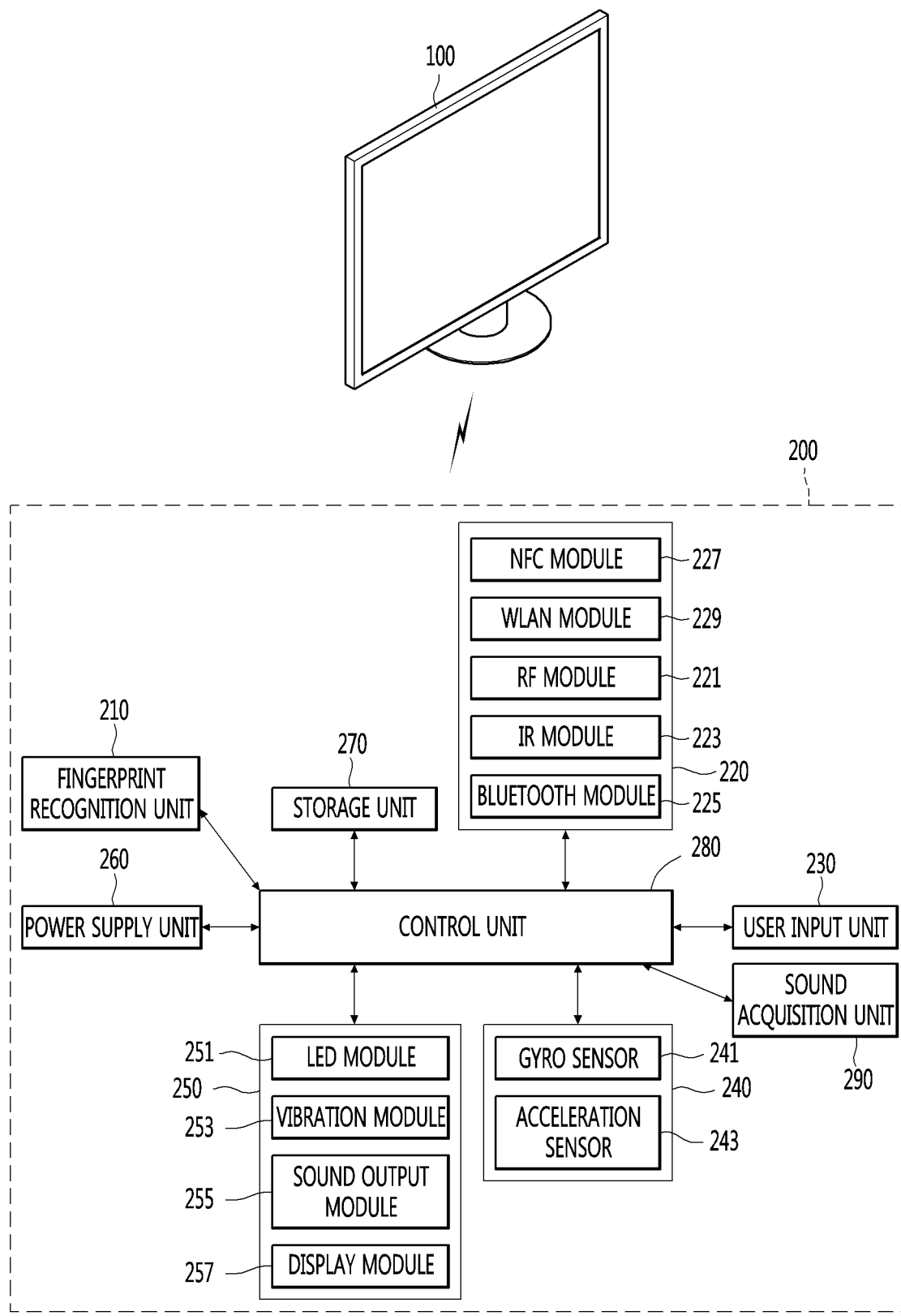
FIG. 4 is a block diagram illustrating a remote control device according to an embodiment.
Figure 5:
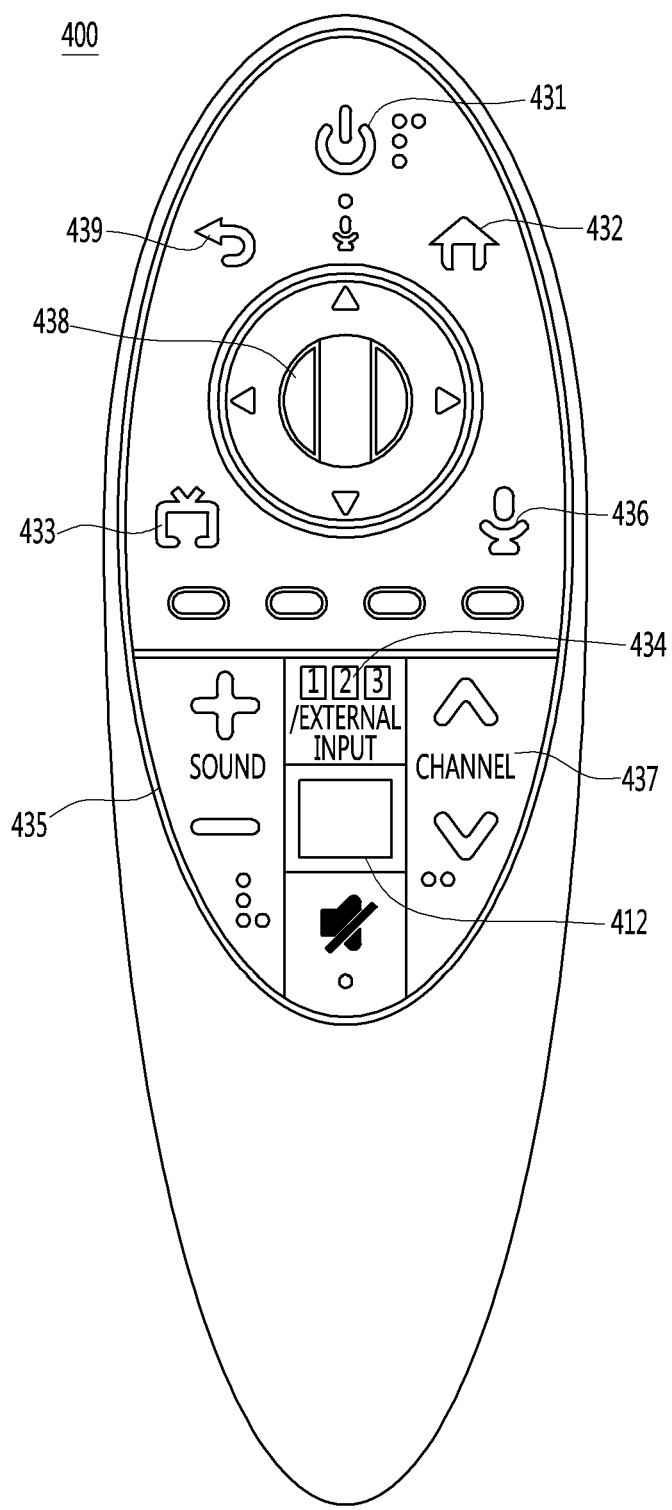
FIG. 5 is a view illustrating an actual configuration of a remote control device according to an embodiment.

Then, referring to FIGS. 4 and 5, a remote control device is described according to an embodiment.

FIG. 4 is a block diagram illustrating a remote control device according to an embodiment and FIG. 5 is a view illustrating an actual configuration of a remote control device according to an embodiment.

First, referring to FIG. 4, a remote control device 400 can include a fingerprint recognition unit 410, a wireless communication unit 420, a user input unit 430, a sensor unit 440, an output unit 450, a power supply unit 460, a storage unit 470, a control unit 480, and a voice acquisition unit 490.

Referring to FIG. 4, the wireless communication unit 425 transmits/receives signals to/from an arbitrary any one of display devices according to the above-mentioned embodiments.

The remote control device 400 can include an RF module 421 for transmitting/receiving signals to/from the display device 200 according to the RF communication standards and an IR module 423 for transmitting/receiving signals to/from the display device 200 according to the IR communication standards. Additionally, the remote control device 400 can include a Bluetooth module 425 for transmitting/receiving signals to/from the display device 200 according to the Bluetooth communication standards. Additionally, the remote control device 400 can include an NFC module 427 for transmitting/receiving signals to/from the display device 200 according to the Near Field Communication (NFC) communication standards and a WLAN module 429 for transmitting/receiving signals to/from the display device 200 according to the Wireless LAN (WLAN) communication standards Additionally, the remote control device 400 can transmit signals containing information on a movement of the remote control device 400 to the display device 200 through the wireless communication unit 420.

Moreover, the remote control device 400 can receive signals transmitted from the display device 200 through the RF module 421 and if necessary, can transmit a command on power on/off, channel change, and volume change to the display device 200 through the IR module 423.

The user input unit 430 can be configured with a keypad button, a touch pad, or a touch screen. A user can manipulate the user input unit 430 to input a command relating to the display device 200 to the remote control device 400. If the user input unit 430 includes a hard key button, a user can input a command relating to the display device 200 to the remote control device 400 through the push operation of the hard key button. This will be described with reference to FIG. 5.

Referring to FIG. 5, the remote control device 400 can include a plurality of buttons. The plurality of buttons can include a fingerprint recognition button 412, a power button 431, a home button 432, a live button 433, an external input button 434, a voice adjustment button 435, a voice recognition button 436, a channel change button 437, a check button 438, and a back button 439.

The fingerprint recognition button 412 can be a button for recognizing a user's fingerprint. According to an embodiment, the fingerprint recognition button 412 can perform a push operation and receive a push operation and a fingerprint recognition operation. The power button 431 can be button for turning on/off the power of the display device 200. The power button 432 can be button for moving to the home screen of the display device 200. The live button 433 can be a button for displaying live broadcast programs. The external input button 434 can be button for receiving an external input connected to the display device 200. The voice adjustment button 435 can be button for adjusting the size of a volume output from the display device 200. The voice recognition button 436 can be a button for receiving user's voice and recognizing the received voice. The channel change button 437 can be a button for receiving broadcast signals of a specific broadcast channel. The check button 438 can be a button for selecting a specific function and the back button 439 can be a button for returning to a previous screen.

Again, FIG. 4 is described.

If the user input unit 430 includes a touch screen, a user can touch a soft key of the touch screen to input a command relating to the display device 200 to the remote control device 400. Additionally, the user input unit 430 can include various kinds of input means manipulated by a user, for example, a scroll key and a jog key, and this embodiment does not limit the scope of the present disclosure.

The sensor unit 440 can include a gyro sensor 441 or an acceleration sensor 443 and the gyro sensor 441 can sense information on a movement of the remote control device 400.

For example, the gyro sensor 441 can sense information on an operation of the remote control device 400 on the basis of x, y, and z axes and the acceleration sensor 443 can sense information on a movement speed of the remote control device 400. Moreover, the remote control device 400 can further include a distance measurement sensor and sense a distance with respect to the display unit 280 of the display device 200.

The output unit 450 can output image or voice signals corresponding to a manipulation of the user input unit 435 or corresponding to signals transmitted from the display device 200. A user can recognize whether the user input unit 435 is manipulated or the display device 200 is controlled through the output unit 450.

For example, the output unit 450 can include an LED module 451 for flashing, a vibration module 453 for generating vibration, a sound output module 455 for outputting sound, or a display module 457 for outputting an image, if the user input unit 435 is manipulated or signals are transmitted/received to/from the display device 200 through the wireless communication unit 425.

Additionally, the power supply unit 460 supplies power to the remote control device 400 and if the remote control device 400 does not move for a predetermined time, stops the power supply, so that power waste can be reduced. The power supply unit 460 can resume the power supply if a predetermined key provided at the remote control device 400 is manipulated.

The storage unit 470 can store various kinds of programs and application data necessary for a control or operation of the remote control device 400. If the remote control device 400 transmits/receives signals wirelessly through the display device 200 and the RF module 421, the remote control device 400 and the display device 200 transmits/receives signals through a predetermined frequency band.

The control unit 480 of the remote control device 400 can store, in the storage unit 470, information on a frequency band for transmitting/receiving signals to/from the display device 200 paired with the remote control device 400 and refer to it.

The control unit 480 controls general matters relating to a control of the remote control device 400. The control unit 480 can transmit a signal corresponding to a predetermined key manipulation of the user input unit 435 or a signal corresponding to a movement of the remote control device 400 sensed by the sensor unit 440 to the display device 200 through the wireless communication unit 425.

Additionally, the voice acquisition unit 490 of the remote control device 400 can obtain voice.

The voice acquisition unit 490 can include at least one microphone 491 and obtain voice through the microphone 491.

Figure 6:
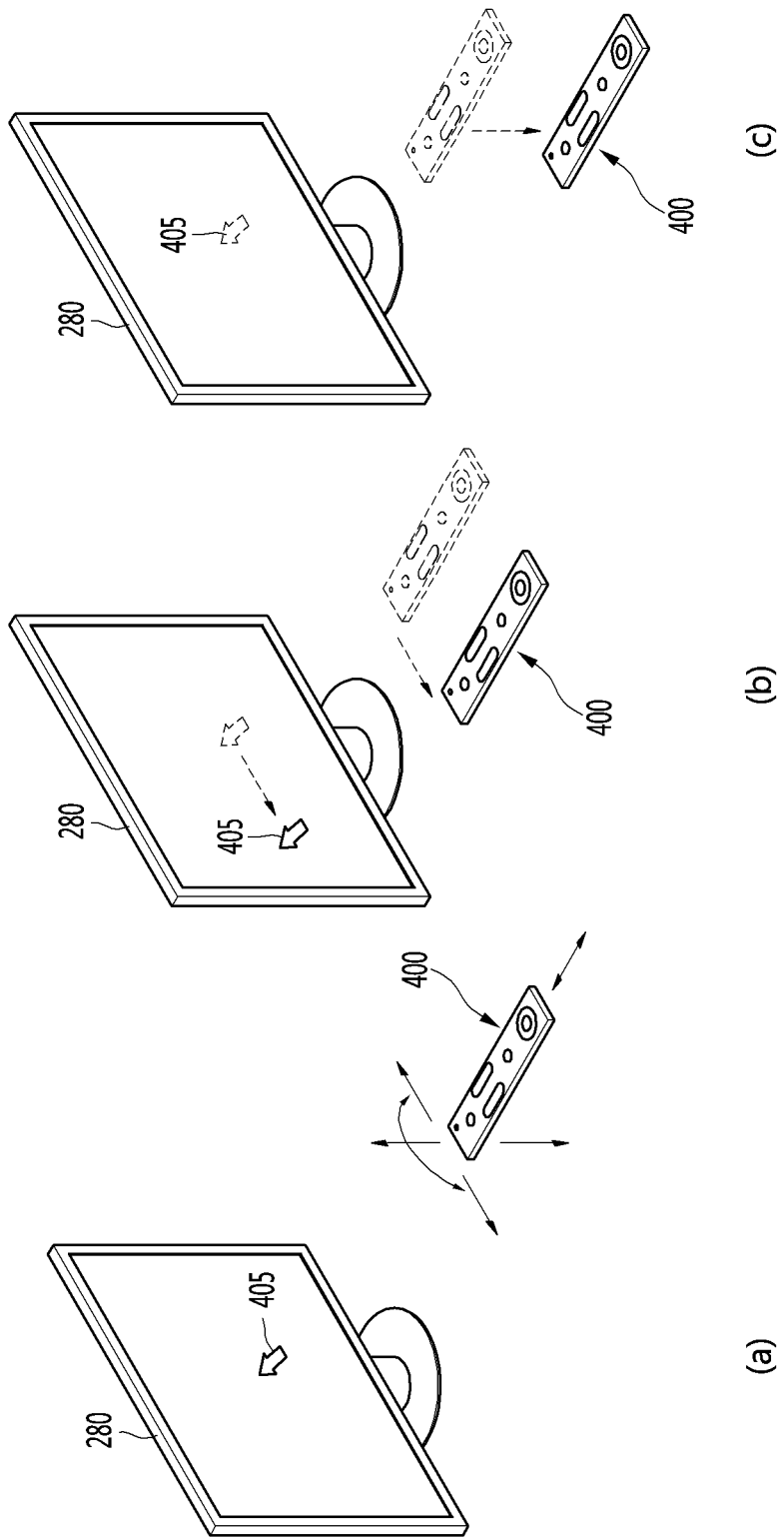
FIG. 6 is a view of utilizing a remote control device according to an embodiment.

Then, FIG. 6 is described.

FIG. 6 is a view of utilizing a remote control device according to an embodiment.

FIG. 6A illustrates that a pointer 405 corresponding to the remote control device 400 is displayed on the display unit 280.

A user can move or rotate the remote control device 400 vertically or horizontally. The pointer 405 displayed on the display unit 280 of the display device 200 corresponds to a movement of the remote control device 400. Since the corresponding pointer 405 is moved and displayed according to a movement on a 3D space as show in the drawing, the remote control device 400 can be referred to as a spatial remote controller.

FIG. 6B illustrates that if a user moves the remote control device 400, the pointer 405 displayed on the display unit 280 of the display device 200 is moved to the left in correspondence thereto.

Information on a movement of the remote control device 400 detected through a sensor of the remote control device 400 is transmitted to the display device 200. The display device 200 can calculate the coordinates of the pointer 405 from the information on the movement of the remote control device 400. The display device 200 can display the pointer 405 to match the calculated coordinates.

FIG. 6C illustrates that while a specific button in the remote control device 400 is pressed, a user moves the remote control device 400 away from the display unit 280. Thus, a selection area in the display unit 280 corresponding to the pointer 405 can be zoomed in and displayed largely.

On the other hand, if a user moves the remote control device 400 close to the display unit 280, a selection area in the display unit 280 corresponding to the pointer 405 can be zoomed out and displayed reduced.

On the other hand, if the remote control device 400 is away from the display unit 280, a selection area can be zoomed out and if the remote control device 400 is close to the display unit 280, a selection area can be zoomed in.

Additionally, if a specific button in the remote control device 400 is pressed, the recognition of a vertical or horizontal movement can be excluded. That is, if the remote control device 400 is moved away from or close to the display unit 280, the up, down, left, or right movement cannot be recognized and only the back and fourth movement can be recognized. While a specific button in the remote control device 400 is not pressed, only the pointer 405 is moved according to the up, down, left or right movement of the remote control device 400.

Moreover, the moving speed or moving direction of the pointer 405 can correspond to the moving speed or moving direction of the remote control device 400.

Furthermore, a pointer in this specification means an object displayed on the display unit 280 in correspondence to an operation of the remote control device 400. Accordingly, besides an arrow form displayed as the pointer 405 in the drawing, various forms of objects are possible. For example, the above concept includes a point, a cursor, a prompt, and a thick outline. Then, the pointer 405 can be displayed in correspondence to one point of a horizontal axis and a vertical axis on the display unit 280 and also can be displayed in correspondence to a plurality of points such as a line and a surface.

Hereinafter, exemplary embodiments in which the mobile terminal 100 and the display device 200 share a content while communicating data with each other or perform mirroring on a picture and/or an image will be described in FIGS. 7 to 30. In FIGS. 7 to 30, a source device described in FIGS. 7 to 30 may be the mobile terminal 100 described in FIG. 1, and a sink device may be the display device 200 described in FIG. 2.

Figure 7:
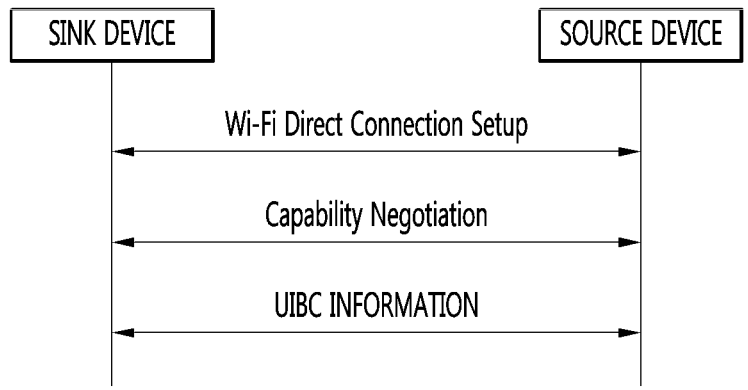
FIG. 7 is a flowchart illustrating a UIBC connection between a sink device and a source device.

FIG. 7 is a flowchart illustrating a UIBC connection between a sink device and a source device.

Referring to FIG. 7, first, a source device and a sink device, which are to share a content, may be subjected to Wi-Fi Direct connection setup through a Wi-Fi Direct network proposed by the Wi-Fi Alliance. In this case, one device may be a source electronic device that transmits the content, and the other device may be a sink electronic device that receives and output the content.

Meanwhile, the source device and the sink device may exchange supporting capability information and perform capability exchange and negotiation.

For example, a case where content sharing is performed based on a standard of Wi-Fi CERTIFIED Miracast™ introduced by the Wi-Fi Alliance will be described. A video format, an audio format, and the like, which are to be transmitted through capability negotiation, is determined when Miracast is first connected.

Meanwhile, the Miracast includes, as an option, a standard of a user input back channel (UIBC) through which the source device is to be controlled using a user input of the sink device during the connection of the Miracast.

For example, when a smart phone as the source device and a TV as the sink device are connected to each other, the source device as well as the sink device may be controlled through a control means, such as a mouse, a keyboard, or a remote control device, which is connected to the TV.

A capability on the UIBC may also be determined in the capability negotiation. That is, the source device may perform a service by identifying UIBC categories, such as a mouse and a keyboard, which are supported by the sink device, and then determining a UIBC category that is commonly supported by the sink device and the source device.

After that, the sink device may transmit UIBC information corresponding to a user input to the source device, and the source device may perform an operation corresponding to the UIBC information.

Figure 8:
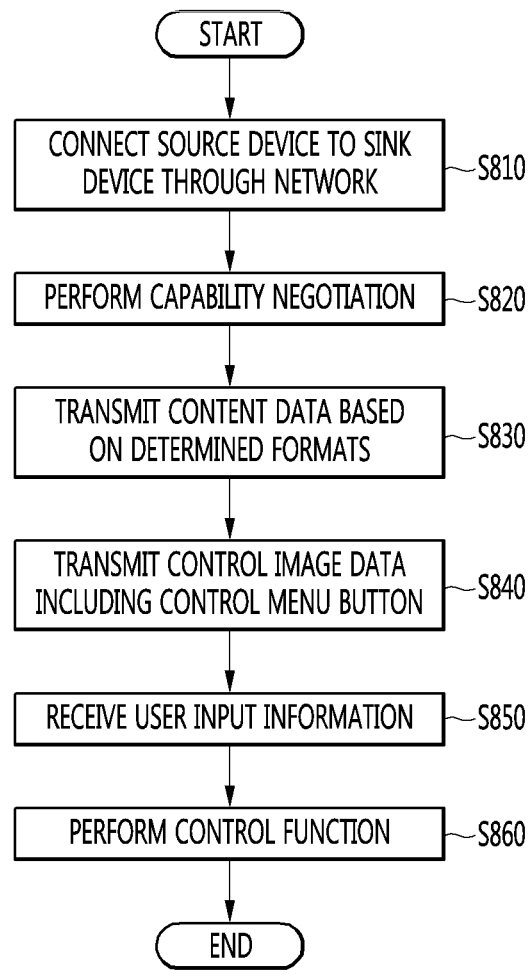
FIG. 8 is a flowchart illustrating an embodiment of an operating method of a source device according to an embodiment.

FIG. 8 is a flowchart illustrating an embodiment of an operating method of a source device according to an embodiment.

Referring to FIG. 8, the source device according to the embodiment may be connected to a sink device through a wired/wireless network. The source device according to the embodiment may be connected to an external electronic device to transmit a content to another device or to perform a content sharing mode operation capable of receiving a content from the other device (S810).

The source device according to the embodiment may request another device of a network connection or respond to a network connection from the other device, and may enter into a content sharing mode, based on a user's command input, e.g., a command input for executing a corresponding menu or application.

Here, the content sharing mode may refer to a mode in which the source device can transmit a content to an external device connected by wire/wireless or receive a content transmitted from the external device.

The content sharing mode may include a mirroring mode in which connected devices display the same screen, a dual screen dual play (DSDP) mode in which a content reproduced by any one device among a plurality of connected devices can be used by another device, and another operation can be performed in a content sharing state, and the like.

In addition, the source device according to the embodiment may support published multimedia transmission techniques such as Wi-Fi CERTIFIED Miracast™ introduced by the Wi-Fi Alliance, Wi-Fi Display (WFD), and Wireless Display (WiDi), and share a content based on standards of the published multimedia transmission techniques.

Meanwhile, data for content sharing may be directly transmitted to an external device through wired/wireless communication based on various communication protocols, or may be transmitted to the external device through a separately connected web server.

The source device according to the embodiment may be wirelessly connected to the sink device through a Wi-Fi Direct network. The Wi-Fi Direct network is a network on which two devices is peer-to-peer-connected through Wi-Fi, and the devices connected through the Wi-Fi Direct network can detect resources, capability information, and the like therebetween.

Meanwhile, the source device according to the embodiment may perform capability negotiation with the sink device (S820).

In the step (S820) of performing the capability negotiation, the source device according to the embodiment and the sink device may determine video and auto formats of a content to be shared or transmitted.

If the video and audio formats of the content to be transmitted are determined through the capability negotiation (S820), the source device according to the embodiment may transmit, to the sink device, content data including video data, audio data, and the like in a format based on the capability negotiation such that the sink device can output the content (S830).

The source device according to the embodiment may transmit control image data including one or more control menu buttons to the sink device (S840). That is, the source device may transmit, in advance, data to the sink device when a control event occurs or in the content sharing mode.

Here, the control image data may include a name of the control menu button and position information of the control menu button in a control image.

The source device may transmit a control image together with position information of menu buttons. For example, control names 'Resolution' and 'Media' of the menu buttons and position information (x y width height) in the control image may be transmitted as follows.

Wfd_uibc_control_image: Resolution 10 10 30 20, [0168] Media 10 40 30 20

In some embodiments, the control image data may further include size information of the control image. That is, size information of the entire control image is further used as well as a relative position coordinate of each menu button in the control image, so that it is possible to more quickly detect a position input by a user.

In some embodiments, the control image data may include position information of a control image, a name of a control menu button, and position information of the control menu button. The source device may transmit a control image together with the position information of the control image, the name of each control menu button, and the position information of each control menu button. In this case, the sink device may determine a control command selected by a user by comparing a position as an absolute coordinate, which is input to the sink device by the user, with the position information of the control image and the position information of the control menu button in the control image.

Meanwhile, the sink device receiving control image data may receive a user's input by providing a UI screen based on the received data. The user may select a command for controlling the source device according to the embodiment by selecting a control menu button included in the UI screen. Thus, it is possible to input various control commands without limit according to the configuration of the control menu button.

For example, the control image data may include a control menu button corresponding to a control command associated with the content sharing mode. That is, the control menu button may be configured with control commands that are frequently used in the content sharing mode.

In addition, the control image data may include a control menu button corresponding to a control command determined based on the kind of the sink device or the kind of a content shared by the sink device. That is, the control menu button may be configured with control commands optimized based on the kind of a content that is being used in the content sharing mode.

Meanwhile, the kind of the content may be received from a corresponding device, be determined based on the format of received data, be extracted from metadata, or be determined through several screen analysis algorithms known in the art.

Meanwhile, in some embodiments, the control image data may be transmitted together with data transmitted in the capability negotiation (S820).

After that, the source device may receive user input information on the control image data from the sink device (S850), and may perform a control function corresponding to the user input information (S860).

Here, the user input information may include a user's input position coordinate on the control image data received by the sink device.

If the user selects a control menu button in a corresponding image at the sink device, a selected coordinate may be transmitted to the source device. If the source device receives the data on the coordinate, a corresponding operation may be performed by detecting the selected menu button.

Alternatively, the sink device may directly detect a menu button selected based on the user's input position coordinate on the control image data and transmit the detected menu button information as user input information to the source device.

In this case, the source device may perform an operation corresponding to the received menu button information.

Meanwhile, the user input information may be received as UIBC information through the UIBC.

According to an embodiment, even in a state in which a screen of the source device is mirrored to the sink device using the Miracast, the UIBC that controls the source device using the UI of the sink device can be extended without limit.

The source device according to the embodiment may transmit a control UI image and relative data to the sink device.

When the user selects an item on the control UI image, the source device may receive a selected position on the control UI image from the sink device and perform control based on the selected position.

Thus, according to the present disclosure, the source device is controlled using a control UI image output from the sink device, so that it is possible to more extensively and conveniently control the source device.

Figure 9:
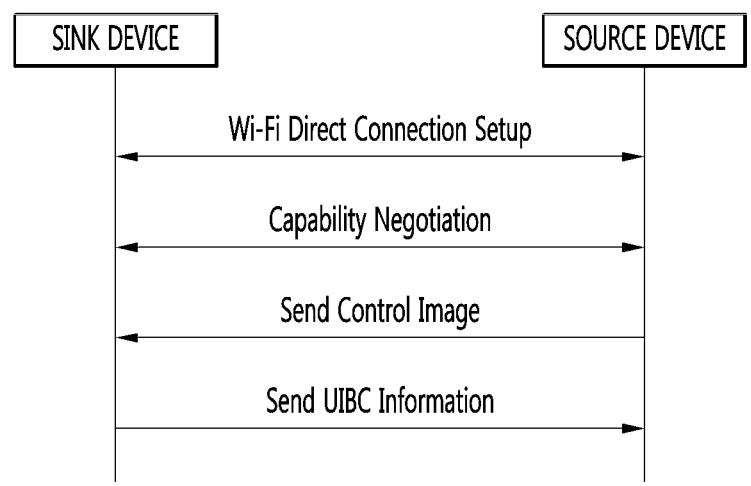
FIGS. 9 and 10 are views illustrating a control method of a source device and a sink device according to an embodiment.
Figure 10:
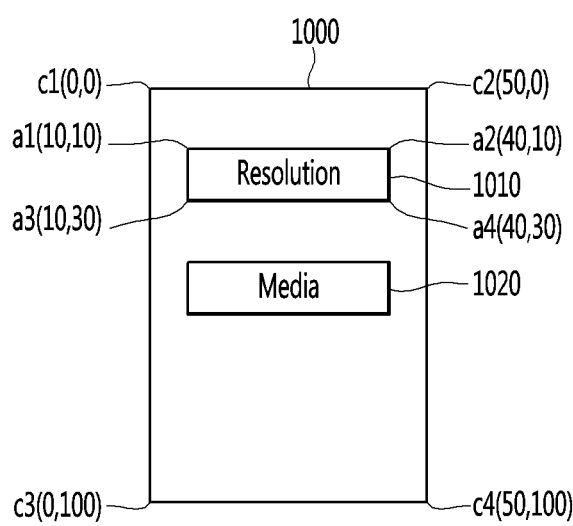

FIGS. 9 and 10 are views illustrating a control method of a source device and a sink device according to an embodiment.

Referring to FIG. 9, the sink device and the source device may be connected through a wired/wireless network to perform content sharing. For example, the sink device and the source device may be wierelessly connected through the Wi-Fi Direct network.

The sink device and the source device may detect items for content sharing and determine functions through capability negotiation.

Meanwhile, FIG. 10 illustrates when a screen of the mobile terminal 100 is mirroring to the display device 200. If a user desires to change resolution setting, the user is to not only directly manipulate the mobile terminal 100 as the source device but also perform the resolution setting through many steps in an order of control panel>display>screen resolution.

However, according to the embodiment, as shown in FIG. 10, the source device may transmit a control image 1000 including a resolution menu button 1010 to the display device 200.

In addition, the source device may transmit the control image together with position information of each menu button.

For example, the source device may transmit control names of the menu buttons, i.e., 'Resolution' button 1010 and 'Media' button 1020 and position information of the control menu buttons in the control image as 'Wfd_uibc_control_image: Resolution 10 10 30 20, [0168] Media 10 40 30 20.' In addition the source device may further transmit information on the width, height, size, and the like of the control image.

Referring to FIG. 10, the control image 1000 may have position information of C2(50,0), C3(0,100), and C4(50, 100), using left top C1(0,0) as a coordinate reference. In addition, the 'Resolution' button 1010 is drawn in the control image 1000 with a position coordinate of a1(10,10), a2(40,10), a3(10,30), and a4(40,30), using the left top C1(0, 0) as the coordinate reference, and the 'Media' button 1020 may be drawn in the control image 100, using the left top C1(0,0) as the coordinate reference.

Meanwhile, the display device 200 may receive, from the mobile terminal 100, content data including video data, audio data, and the like in a format based on capability negotiation, and control image data including one or more control menu button.

Meanwhile, the display device 200 may displaying not only a mirroring screen but also the control image 1000 including one or more control menu button.

The user may select a menu button through which the user is to control the mobile terminal 100, using the remote control device 400 of the display device 200.

Figure 11:
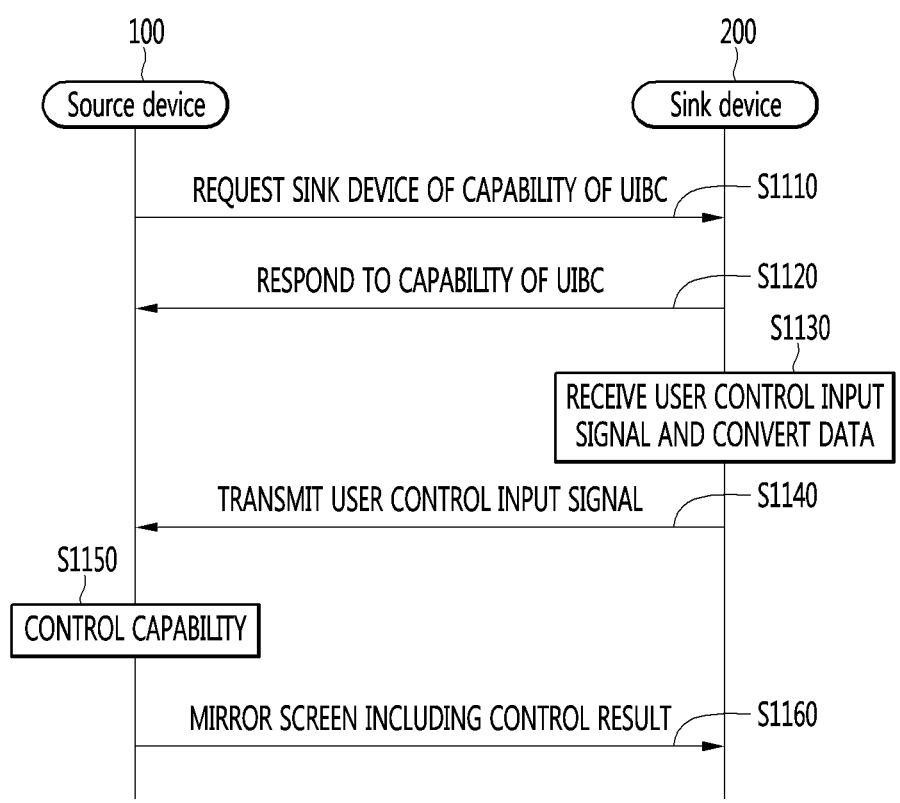
FIG. 11 is a flowchart illustrating a method for controlling data transmitted from a source device to a sink device according to an embodiment.

FIG. 11 is a flowchart illustrating a method for controlling data transmitted from a source device to a sink device according to an embodiment.

In this embodiment, it is assumed that the sink device supports a function of transmitting information (e.g., a message form) on a user input received through a preset user input device to the source device through UIBC. The UIBC refers to a channel through which the sink device transmits information on a user input received from a user (e.g., a user input device) to the source device, based on Wi-Fi Direct.

The controller 180 of the mobile terminal 100 as the source device requests the display device 200 as the sink device of information on whether the capability of the UIBC is to be supported (S1110).

The control unit 270 of the display device 200 transmits, as a response to the request, information on whether transmission of a user input is to be supported through the UIBC to the mobile terminal 100 through the network interface unit 233 (S1120). In some embodiments, the control unit 270 may transmit, as a response to the request, parameter information required to process the user input together with the information on whether the transmission of the user input is to be supported through the UIBC to the mobile terminal 100.

In addition, the control unit 270 of the display device 200 may output, through the display unit 280 and/or the audio output unit 285, data (e.g., streaming data) received from the mobile terminal 100 through the network interface unit 233 using the Wi-Fi Direct.

Meanwhile, the storage unit 240 may store user control input data that the user input device can transmit to the mobile terminal 100 through the UIBC in mirroring. For example, the user control input data of the user input device may include information such as a movement, click, touch, zoom magnification, scroll amount, and rotation amount of a mouse, a touch pad, or the like and information on selection of a specific key of a keyboard.

The control unit 270 of the display device 200 may receive a user control input signal received through the user input interface unit 250 and convert the received user control input signal into data to be transmitted to the mobile terminal 100 (S1130).

In addition, the control unit 270 may control the network interface unit 233 to transmit a message including a command of a user control input corresponding to the converted data to the mobile terminal 100 through the UIBC.

The controller 180 of the mobile terminal 100 may receive a message from the display device 200 through the wireless communication unit 110 and control a function of the mobile terminal 100, based on a user control input corresponding to the command included in the message (S1150).

The controller 180 may process the received message, based on a parameter required to process the user control input received from the display device 200, and perform a predetermined function corresponding to the command.

In addition, the controller 180 of the mobile terminal 100 may control the wireless communication unit 110 to transmit data that reflects a control result to the display device 200 (S1160). For example, the controller 180 may perform a function corresponding to the command, output a screen including a result of the performance of the function on the display unit 151, and transmit data corresponding to the output screen to the display device 200. Accordingly, the screen of the display unit 151 including the control result can be mirrored on the display unit 280 of the display device 200.

Figure 12:
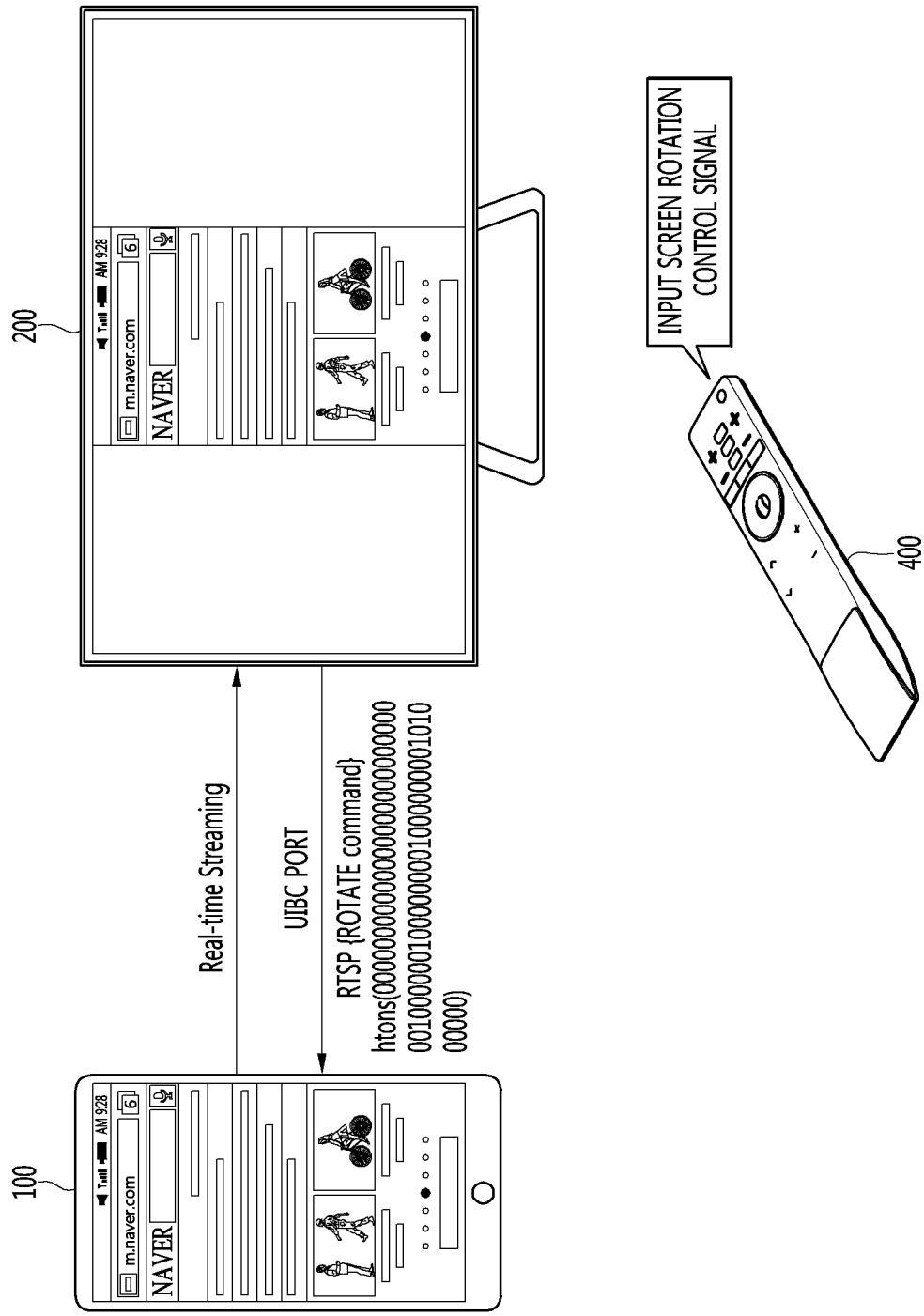
FIG. 12 is a view illustrating an example of the method of FIG. 11.

FIG. 12 is a view illustrating an example of the method of FIG. 11.

The control unit 270 of the display device 200 may receive data transmitted from the mobile terminal 100 through network interface unit 233 and output the received data through at least one of the display unit 280 and the audio output unit 285.

The data may include at least one of image data, graphic data, audio data, video data, and AV data. Accordingly, a screen of the display unit 151 of the mobile terminal 100 can be mirrored on a screen of the display unit 280 of the display unit 280 of the display device 200. In this embodiment, control of video data transmitted from the mobile terminal 100 will be mainly described.

In this embodiment, it is assumed that a user has input called as "screen rotation" through the remote control device 400.

The control unit 270 of the display device 200 may convert and analyze the user control input received from the remote control device 400, and control the network interface unit 233 to transmit a message including a command corresponding to a user control input capable of being transmitted through a UIBC stored in the storage unit 240 to the mobile terminal 100 through the UIBC.

For example, the control unit 270 of the display device 200 may control the network interface unit 233 to transmit a command corresponding to a "screen rotation control input signal" to the mobile terminal 100 through the UIBC.

The controller 180 of the mobile terminal 100 may receive the message through the wireless communication unit 110, and rotate a screen of the display unit 151 in the lateral direction (when the direction of the existing screen is the longitudinal direction) or in the horizontal direction (when the direction of the existing screen is the lateral direction), based on a user control input corresponding to the command included in the message.

In addition, the controller 180 may output a screen including an execution result of the screen rotation on the display unit 151 and transmit data corresponding to the output screen to the display device 200. Accordingly, the screen of the display unit 151, which includes the control result, can be mirrored on the display unit 280 of the display device 200.

However, typically, after mirroring between the mobile terminal 100 and the display device 200 is performed, a picture or image displayed in the mobile terminal 100 is to be identically displayed on the display unit 280 of the display device 200 such that a user controls the mobile terminal 100 through the display device 200. Therefore, when the picture or image displayed in the mobile terminal 100 is converted to be matched to the resolution of the display device 200, the user has difficulty in controlling the mobile terminal 100 through the display device 200.

However, in the present disclosure, a technique will be described in which a coordinate conversion algorithm is used, so that the user can control the mobile terminal 100 through the display device 200 even when a picture or image displayed in the mobile terminal 100 is converted to be matched to the resolution of the display device 200.

Hereinafter, in embodiments described in FIGS. 13 to 26, the mobile device 100 may be a source device, and the display device 200 may be a sink device.

Figure 13:
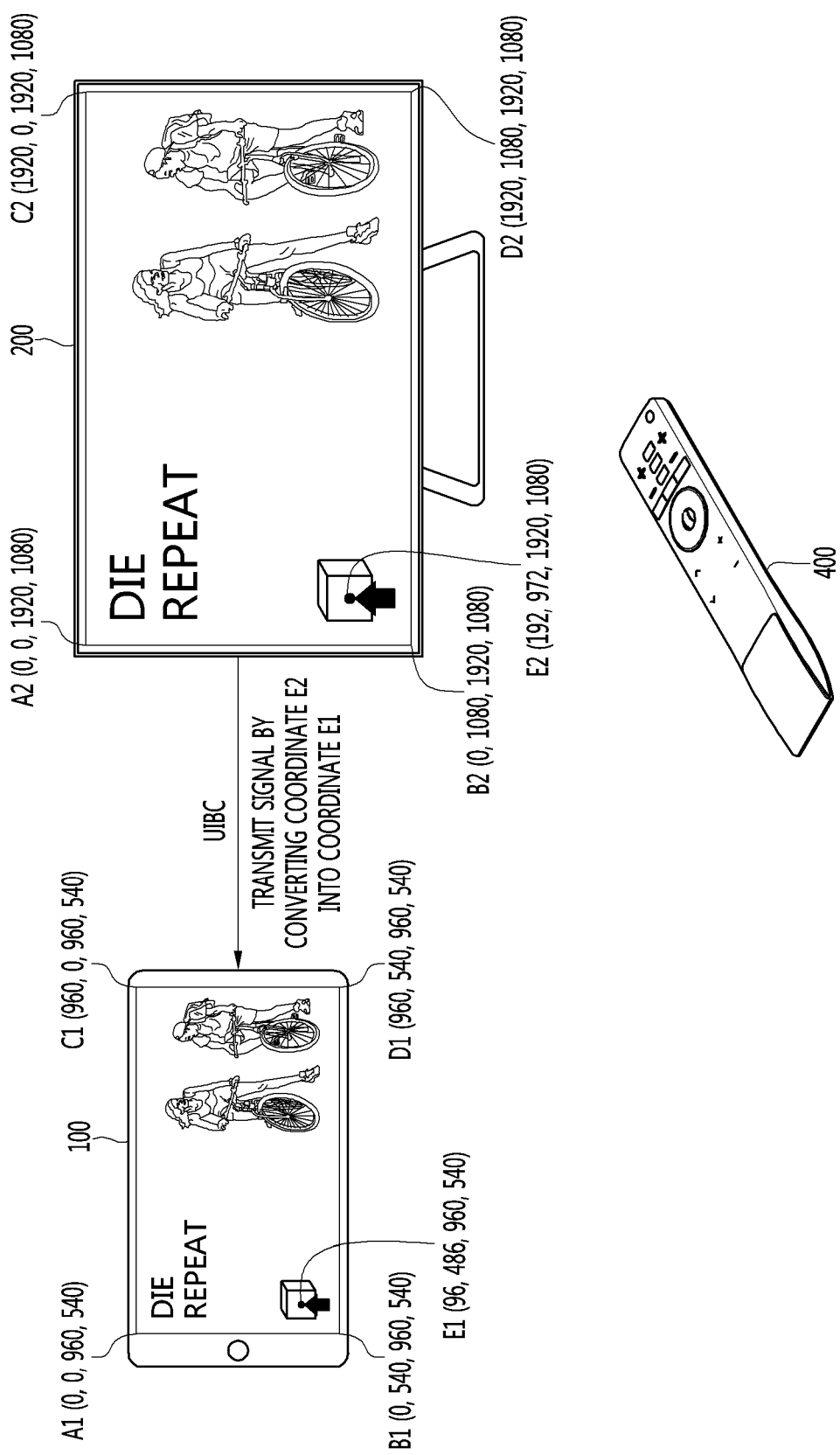
FIGS. 13 to 15 are views illustrating a first embodiment in which the display device of the present disclosure transmits a control input signal to the mobile terminal using coordinate conversion and UIBC.
Figure 14:
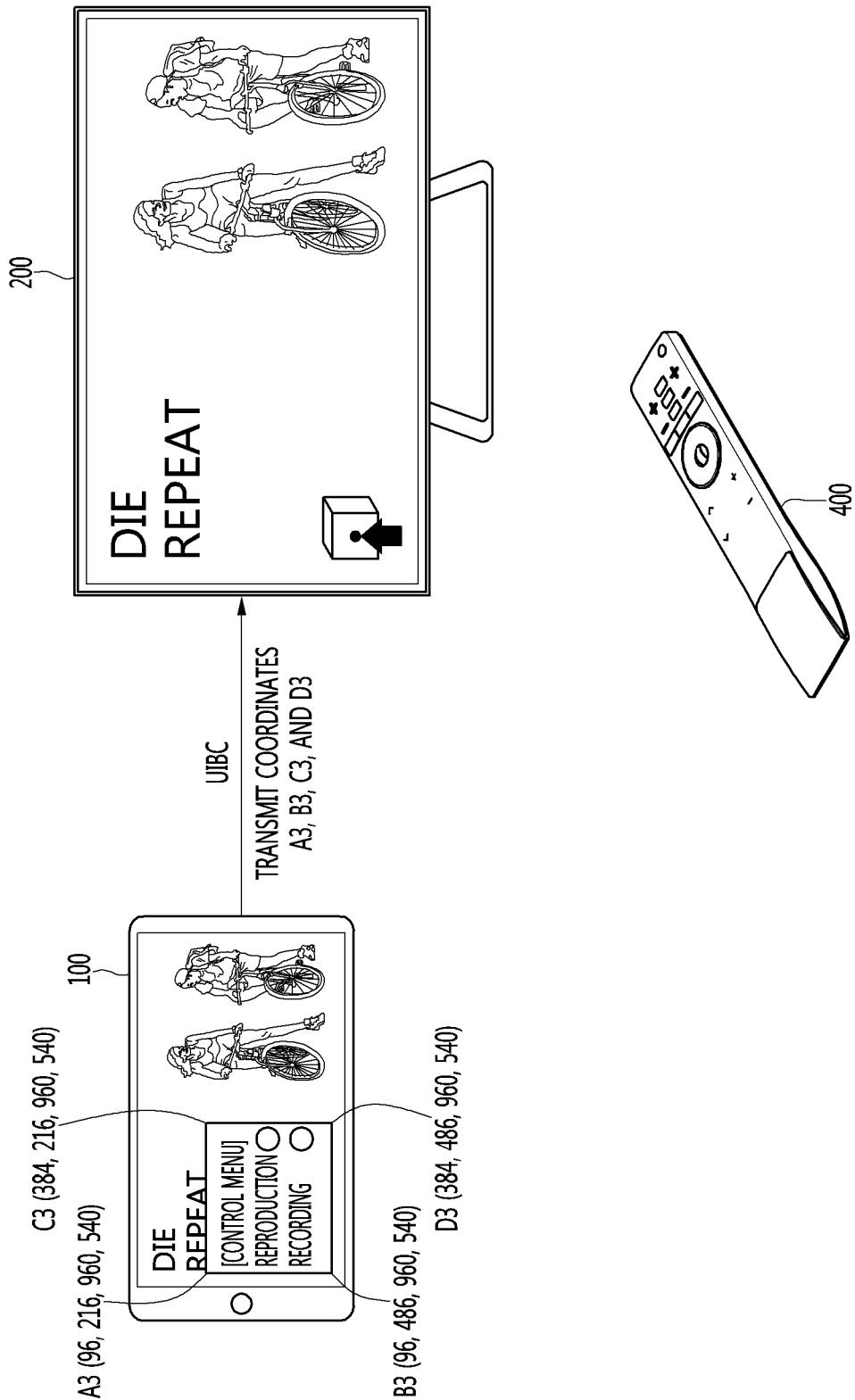
Figure 15:
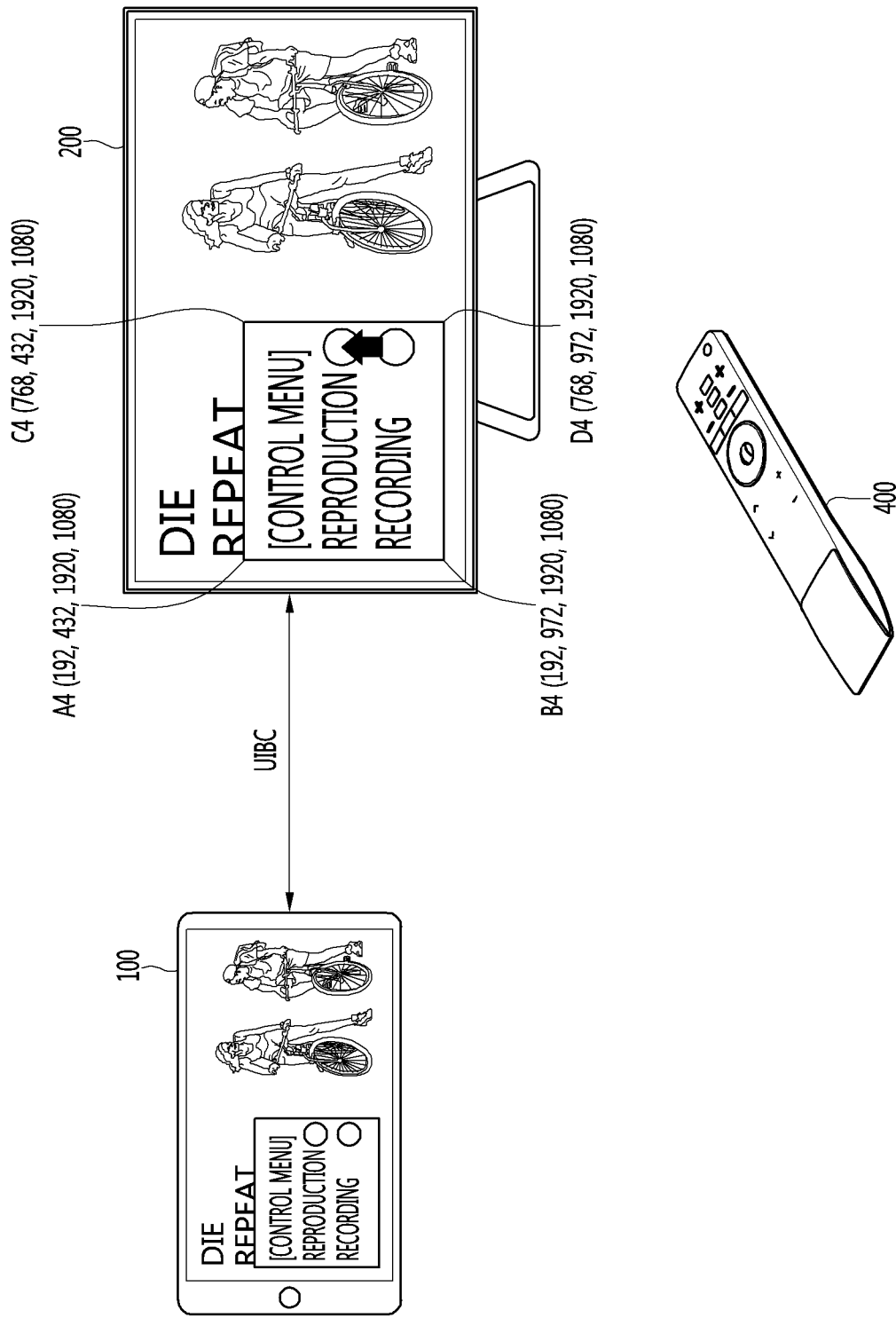

FIGS. 13 to 15 are views illustrating a first embodiment in which the display device of the present disclosure transmits a control input signal to the mobile terminal using coordinate conversion and UIBC.

As shown in FIG. 13, the display device 200 according to the embodiment may transmit/receive video data and/or audio data by performing data communication with the mobile terminal 100. In addition, an image or picture displayed in the mobile terminal 100 may be identically displayed in the display device 200. As described above, the control unit 270 of the display device 200 may receive a user input signal from the remote control device 400. When the user input signal is a control signal, the control signal may be transmitted to the mobile terminal 100 through the UIBC.

The control unit 270 of the display device 200 may transmit a control signal to the mobile terminal 100 using a coordinate conversion algorithm. For example, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080).

In this case, it is assumed that the mobile terminal 100 displays a control icon of a currently displayed video content at coordinate point E1(96, 486, 960, 540), and correspondingly, the display device 200 displays the same control icon at coordinate point E2(192, 972, 1920, 1080).

A user watching the video content through the display device 200 may select the control icon to control the video content. The user may transmit, to the display device 200, a control input signal for selecting a control icon displayed at the coordinate point E2 of the display device 200, using the remote control device 400. The control unit 270 of the display device 200 receiving the control input signal for selecting the control icon may control the display device 200 to convert coordinate value E2 into coordinate value E1 by being matched to a coordinate value of the mobile device 100 and transmit the converted coordinate value E1 as a UIBC signal to the mobile terminal 100.

As shown in FIG. 14, the mobile terminal 100 does not receive the coordinate value E2 but may receive the coordinate value E1 from the display device 200. Therefore, the mobile terminal 100 may perform a control operation of selecting a control icon displayed at a point corresponding to the coordinate value E1. The controller 180 of the mobile terminal 100 may display a control window in a partial area of the display unit 151. It assumed that the left top end of the control window has coordinate A3(96, 216, 960, 540), the left bottom end of the control window has coordinate B3(96, 486, 960, 540), the right top end of the control window has coordinate C3(384, 216, 960, 540), and the right bottom end of the control window has coordinate D3(384, 486, 960, 540). The controller 180 of the mobile terminal 100 may transmit a signal for displaying the control window at coordinate points A3, B3, C3, and D3 to the display device 200 through the UIBC.

As shown in FIG. 15, the control unit 270 of the display device 200, which receives the coordinate values of the control window from the mobile terminal 100, may convert coordinate values A3, B3, C3, and D3 to correspond to the display unit 280 of the display device 200. For example, the coordinate value A3 may be converted into coordinate value A4(192, 432, 1920, 1080), the coordinate value B3 may be converted into coordinate value B4(192, 972, 1920, 1080), the coordinate value C3 may be converted into coordinate value C4(768, 432, 1920, 1080), and the coordinate value D3 may be converted into coordinate value D4(768, 972, 1920, 1080). The control unit 270 of the display device 200 may control the display device 200 to display the control window at a place corresponding to the converted coordinates A4, B4, C4, D4.

As described in FIGS. 13 to 15, the user can watch an image or picture of the mobile terminal to be optimized in the display device through the mirroring technique, and simultaneously, can easily control the mobile terminal in this state.

FIGS. 16 to 19 are views are views illustrating an embodiment in which the display device of the present disclosure transmits a control input signal to the mobile terminal using coordinate conversion and UIBC.

Figure 16:
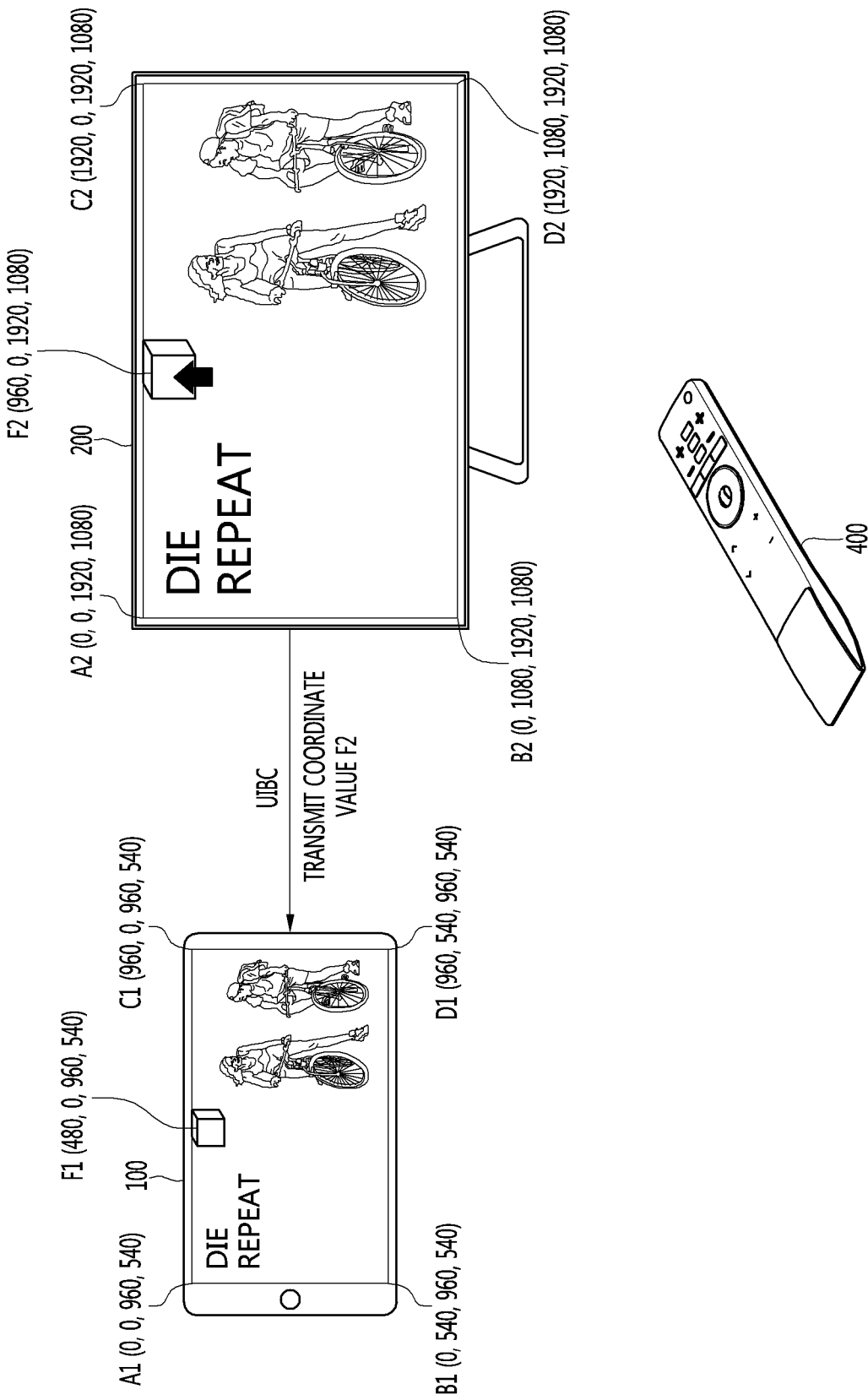
FIGS. 16 to 19 are views are views illustrating an embodiment in which the display device of the present disclosure transmits a control input signal to the mobile terminal using coordinate conversion and UIBC.

As shown in FIG. 16, the display device 200 according to the embodiment may transmit/receive video data and/or audio data by performing data communication with the mobile terminal 100. In addition, an image or picture displayed in the mobile terminal 100 may be identically displayed in the display device 200 through mirroring. As described above, the control unit 270 of the display device 200 may receive a user input signal from the remote control device 400. When the user input signal is a control signal, the control signal may be transmitted to the mobile terminal 100 through the UIBC.

As an example for describing this embodiment, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080).

In this case, it is assumed that the mobile terminal 100 displays a control icon of a currently displayed video content at coordinate point F1(480, 0, 960, 540), and correspondingly, the display device 200 displays the same control icon at coordinate point F2(960, 0, 1920, 1080).

A user watching the video content through the display device 200 may select the control icon to control the video content. The user may transmit, to the display device 200, a control input signal for selecting a control icon displayed at the coordinate point F2 of the display device 200, using the remote control device 400. The control unit 270 of the display device 200 receiving the control input signal for selecting the control icon may control the display device 200 to transmit converted coordinate value F2 as a UIBC signal to the mobile terminal 100.

Figure 17:
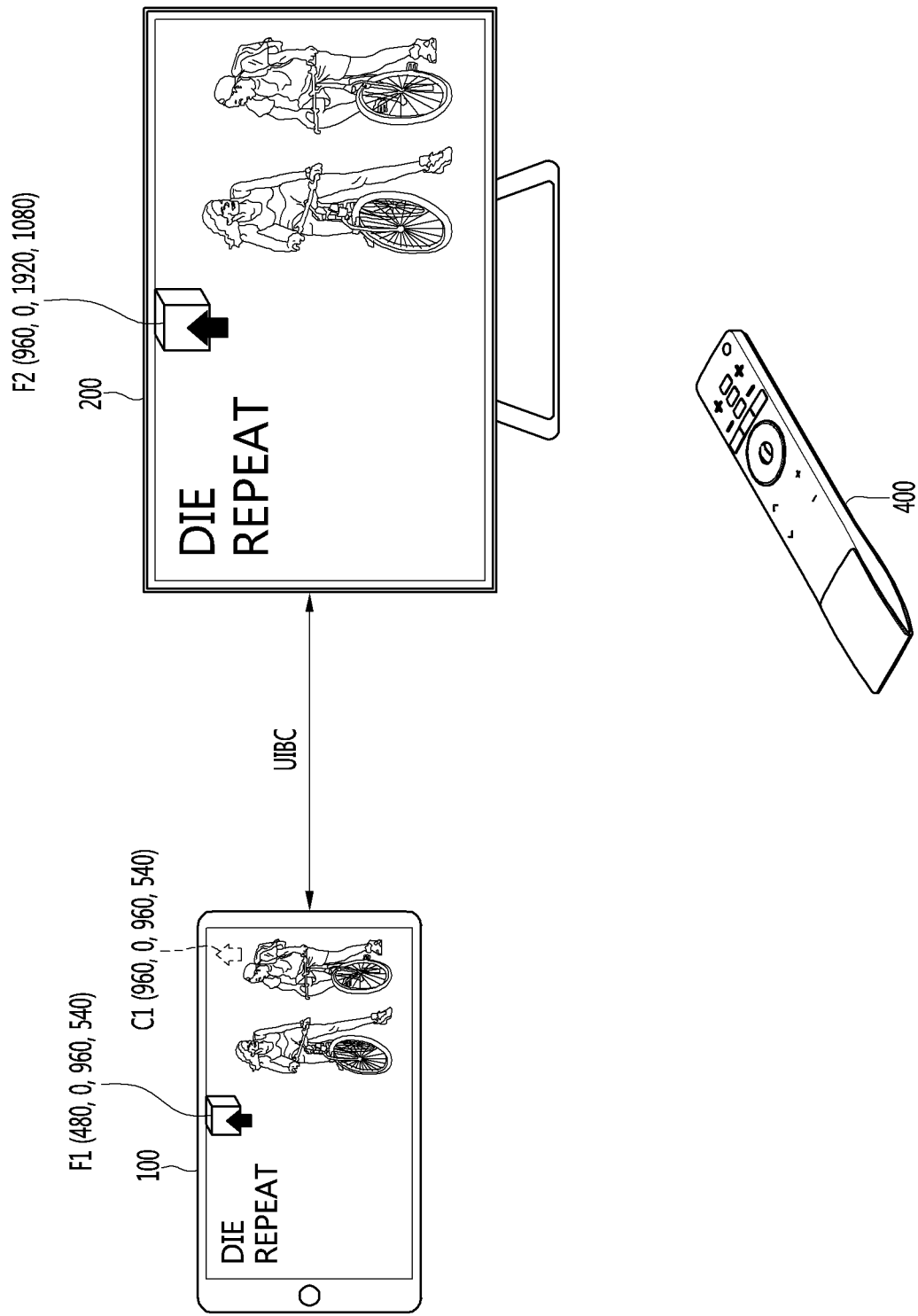

As shown in FIG. 17, the mobile terminal 100 does not receive coordinate value F1 but may receive the coordinate value F2 from the display device 200. Therefore, if the mobile terminal 100 uses the coordinate value F2 as it is, coordinate C1(960, 0, 960, 540) instead of the coordinate F1 on the mobile terminal 100 is selected, and hence the user cannot perform a desired control operation. Therefore, the mobile terminal 100 may perform a process of converting the coordinate value received from the display device 200. For example, the mobile terminal 100 may perform a process of converting the coordinate value F2 received from the display device 200 into the coordinate value F1. Through the above-described conversion, the controller 180 of the mobile terminal 100 can display a pointer of the remote control device 400 at a point corresponding to the coordinate value F1 instead of the coordinate C1.

Figure 18:
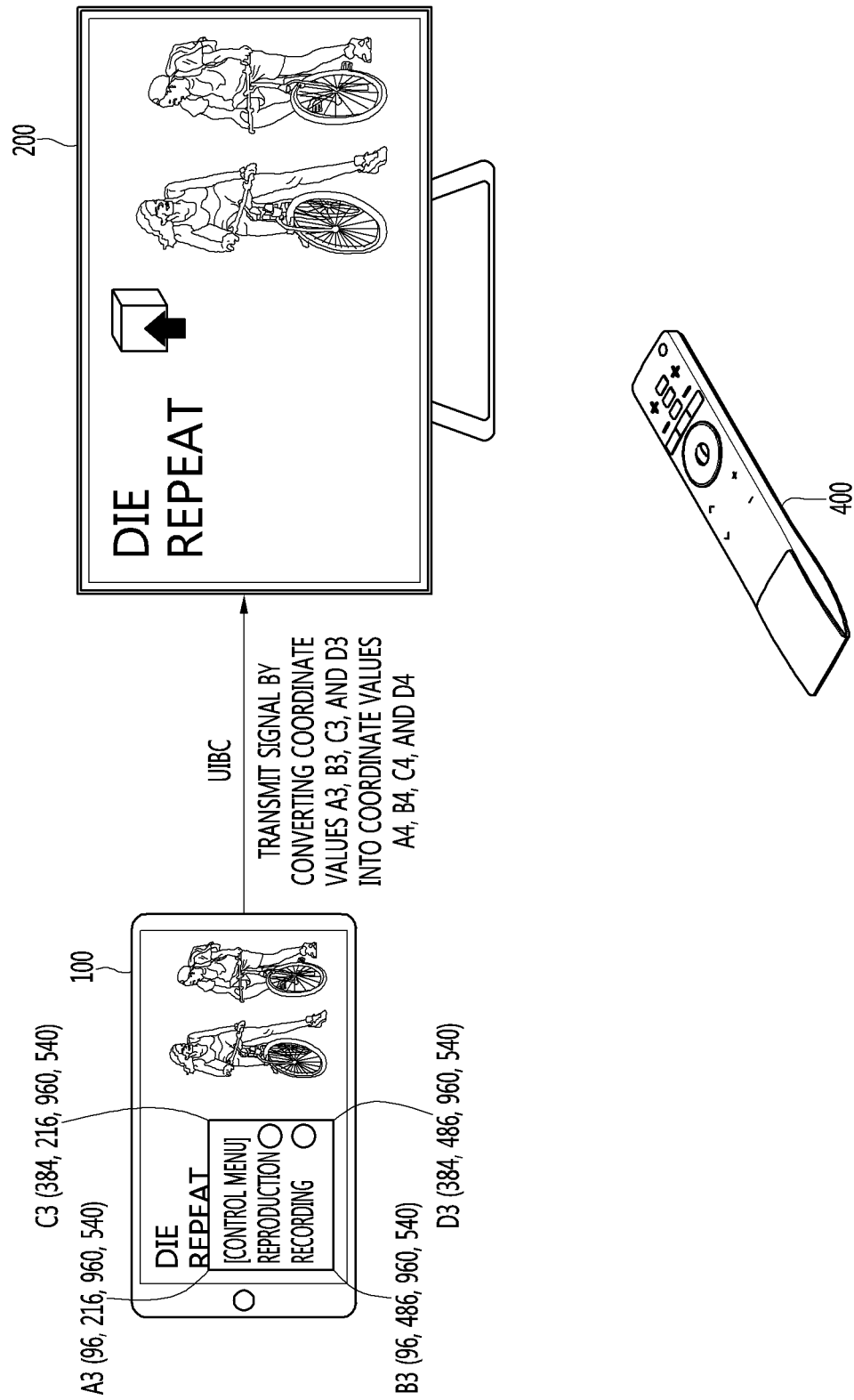

As shown in FIG. 18, the mobile terminal 100 may perform a control operation of selecting a control icon displayed at a point corresponding to the coordinate value F1. The controller 180 of the mobile terminal 100 may display a control window in a partial area of the display unit 151. It assumed that the left top end of the control window has coordinate A3(96, 216, 960, 540), the left bottom end of the control window has coordinate B3(96, 486, 960, 540), the right top end of the control window has coordinate C3(384, 216, 960, 540), and the right bottom end of the control window has coordinate D3(384, 486, 960, 540). The controller 180 of the mobile terminal 100 may perform a process of converting coordinate values A3, B3, C3, and D3 to correspond to the display device 200. For example, the coordinate value A3 may be converted into coordinate value A4(192, 432, 1920, 1080), the coordinate value B3 may be converted into coordinate value B4(192, 972, 1920, 1080), the coordinate value C3 may be converted into coordinate value C4(768, 432, 1920, 1080), and the coordinate value D3 may be converted into coordinate value D4(768, 972, 1920, 1080). The controller 180 of the mobile terminal 100 may transmit the converted values A4, B4, C4, and D4 as a UIBC signal to the display device 200.

Figure 19:
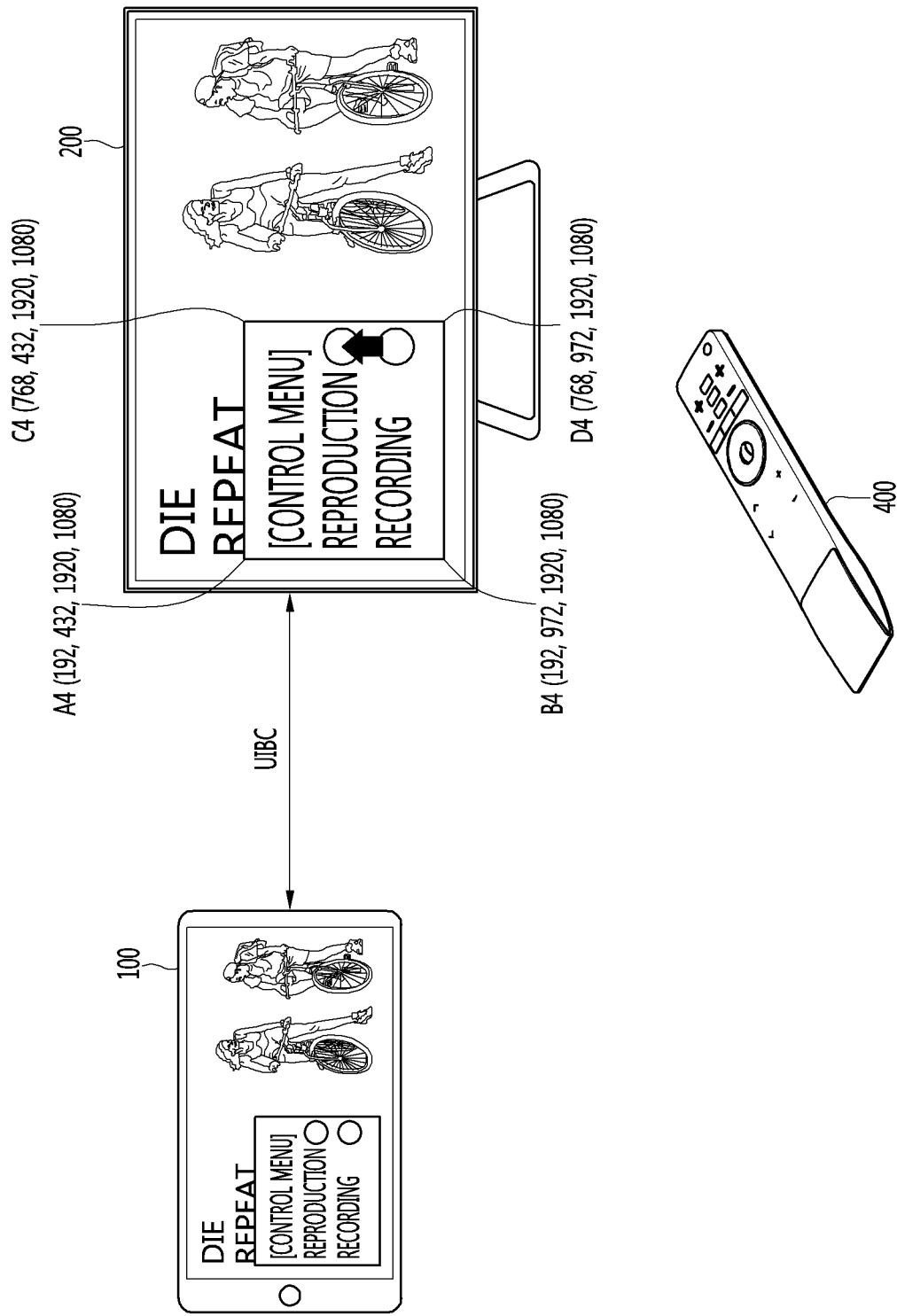

As shown in FIG. 19, the control unit 270 of the display device 200 receiving the converted values A4, B4, C4, and D4 may control the display device 200 to display the control window at a place corresponding to the converted coordinates A4, B4, C4, and D4.

As described in FIGS. 16 to 19, the user can watch an image or picture of the mobile terminal to be optimized in the display device through the mirroring technique, and simultaneously, can easily control the mobile terminal in this state.

Figure 20:
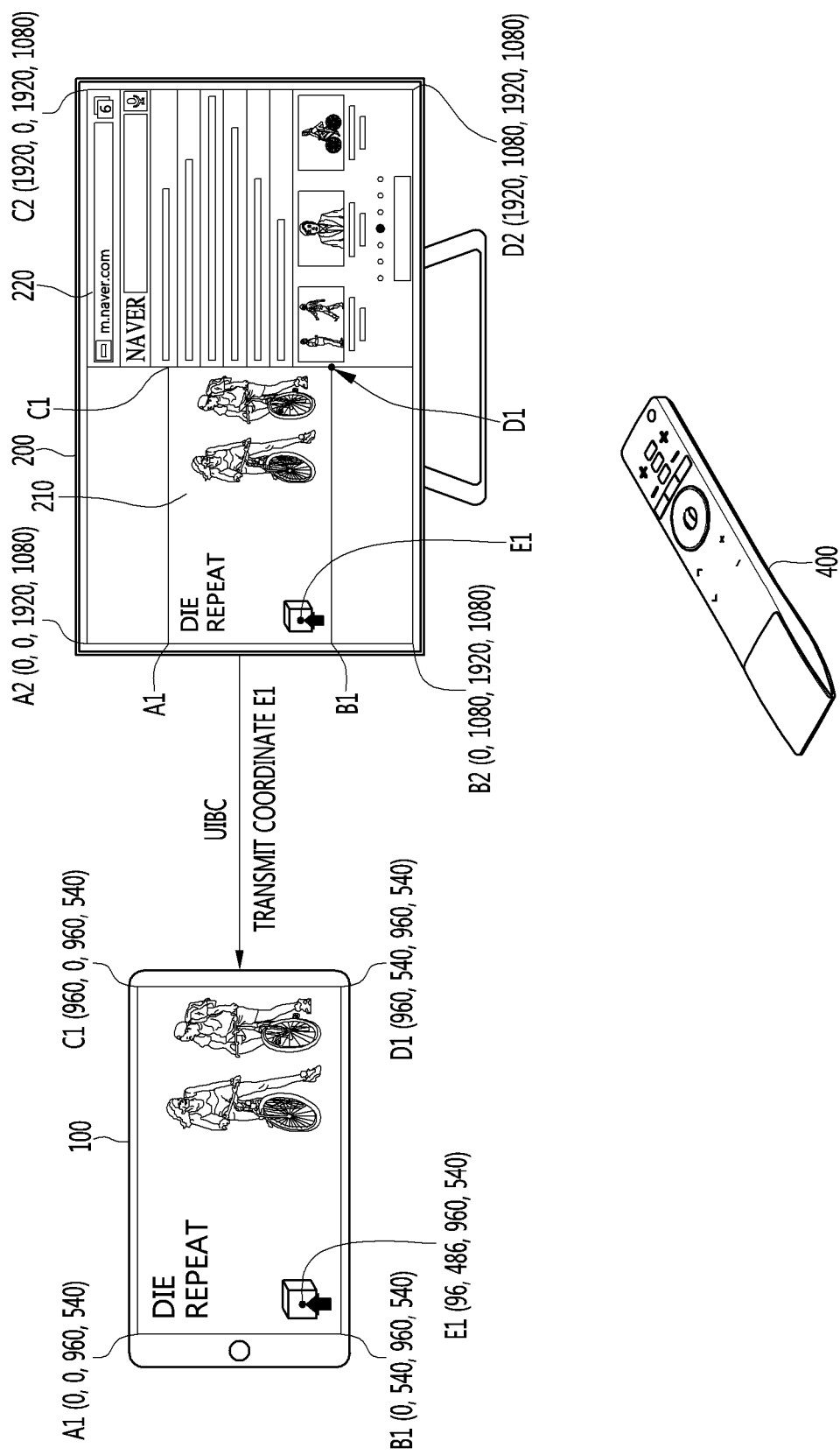
FIGS. 20 to 22 are views illustrating an embodiment in which the display device of the present disclosure receives a control input signal from the mobile terminal using UIBC.
Figure 21:
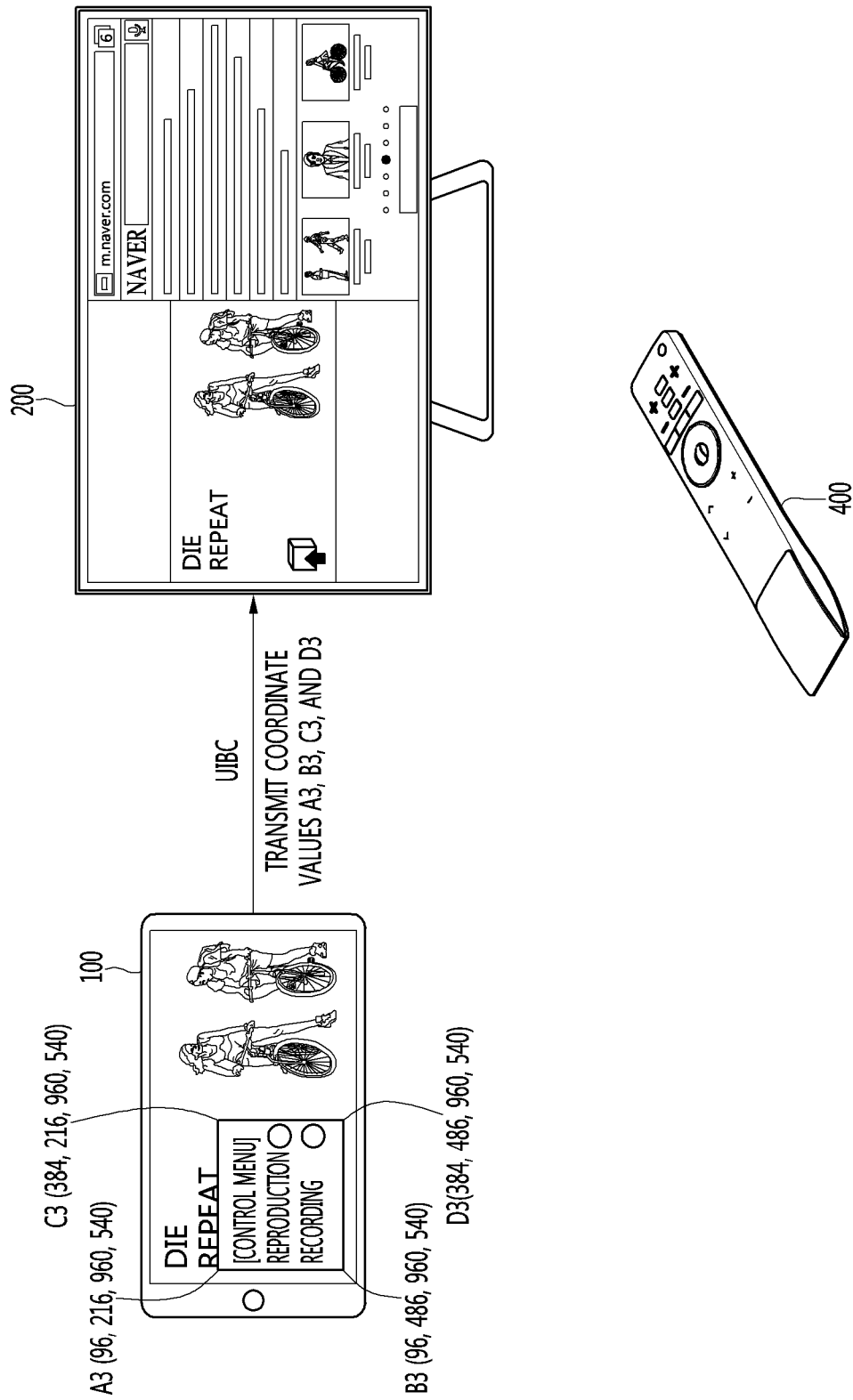
Figure 22:
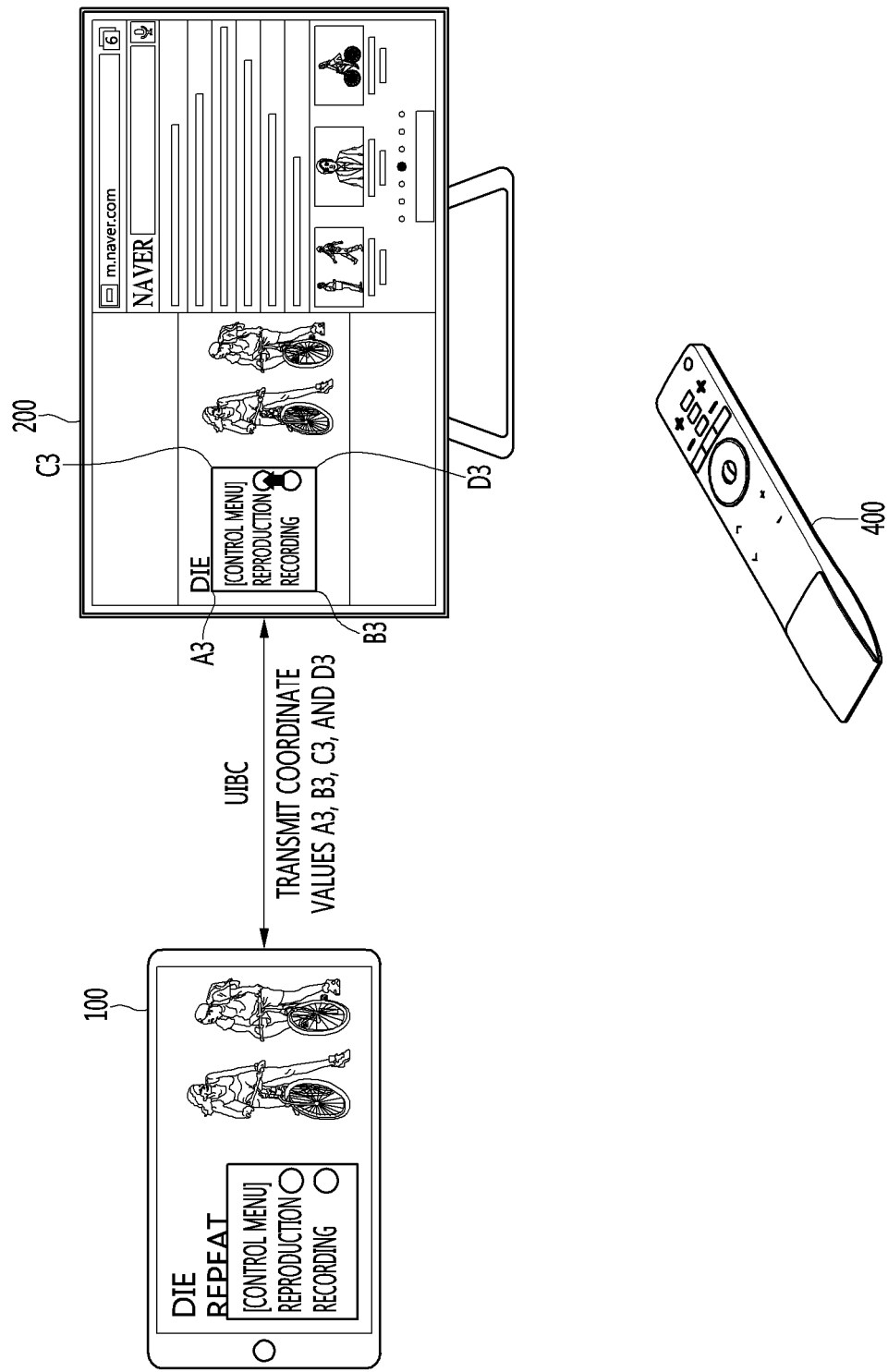

FIGS. 20 to 22 are views illustrating an embodiment in which the display device of the present disclosure receives a control input signal from the mobile terminal using UIBC.

As shown in FIG. 20, the display device 200 according to the embodiment may transmit/receive video data and/or audio data by performing data communication with the mobile terminal 100. In addition, an image or picture displayed in the mobile terminal 100 may be identically displayed in the display device 200 through mirroring. As described above, the control unit 270 of the display device 200 may receive a user input signal from the remote control device 400. When the user input signal is a control signal, the control signal may be transmitted to the mobile terminal 100 through the UIBC.

In addition, a user may simultaneously watch a first content 210 and a second content 220 by dividing a screen of the display unit 280 of the display unit 200. In this case, the user may set coordinate values of the first content 210 that is being watched by the user, to be equal to those of the mobile terminal 100 through the mirroring.

For example, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080). In this case, when the user divides the screen of the display unit 280 of the display device 200, the first content 210 may have the same coordinate values (left top end A1, left bottom end B1, the right top end C1, and right bottom top end D1) as the mobile terminal 100.

At this time, it is assumed that the mobile terminal 100 displays a control icon of the currently displayed first content 210 at coordinate point E1(96, 486, 960, 540), and correspondingly, the display device 200 displays the same control icon at the same coordinate point E1.

The user watching the first content 210 through the display device 200 may select the control icon to control the first content 210. The user may transmit, to the display device 200, a control input signal for selecting the control icon displayed at the coordinate point E1 of the display device 200, using the remote control device 400. The control unit 270 of the display device 200 receiving the control input signal for selecting the control icon may control the display device 200 not to convert the coordinate value E1 but to transmit the coordinate value as a UIBC signal to the mobile terminal 100.

As shown in FIG. 21, the mobile terminal 100 may receive the coordinate value E1 from the display device 200. Therefore, the mobile terminal 100 may perform a control operation of selecting the control icon displayed at a point corresponding to the coordinate value E1. The controller 180 of the mobile terminal 100 may display a control window in a partial area of the display unit 151. It assumed that the left top end of the control window has coordinate A3(96, 216, 960, 540), the left bottom end of the control window has coordinate B3(96, 486, 960, 540), the right top end of the control window has coordinate C3(384, 216, 960, 540), and the right bottom end of the control window has coordinate D3(384, 486, 960, 540). The controller 180 of the mobile terminal 100 may transmit a signal for display the control window at coordinate points A3, B3, C3, and D3 to the display device through the UIBC.

As shown in FIG. 22, the control unit 270 of the display device 200 receiving coordinate values of the control window from the mobile terminal 100 may display the control window on the display unit 280 using coordinate values A3, B3, C3, and D3.

As described in FIGS. 20 to 22, the user can watch a plurality of contents through screen division, and simultaneously, can control the mobile terminal through the mirroring technique without any coordinate conversion.

FIGS. 23 to 26 are views illustrating a second embodiment in which the display device of the present disclosure transmits a control input signal to the mobile terminal using coordinate conversion and UIBC.

Figure 23:
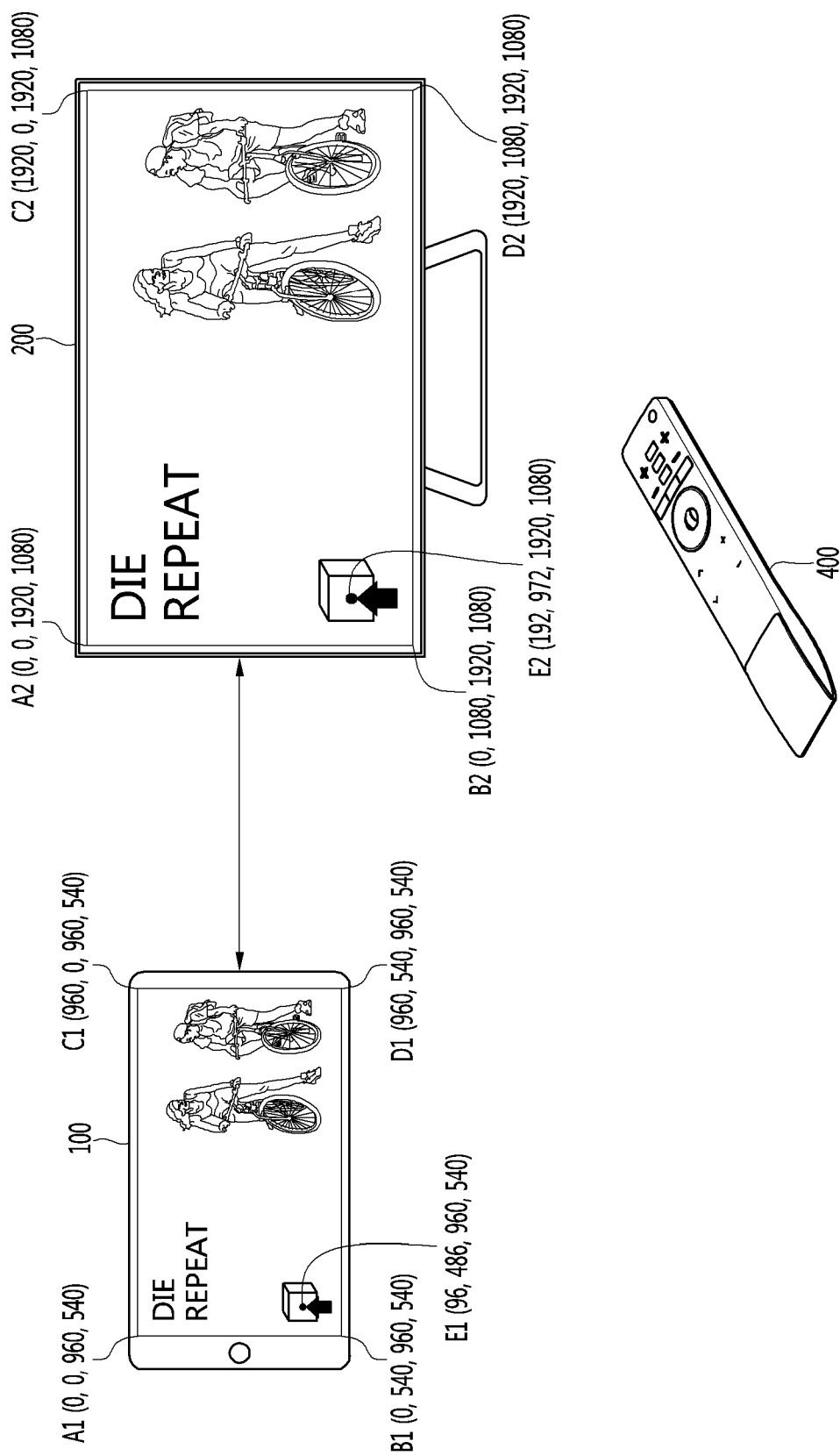
FIGS. 23 to 26 are views illustrating a second embodiment in which the display device of the present disclosure transmits a control input signal to the mobile terminal using coordinate conversion and UIBC.

As shown in FIG. 23, the display device 200 according to the embodiment may transmit/receive video data and/or audio data by performing data communication with the mobile terminal 100. In addition, an image or picture displayed in the mobile terminal 100 may be identically displayed in the display device 200 through mirroring. As described above, the control unit 270 of the display device 200 may receive a user input signal from the remote control device 400. When the user input signal is a control signal, the control signal may be transmitted to the mobile terminal 100 through the UIBC.

The control unit 270 of the display device 200 may transmit a control signal to the mobile terminal 100 using a coordinate conversion algorithm. For example, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080).

In this case, it is assumed that the mobile terminal 100 displays a control icon of a currently displayed video content at coordinate point E1(96, 486, 960, 540), and correspondingly, the display device 200 displays the same control icon at coordinate point E2(192, 972, 1920, 1080).

Figure 24:
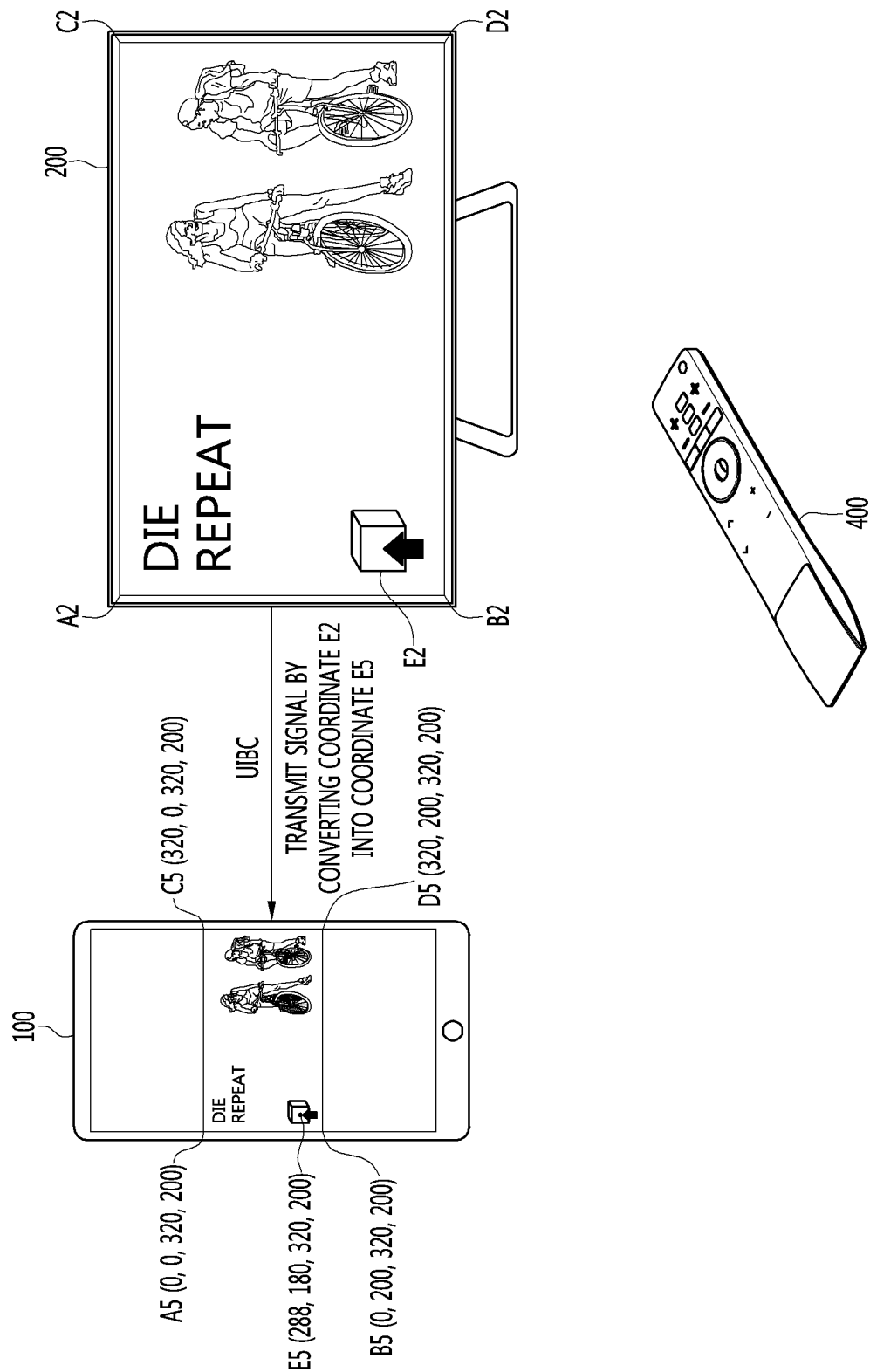

As shown in FIG. 24, when the screen mode of the mobile terminal 100 is changed from a lateral mode to a longitudinal mode while the mobile device 100 and the display device 200 are performing mirroring, all of the coordinate values of the mobile terminal 100 may be newly adjusted. For example, the coordinate value A1 may be converted into A5(0, 0, 320, 200), the coordinate value B1 may be converted into B5(0, 200, 320, 200), the coordinate value C1 may be converted into C5(320, 0, 320, 200), the coordinate value D1 may be converted into D5(320, 200, 320, 200), and the coordinate E1 may be converted into E5(288, 180, 320, 200).

A user watching the video content through the display device 200 may select the control icon to control the video content. The user may transmit, to the display device 200, a control input signal for selecting a control icon displayed at the coordinate point E2 of the display device 200, using the remote control device 400. The control unit 270 of the display device 200 receiving the control input signal for selecting the control icon may control the display device 200 to convert coordinate value E2 into coordinate value E1 by being matched to a coordinate value of the mobile device 100 and transmit the converted coordinate value E1 as a UIBC signal to the mobile terminal 100.

Figure 25:
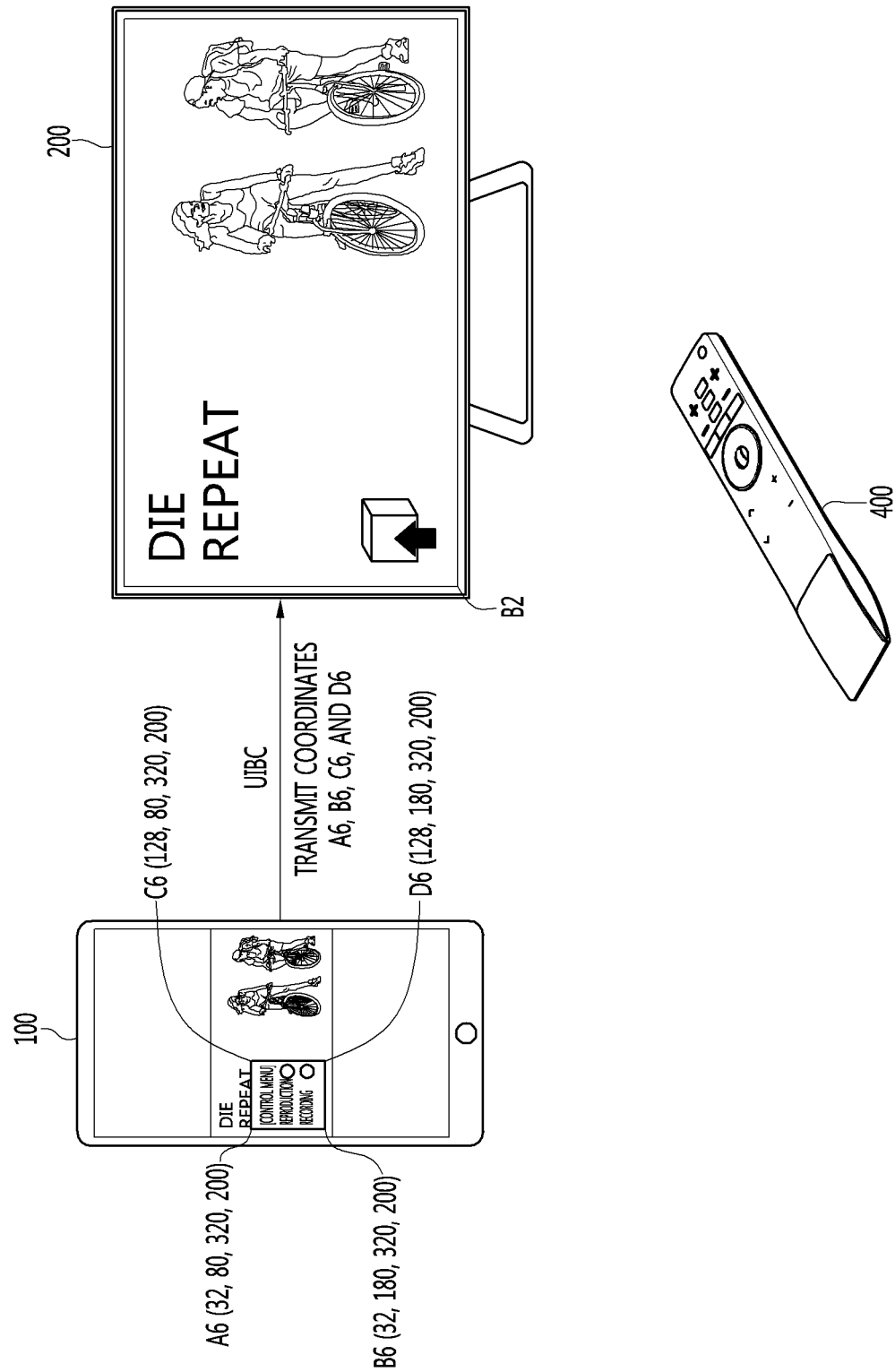

As shown in FIG. 25, the mobile terminal 100 does not receive coordinate value E2 but may receive coordinate value E5 from the display device 200. Therefore, the mobile terminal 100 may perform a control operation of selecting a control icon displayed at a point corresponding to the coordinate value E5. The controller 180 of the mobile terminal 100 may display a control window in a partial area of the display unit 151. It assumed that the left top end of the control window has coordinate A6(32, 80, 320, 200), the left bottom end of the control window has coordinate B6(32, 180, 320, 200), the right top end of the control window has coordinate C6(128, 80, 320, 200), and the right bottom end of the control window has coordinate D6(128, 180, 320, 200). The controller 180 of the mobile terminal 100 may transmit a signal for displaying the control window at coordinate points A6, B6, C6, and D6 to the display device 200 through the UIBC.

Figure 26:
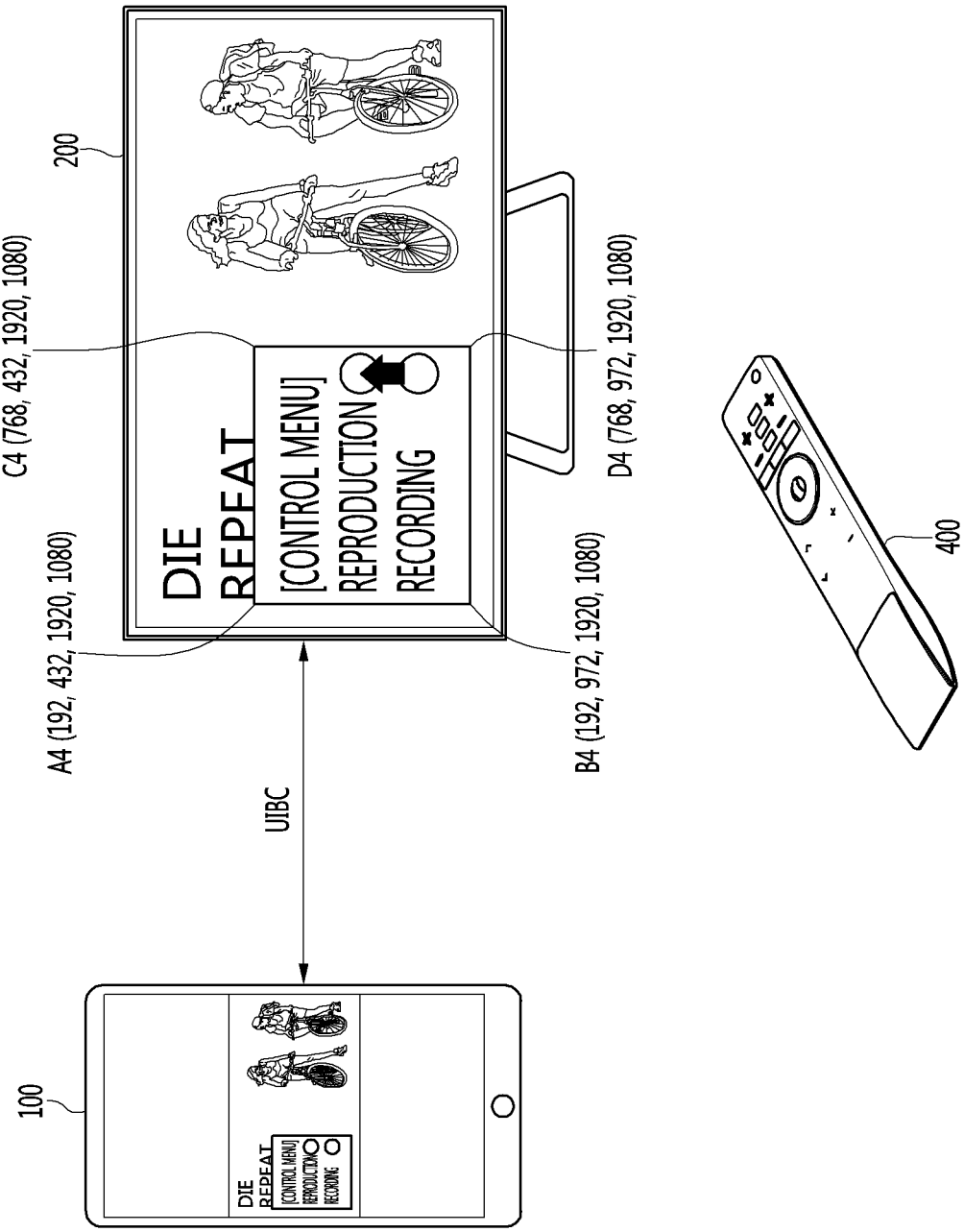

As shown in FIG. 26, the control unit 270 of the display device 200, which receives the coordinate values of the control window from the mobile terminal 100, may convert coordinate values A6, B6, C6, and D6 to correspond to the display unit 280 of the display device 200. For example, the coordinate value A6 may be converted into coordinate value A4(192, 432, 1920, 1080), the coordinate value B6 may be converted into coordinate value B4(192, 972, 1920, 1080), the coordinate value C6 may be converted into coordinate value C4(768, 432, 1920, 1080), and the coordinate value D6 may be converted into coordinate value D4(768, 972, 1920, 1080). The control unit 270 of the display device 200 may control the display device 200 to display the control window at a place corresponding to the converted coordinates A4, B4, C4, D4.

As described in FIGS. 23 to 26, the user can watch an image or picture of the mobile terminal to be optimized in the display device through the mirroring technique, and simultaneously, can easily control the mobile terminal even when a screen of the mobile terminal is changed.

FIGS. 27 to 30 are views illustrating a third embodiment in which the display device of the present disclosure transmits a control input signal to the mobile terminal using coordinate conversion and UIBC.

Figure 27:
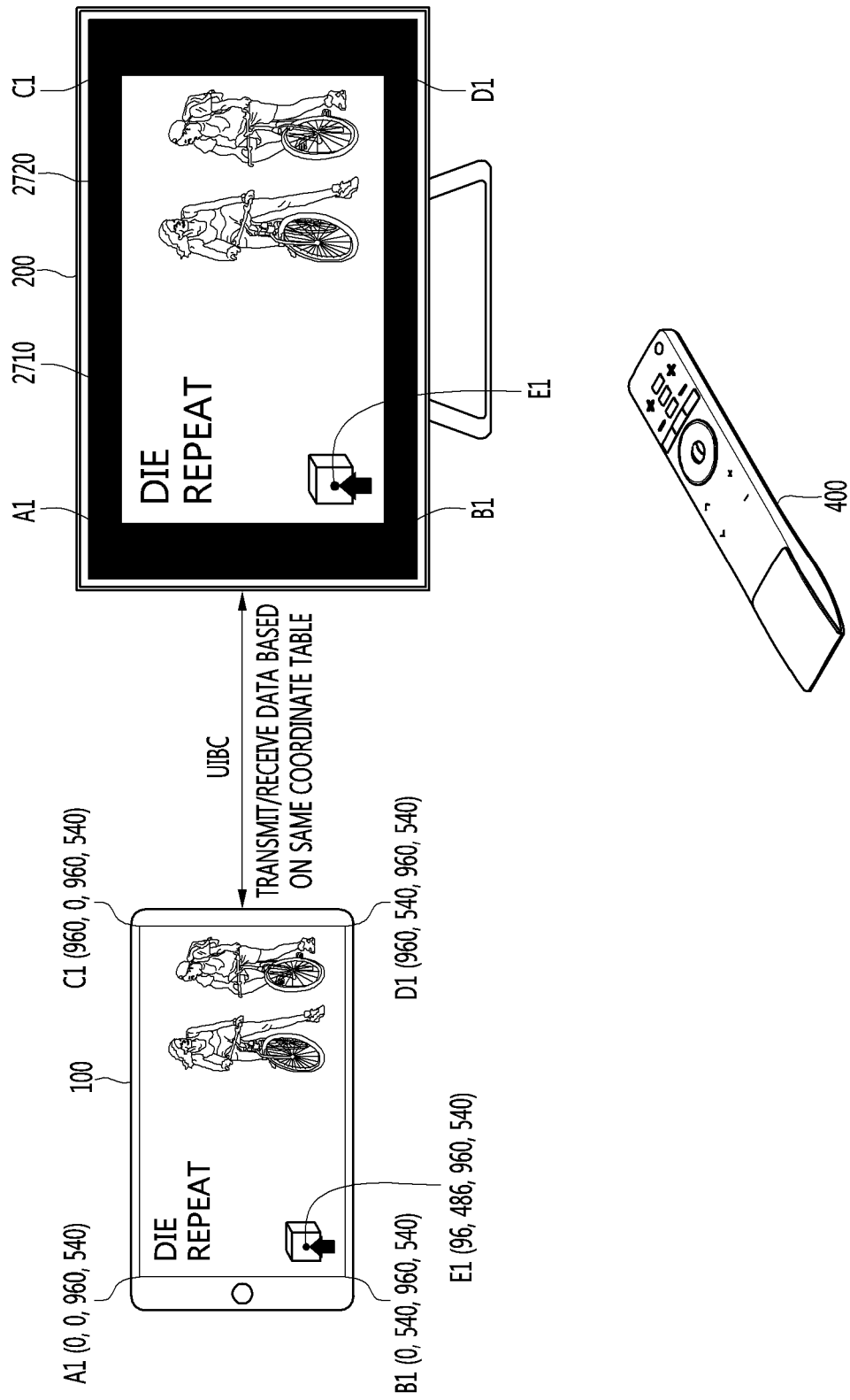
FIGS. 27 to 30 are views illustrating a third embodiment in which the display device of the present disclosure transmits a control input signal to the mobile terminal using coordinate conversion and UIBC.

As shown in FIG. 27, the display device 200 according to the embodiment may transmit/receive video data and/or audio data by performing data communication with the mobile terminal 100. In addition, an image or picture displayed in the mobile terminal 100 may be identically displayed in the display device 200 through mirroring. As described above, the control unit 270 of the display device 200 may receive a user input signal from the remote control device 400. When the user input signal is a control signal, the control signal may be transmitted to the mobile terminal 100 through the UIBC.

In addition, the control unit 270 of the display device 200 according to the embodiment may process video data to have the same resolution as the mobile terminal 100 and have the same coordinate table as the mobile terminal 100, and display the processed video data on the display unit 280. For example, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080). At this time, the control unit 270 of the display device 200 of this embodiment may control the display device 200 to identically display a video content received from the mobile terminal 100 at the coordinates A1, B1, C1, and D1 of the display unit 280. In this case, it is assumed that the mobile terminal 100 displays a control icon of a currently displayed video content at coordinate point E1(96, 486, 960, 540), and correspondingly, the display device 200 identically displays a control icon at the coordinate point E1.

As shown in FIG. 27, when the display device 200 is set to display the same screen while performing mirroring with the mobile terminal 100, an image area 2710 in which a video content is displayed and a letter box area 2720 may be displayed together on the display unit 280 of the display device 200.

As shown in FIG. 27, when a video content having the same size and resolution as the mobile terminal 100 is displayed in the display device 200, the display device 200 may transmit a control input signal to the mobile terminal 100 without any process of performing coordinate conversion on a pointer coordinate of the remote control device 400 and the control input signal.

Figure 28:
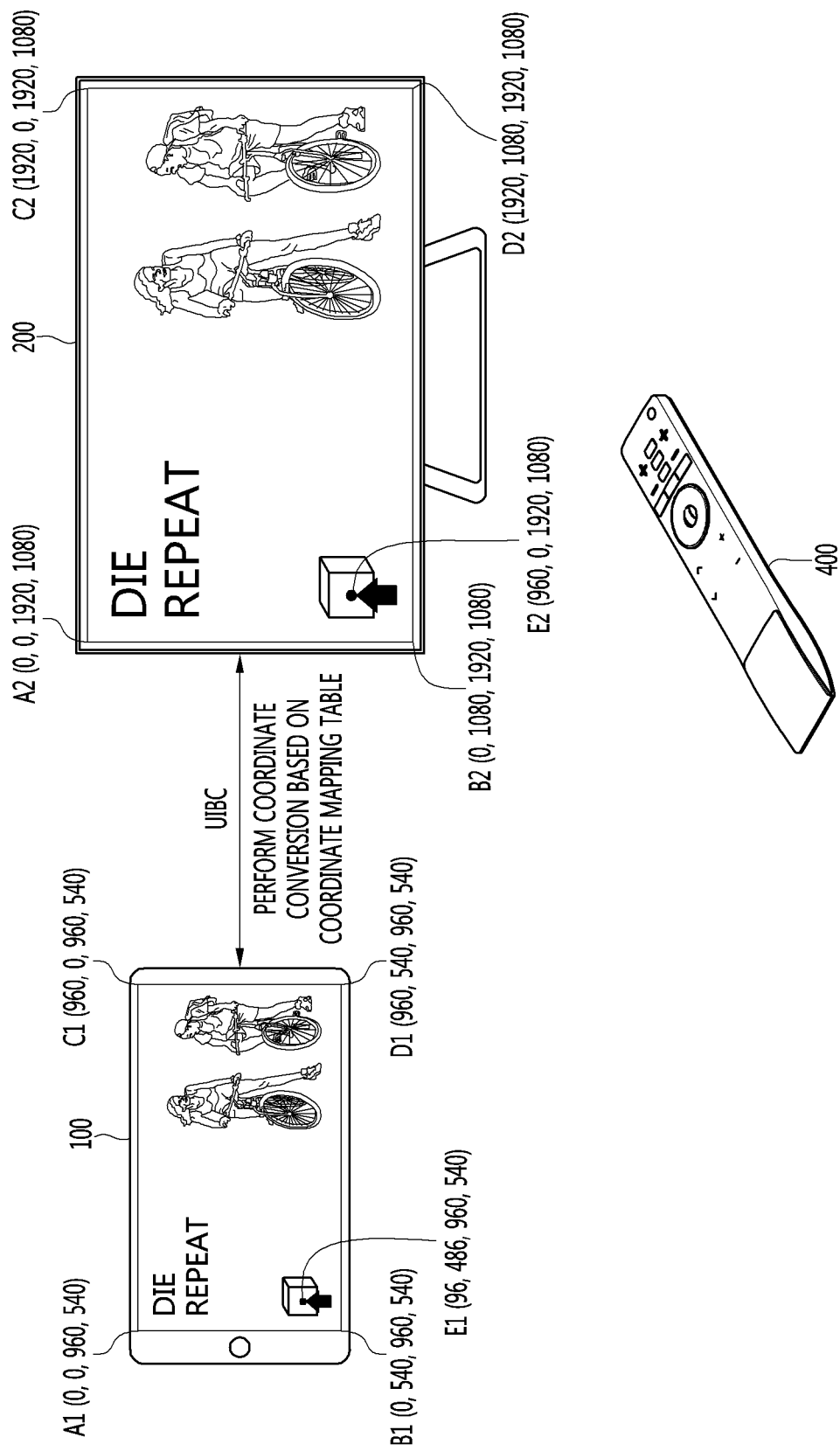

On the other hand, as shown in FIG. 28, the control unit 270 of the display device 200 according to the embodiment deletes the letter box area 2720 of FIG. 27, and may control the display device 280 to display a video content in the entire area of the display unit 280. In this case, unlike the embodiment of FIG. 27, a coordinate table for the video content of the mobile terminal 100 and a coordinate table for the video content of the display device 200 may be different from each other. For example, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080).

In this case, it is assumed that the mobile terminal 100 displays a control icon of a currently displayed video content at coordinate point E1(96, 486, 960, 540), and correspondingly, the display device 200 displays the same control icon at coordinate point E2(192, 972, 1920, 1080).

When as described in of FIG. 28, the coordinate table of the mobile terminal 100 and the coordinate table of the display device 200 are different from each other, the control unit 270 of the display device 200 may generate and store a first coordinate mapping table obtained by mapping the coordinate table of the mobile terminal 100 and the coordinate table of the display device 200.

A user watching the video content through the display device 200 may select the control icon to control the video content. The user may transmit, to the display device 200, a control input signal for selecting a control icon displayed at the coordinate point E2 of the display device 200, using the remote control device 400. The control unit 270 of the display device 200 receiving the control input signal for selecting the control icon may control the display device 200 to convert coordinate value E2 into coordinate value E1 by being matched to a coordinate value of the mobile device 100, based on the coordinate mapping table, and transmit the converted coordinate value E1 as a UIBC signal to the mobile terminal 100.

Figure 29:
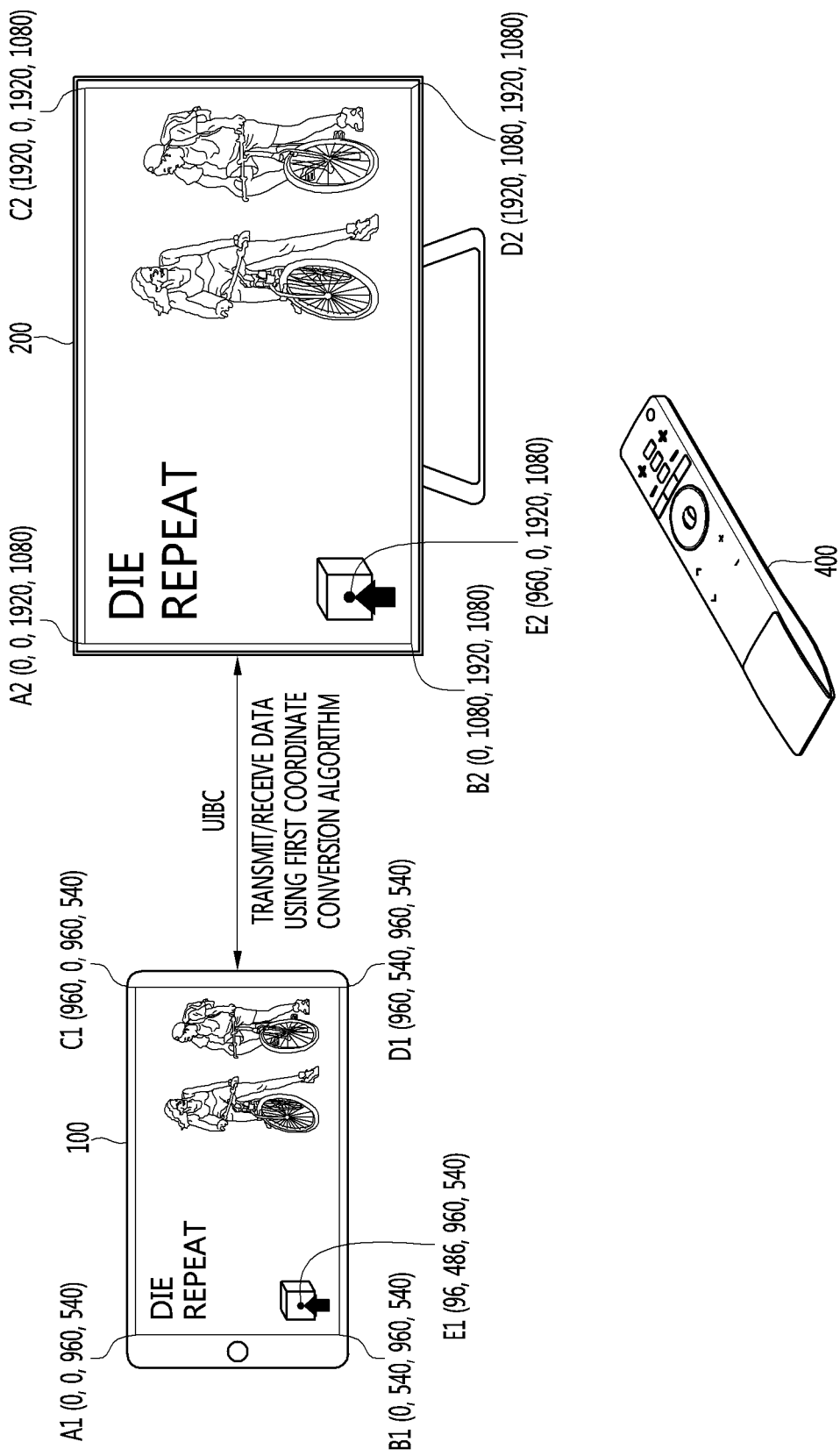

As shown in FIG. 29, when video data is received from the mobile terminal 100 through mirroring, the control unit 270 of the display device 200 may immediately generate and store a first coordinate mapping table obtained by mapping a first coordinate table of the mobile terminal 100 and a second coordinate table of the display device 200. Thus, unlike FIG. 27, the control unit 270 of the display device 200 can display a video content on the display unit 280 under a new resolution and coordinate table environment in a state in which there is no letter box area 2720.

Figure 30:
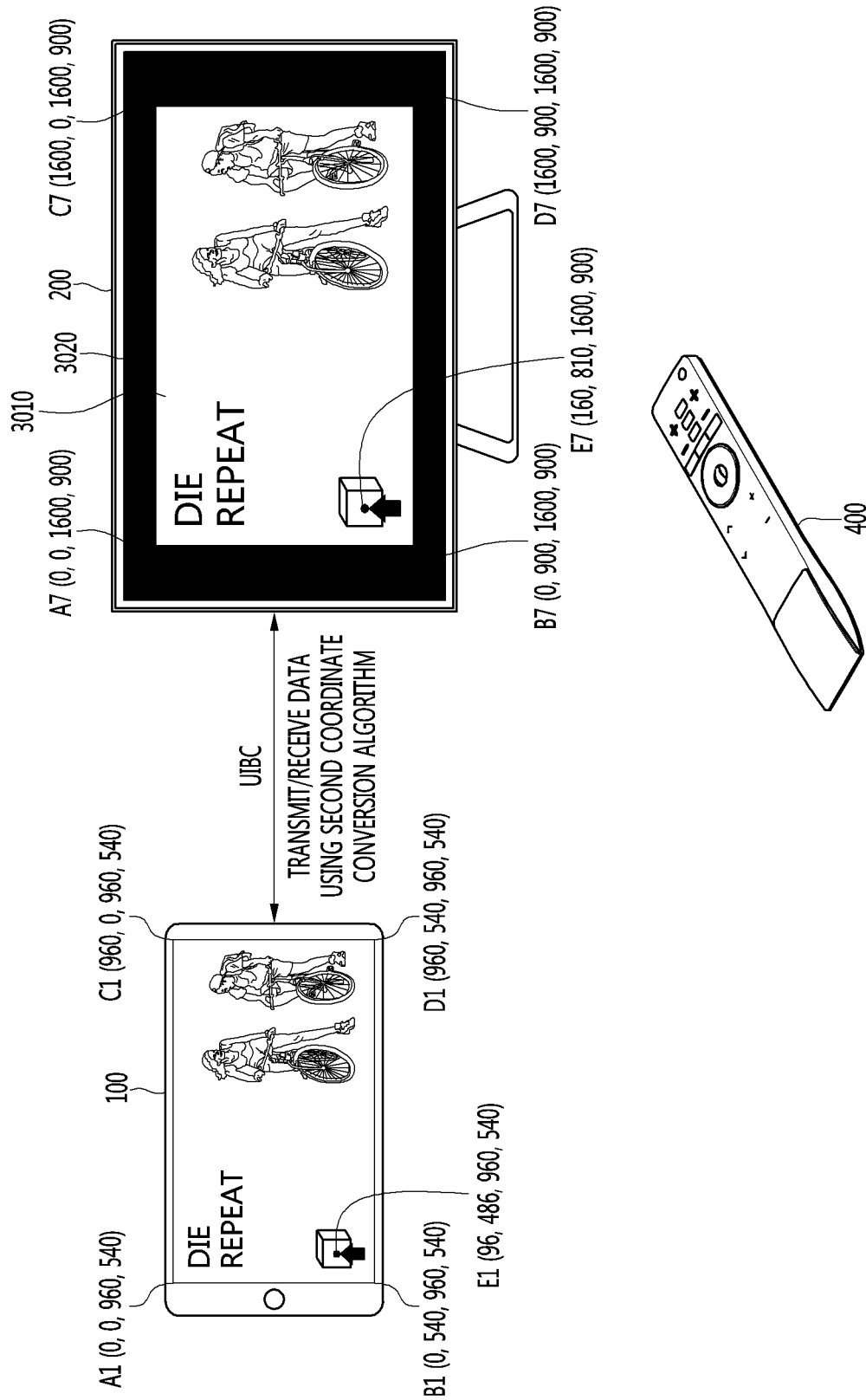

On the other hand, as shown in FIG. 30, the user may input a control signal for changing a resolution of the video content to the display device 200 through the remote control device 400 or the like. When the control signal for changing the resolution is received, the control unit 270 of the display device 200 may control the display device 200 to process the video data to have a new resolution and a third coordinate table and display the processed video data on the display unit 280. In this case, similarly to the embodiment of FIG. 27, the control unit 270 of the display device 200 may display an image area 3010 in which the video content is displayed and a letter box area 3020 on the display unit 280. In this situation, when a control input signal is received from the user, the control unit 270 of the display device 200 may control the display device 200 to finally transmit the control input signal of the user to the mobile terminal 100 through UIBC communication by performing the coordinate conversion algorithm once based on a coordinate mapping table of the second coordinate table and the third coordinate table and then performing the coordinate conversion algorithm twice based on a coordinate mapping table of the first coordinate table and the second coordinate table. In addition, the control unit 270 of the display device 200 may control the display device 200 to transmit the control input signal of the user to the mobile terminal 100 through the UIBC communication by newly generating a coordinate mapping table of the first coordinate table and the third coordinate table and performing the coordinate conversion algorithm only once.

Figure 31:
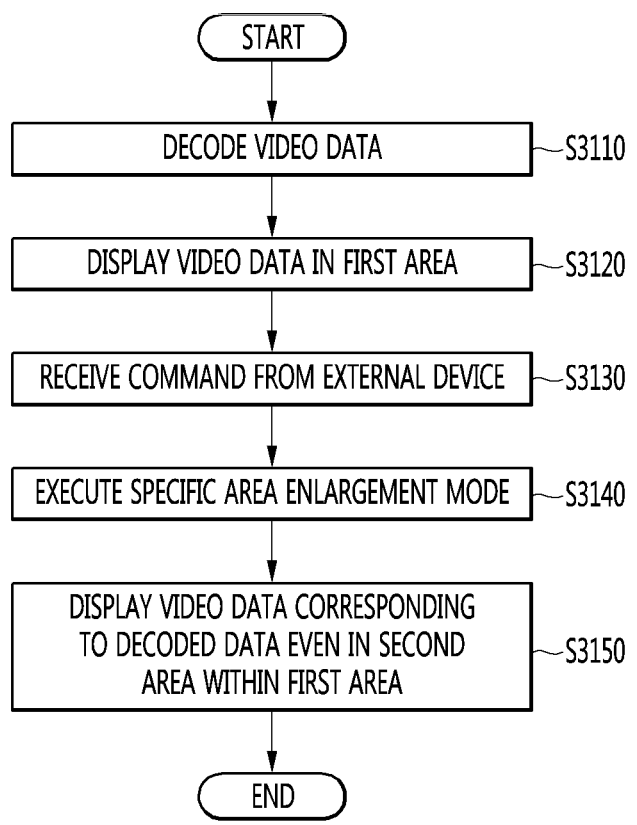
FIG. 31 is a flowchart illustrating a control method of the display device according to an embodiment.

FIG. 31 is a flowchart illustrating a control method of the display device according to an embodiment.

The display device according to the embodiment may decode video data that is received from the outside or stored in a memory (S3110), display the decoded video data in a first area (S3120), and receive at least one command from an external device (S3130).

Further, the display device may execute a specific area enlargement mode in response to at least one command received from the external device (S3140), and display video data corresponding to the decoded data even in a second area within the first area (S3150).

In addition, the second area includes an indicator, and the video data displayed in the first area may be changed according to at least one of the position and size of the indicator.

FIG. 32 is a view illustrating a case where the display device activates the specific area enlargement mode according to an embodiment.

As shown in an upper left drawing 3210, when a command for activating the specific area enlargement mode is received from an external remote controller 3240 through a communication module or the like, the control unit 270 may display, in the first area 3210, a notification message 3212 notifying that the specific area enlargement mode has been activated and a pointer 3214 capable of selecting a specific point to be enlarged.

When a command for specifying a specific point to be enlarged in the first area 3210 using the pointer received from the external remote controller 3240 through the communication module, the control unit 270 may specify an area including the specific point corresponding to the command, enlarge the area including the specified specific point, and display the enlarged area including the specific point.

As shown in an upper right drawing 3220 of FIG. 32, when a command for non-activating the specific area enlargement mode from the external remote controller 3240 through the communication module, the control unit 270 may display a notification message 3222 notifying that the specific area enlargement mode has been non-activated, and a pointer 3224 capable of selecting a specific point may be designed to disappear in the drawing 3220.

As shown in a lower left drawing 3230 of FIG. 32, the control device 270 may receive a command for selecting a specific portion of the first area using a pointer 3234 from the external remote controller 3240 through the communication module, and display in advance a specific area 3232 to be enlarged corresponding to the received command. Thus, a user can identify in advance which area is to be enlarged.

FIG. 33 is a view illustrating a state in which a pointer shape is changed when the display device activates the specific area enlargement mode according to an embodiment.

As shown in FIG. 33, if a specific area mode 3340 is activated by receiving a command from an external remote controller 3330, the control unit 270 may change the pointer shape from the original shape (first graphic image) to another shape (second graphic image).

For example, if an enlargement ratio is increased in the specific area enlargement mode, the control unit 270 may change the pointer shape from the original shape to a "+" shape 3320.

If the enlargement ratio is decreased in the specific area enlargement mode, the control unit 270 may change the pointer shape to a "−" shape.

Thus, according to the embodiment, if the specific area enlargement mode is activated, the pointer shape is changed to a magnifying glass shape. As the enlargement ratio is increased or decreased, the pointer shape is differently changed, so that the user can intuitively identify whether the display device has entered into the specific area enlargement mode and whether the enlargement ratio has been increased, thereby improving user convenience.

Figure 34:
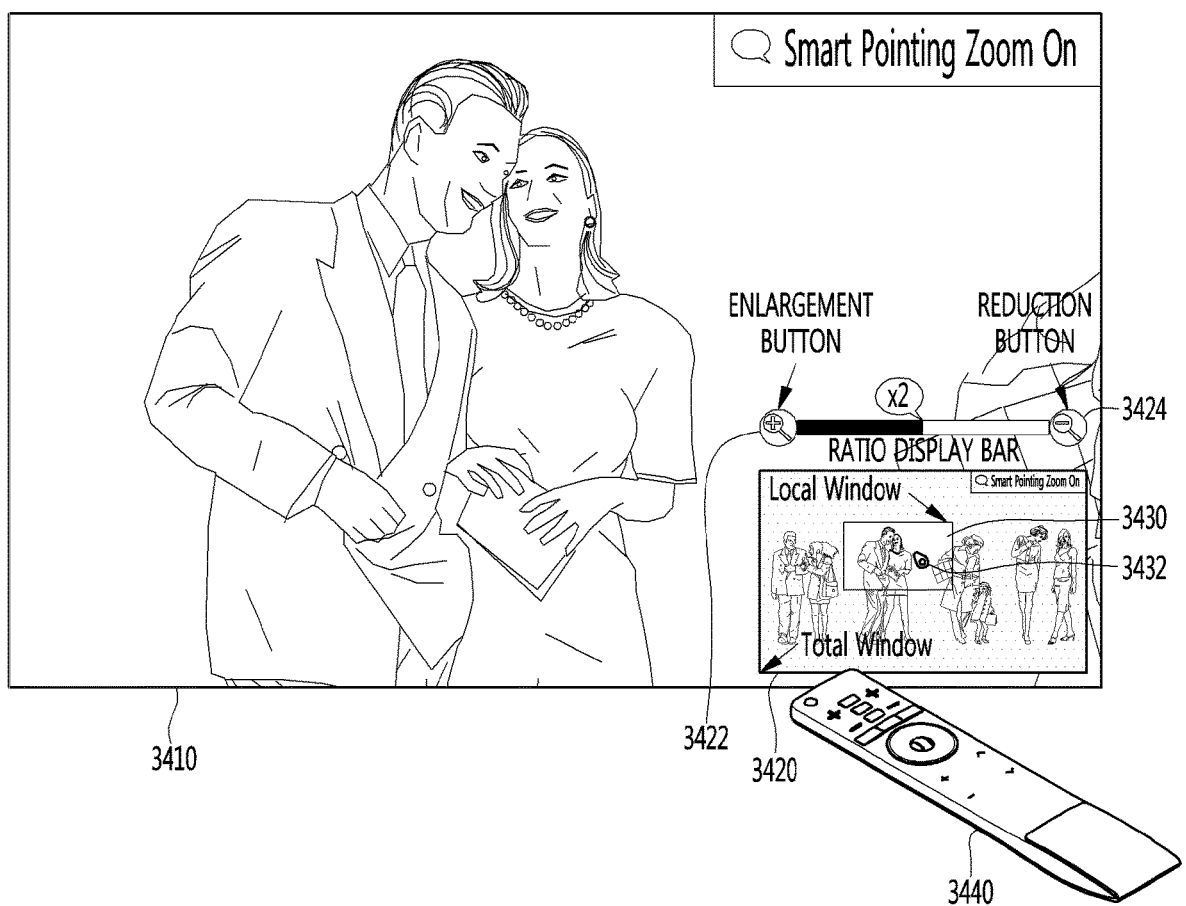
FIG. 34 is a view illustrating a state in which a screen is controlled when the display device activates the specific area enlargement mode according to an embodiment.

FIG. 34 is a view illustrating a state in which a screen is controlled when the display device activates the specific area enlargement mode according to an embodiment. It will be apparent that, for convenience, the "specific area enlargement mode" may be simply referred to as an "enlargement mode."

First, the display device according to the embodiment may display a content on a main screen 3410 and enter into the enlargement mode according to an enlargement input request received from a remote controller 3440.

The display device may display a window 3420 including the displayed content, and display an indicator 3430 for selecting a specific area of the displayed content within the displayed window 3420.

The display device is designed to enlarge the selected specific area of the displayed content and display the enlarged specific area of the displayed content on the main screen 3410. The content may correspond to, for example, a moving picture.

It will be apparent that, for convenience, the main screen 3410 and the window 3420 may be referred to as first and second areas, respectively. The shape or size of the window 3420 is not particularly limited.

More specifically, for example, if an input signal (e.g., an OK button) is received from the remote controller 3440 for a preset time or more while video data included in a broadcast signal is being output on the main screen 3410, the video data is also displayed on the window 3420. When the specific area enlargement mode is first executed, the same video data is output on the main screen 3410 and the window 3420. This means that video data displayed on the main screen 3410 is identical to that displayed on the window 3420, but a size of the video data displayed on the main screen 3410 is different from that of the video data displayed on the window 3420.

Further, the indicator 3430 is displayed on the window 3420, and is used to select a specific area to be enlarged by a user. For example, the indicator 3430, as shown in FIG. 34, may be implemented as a graphic image of a guide box for guiding a specific area that is to be enlarged or has already been enlarge. However, it is obvious that a graphic image having another shape may be employed.

In addition, the window 3420 may be referred to as a total window, and the indicator 3430 may be referred to as a local window. The display device enlarges an area specified by the indicator 3430 and outputs the enlarged area on the main screen 3410. This will be briefly described. When the display device first enters into the specific area enlargement mode, the display device is outputting original video data on the main screen 3410. Then, if a specific area to be enlarged is selected using the window 3420 and the indicator 3430, the display device displays, on the main screen 3410, video data obtained by enlarging the specific area, instead of the original video data. Further, for example, the display device may be designed such that the position of the indicator 3430 is changed as the position of a pointer 3432 is changed. In addition, for example, if the specific area to be enlarged is specified after the specific area enlargement mode is executed, the original video data is displayed with 1 magnification on the window 3420, but the size of the original video data is reduced. Further, instead of the original video data, video data obtained by enlarging (with over 1 magnification, e.g., 1.2 magnifications, 1.5 magnifications, or 2.0 magnifications) the specific area may be displayed on the main screen 3410.

For example, the control unit 270 of the display device 200 controls the brightness of an internal area of the indicator 3430 within the window 3420 to be bright and controls the brightness of an external area of the indicator 3430 to be dark, so that the user can easily identify a specific area to be enlarged.

In addition, a ratio display bar including enlargement and reduction buttons for changing a screen enlargement ratio exists in the main screen 3410. If a command for selecting any one of a reduction button 3422 and an enlargement button 3424 using the pointer 3432 is received from the remote controller 3440, the control unit 270 controls the size of the indicator 3430 at a preset ratio, corresponding to the received command. The control unit 270 differently changes the shape of the pointer 3432 depending on the command for selecting any one of the reduction button 3422 and the enlargement button 3424. The ratio display/control bar including the reduction button 3422 and the enlargement button 3424 may be referred to as a second indicator to be distinguishable from the above-described indicator 3430.

Here, the minimum value of a ratio according to selection of the reduction button 3422 may be 1 magnification, and the maximum value of a ratio according to selection of the enlargement button 3424 may be 5 magnifications. Here, the maximum value of the enlargement ratio is not limited to 5 magnifications, and may be adjusted. When the enlargement ratio is less than 1 magnification, an image displayed on a screen is reduced.

For example, if a command for selecting the reduction button 3422 is received, the control unit 270 may change the shape of the pointer from the original shape 3432 from a "−" shape. If a command for selecting the enlargement button is received, the control unit 270 may change the shape of the pointer from the original shape 3432 to a "+" shape.

Further, the window 3420 may be implemented as a picture in picture (PIP) screen, and the size of the PIP screen is designed to be adjustable.

For example, if a command for moving the PIP screen from a first point to a second point different from the first point in a state in which an edge portion or corner portion of the PIP screen is clicked and the clicked state is maintained is received from an external device (e.g., the remote controller), the control unit 270 may adjust the size of the PIP screen.

In addition, the control unit 270 may change the position of the PIP screen.

For example, if a command for moving the PIP screen from a first point to a second point different from a first point within a first area in a state in which the first point of the PIP screen is clicked using the pointer and the clicked state is maintained is received from the external remote controller, the control unit 270 may change the position of the PIP screen. The PIP screen described herein corresponds to the window 3420 shown in FIG. 34.

For example, if the window 3420 is continuously shown, it may be inconvenient for the user to watch video data that is being reproduced. Therefore, after a preset time (e.g., 3 seconds) elapses, the control unit 270 may change the state of the window and the indicator to a hidden state. If a preset command is received from the external device 3440, the control unit 270 may again display the window and the indicator on the PIP screen.

If the pointer 3432 is located at any one of a right boundary line, a left boundary line, an upper boundary line, and a lower boundary line of the window 3420, the control unit 270 may change the state of the window and the indicator to the hidden state. If a specific command is received from the external device 3440, the control unit 270 may again display the window 3420 on the PIP screen within the main screen 3410.

The control unit 270 may move the indicator 3430 using the pointer 3432, and the video data displayed on the main screen 3410 may be changed as the position of the indicator 3430 is changed. For example, video data in an area specified by the indicator 3430 and video data enlarged to be displayed on the main screen 3410 are the same, and only their sizes are different from each other (when comparing the main screen 3410 and the indicator 3430 of FIG. 34, it is obvious to those skilled in the art). More specifically, for example, when the indicator 3430 in the window 3420 includes only a specific object, video data including only the specific object is displayed on the main screen 3410. In this case, only the size of the video data in the main screen 3410 is enlarged as compared with the video data in the indicator 3430.

Thus, the changed position and size of the indicator 3430 are displayed in real time, so that the user can more rapidly identify the enlarged specific area in the original video data.

In summary, if the specific area enlargement mode is executed, the original video data is output on both of the main screen 3410 and the window 3420. However, the video data having only a reduced size is displayed on the window 3420.

In order to enlarge a specific area, the pointer 3432 may be located in the main screen 3410 or located in the window 3420. The specific area to be enlarged is confirmed using the pointer 3432 as a center point.

However, if the specific area to be enlarged is confirmed, video data obtained by enlarging the specific area, instead of the original video data, is displayed. Further, the enlarged video data displayed on the main screen 3410 may be returned to the original data due to enlargement ratio control, or the like. After the original video data is again displayed on the main screen 3410, a specific area to be enlarged may be newly specified by selecting a specific point in the main screen 3410. It will be apparent that a specific area to be enlarged may be newly specified using the indicator 3430 in the window 3420.

Further, when the enlargement/reduction magnification of video data obtained by enlarging a specific area is controlled while the video data is being output on the main screen 3410, the size of the indicator 3430 in the window 3420 is designed to be automatically changed. Thus, the user can easily identify, in real time, to which portion in the window 3420 video data enlarged or reduced in the main screen 3410 corresponds.

The second indicator 3422 and 3424 shown in FIG. 34 is used to set an enlargement level. Further, a content output on the main screen 3410 may be received through a tuner or received through an external device. The external device may correspond to, for example, at least one of an STB, a PC, and a cellular phone.

The size of the indicator 3430 is automatically changed based on an enlargement level selected through the second indicator 3422 and 3424.

Further, although not shown in FIG. 31, another embodiment including a step of receiving a first enlargement level for enlarging the displayed content, a step of displaying the enlarged indicator having a first display size, based on the received first enlargement level, a step of receiving a second enlargement level for enlarging of the displayed content, and a step of displaying the enlarged indicator having a second display size different from the first display size, based on the received second enlargement level, may be implemented with reference to FIG. 34.

The window 3420 includes, for example, a PIP window.

It will be apparent that the window 3420 may be moved in the main screen 3410. Also, it will be apparent that the indicator 3430 may be moved in the window 3420 so as to select another specific area of a content displayed on the window 3420.

The indicator 3430 is moved in response to a signal of the pointer 3432, which is received from the remote controller 3440, and the size of the indicator 3430 is changed depending on a wheel signal received from the remote controller 3440.

While the size of the indicator 3430 is increased based on the enlargement level decreased by the reduction button 3422, the size of the indicator 3430 is decreased based on the enlarged level increased by the enlargement button 3424.

The indicator 3430, for example, may be implemented as a graphic image of a guide box for guiding a specific area that is to be enlarged or has already been enlarged.

The present disclosure may further include a step of changing coordinate information of the pointer moved along a motion of the remote controller, based on video data of a content output on the main screen of FIG. 34. For example, the present disclosure may further include a step of applying a scaling of 0.66 time to the coordinate information of the pointer when the resolution information of the video data of the content corresponds to high definition (HD), a step of applying a scaling of 1 time to the coordinate information of the pointer when the resolution information of the video data of the content corresponds to full high definition (FHD), and a step of applying a scaling of 2 times to the coordinate information of the pointer when the resolution information of the video data of the content corresponds to ultra high definition (UHD).

If a preset time elapses after the enlargement mode is executed or if at least one command is received from the remote controller 3440, the control unit 270 controls both of the window 3420 and the indicator 3430 to be disappeared.

After both of the window 3420 and the indicator 3430 are disappeared, a graphic image for guiding that the enlargement mode is being executed is displayed. The graphic image includes information representing an enlargement magnification. The window 3420 and the indicator 3430 are again displayed based on a command for selecting the graphic image.

Figure 35:
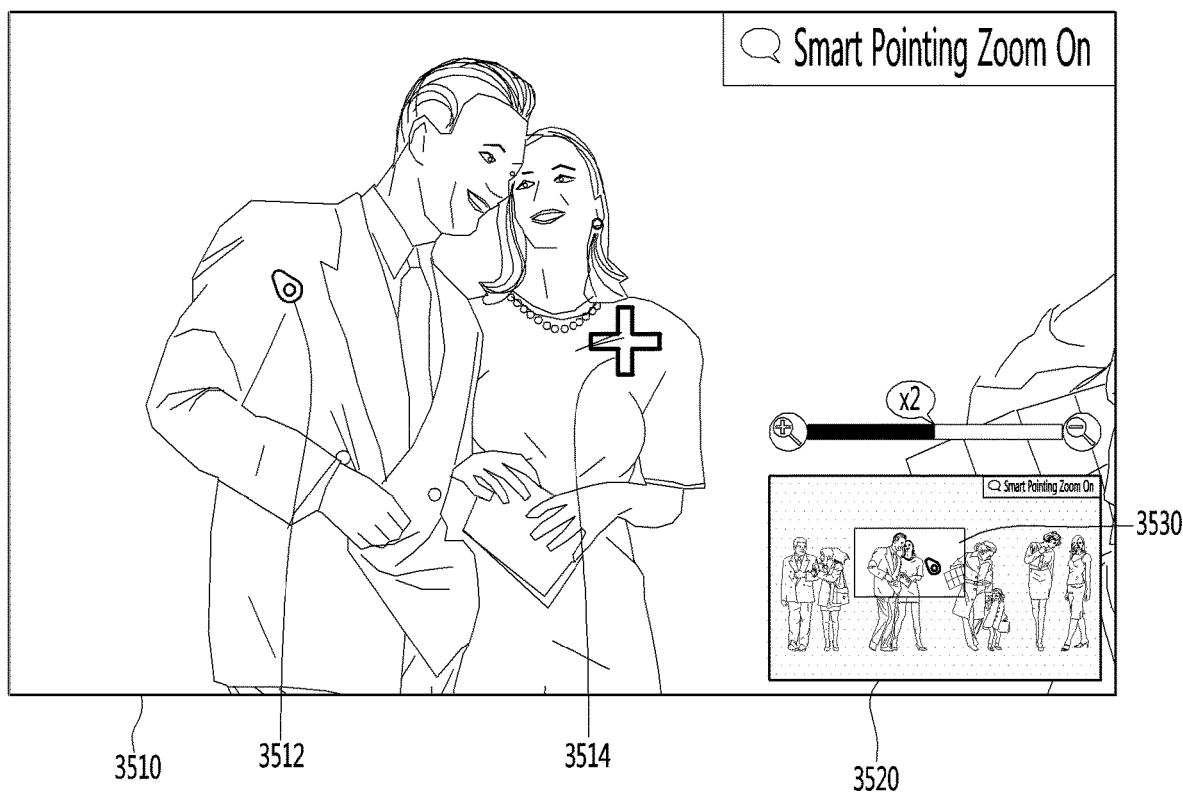
FIG. 35 is a view illustrating in a state in which a specific point of an enlarged screen is moved using a pointer when the display device activates the specific area enlargement mode according to an embodiment

FIG. 35 is a view illustrating in a state in which a specific point of an enlarged screen is moved using a pointer when the display device activates the specific area enlargement mode according to an embodiment.

As shown in FIG. 35, a command for selecting a specific point 3512 of the entire screen using a pointer is received from an external device in a state in which an area specified by an indicator 3530 is displayed as the entire screen in a first area 3510, the control unit 270 moves the center point of the area specified by the indicator 3530 from an existing center point 3514 to the specific point 3512, generates a new enlargement area based on the specific point 3512, and displays the generated new enlargement area as the entire screen.

Further, according to another embodiment, the center point of a specific area to be enlarged in a second area 3520 may be selected, or the center point of a specific area to be enlarged in the first area 3510 may be selected. When the center point of the specific area to be enlarged in the first area 3510 is selected, a user can minutely control the enlargement area. When the center point of the specific area to be enlarged in the second area 3520 is selected, the user can change the specific area while entirely identifying the original video data.

FIG. 36 is a view illustrating a state in which a screen is controlled using a remote control device when the display device activates the specific area enlargement mode according to an embodiment.

As described above, the display device (TV or STB) according to the display device is controlled by an external device, and the external device corresponds to a remote controller or a mobile device. In FIG. 36, a remote controller is illustrated as an example of the external device, but the scope of the present disclosure is not limited to only the remote controller.

According to the embodiment, an external remote controller 3640 includes a wheel key 3642, a direction key 3644, and a volume key 3646. If a specific command corresponding to a manipulation of the wheel key 3642 is received from the external remote controller 3640, the control unit 270 controls a screen enlargement ratio according to the manipulation of the wheel key 3642.

For example, if a specific command corresponding to an input for rotating a wheel in an upper direction of the wheel key 3642 is received from the external remote controller 3640, the control unit 270 increases the screen enlargement ratio. If a specific command corresponding to an input for rotating the wheel in a lower direction of the wheel key 3642 is received from the external remote controller 3640, the control unit 270 decreases the screen enlargement ratio.

A user may change the screen enlargement ratio to be 1 to 5 times using the wheel key, and the screen enlargement ratio may be changed by every 0.2 time as the wheel key is moved by every 1 unit. The screen enlargement ratio is not fixed but may be changed through a user setting.

If a specific command corresponding to a manipulation of the volume key 3646 is received from the external remote controller 3640, the control unit 270 controls the screen enlargement ratio according to the manipulation of the volume key 3646.

For example, if a specific command corresponding to portion "+" of the volume key 3646 is received from the external remote controller 3640, the control unit 270 increases the screen enlargement ratio. If a specific command corresponding to portion "−" of the volume key 3646 is received from the external remote controller 3640, the control unit 270 decreases the screen enlargement ratio.

If a specific command corresponding to a manipulation of the direction key 3644 is received, the control unit 270 moves the center point of an area specified by an indicator 3630 from an existing center point to a specific point according to the manipulation of the direction key 3644, generates video data enlarged based on the specific point, and displays the generated video data in a first area 3610.

When the enlargement ratio and position of a specific area are changed using keys of an external remote controller, the position and size of the indicator 3630 in a second area 3620 corresponding to a PIP screen are also changed. According to another embodiment, an external remote controller 3650 includes a volume key 3656, a channel key 3652, and a touch pad 3654. It will be apparent that the external remote controller 3650 may be controlled by a motion sensor or a voice recognition sensor.

If a specific command corresponding to a manipulation of the volume key 3656 is received from the external remote controller 3650, the control unit 270 controls the screen enlargement ratio according to the manipulation of the volume key 3656.

For example, if a specific command corresponding to an upper directional portion of the volume key 3656 is received from the external remote controller 3650, the control unit 270 increases the screen enlargement ratio. If a specific command corresponding to a lower directional portion of the volume key 3656 is received from the external remote controller 3650, the control unit 270 decreases the screen enlargement ratio.

If a specific command corresponding to a manipulation of the channel key 3652 is received from the external remote controller 3650, the control unit 270 controls the screen enlargement ratio according to the manipulation of the channel key 3652.

For example, if a specific command corresponding to an upper directional (UP) portion of the channel key 3652 is received from the external remote controller 3650, the control unit 270 increases the screen enlargement ratio. If a specific command corresponding to a lower directional (DOWN) portion of the channel key 3652 is received from the external remote controller 3650, the control unit 270 decreases the screen enlargement ratio.

If a specific command corresponding to a manipulation of the touch pad 3654 is received from the external remote controller 3650, the control unit 270 moves the center point of an area specified by the indicator 3630 from an existing center point to a specific point according to the manipulation of the touch pad 3654, generates video data enlarged based on the specific point, and displays the generated video data in the first area 3610.

FIGS. 37 to 40 are views illustrating an embodiment in which the display device transmits a control input signal to the mobile terminal in the specific area enlargement mode, using coordinate conversion and UIBC.

Figure 37:
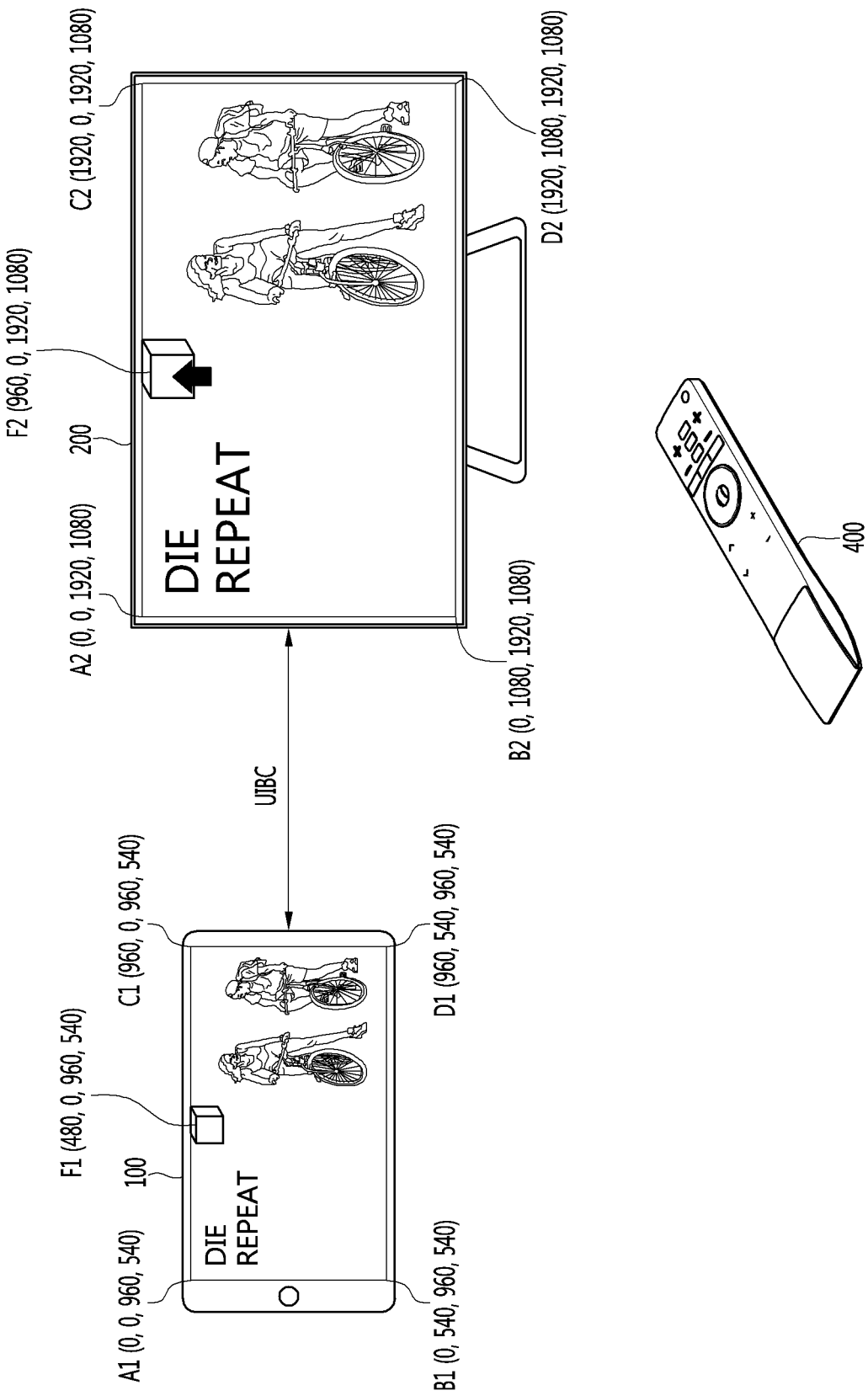
FIGS. 37 to 40 are views illustrating an embodiment in which the display device transmits a control input signal to the mobile terminal in the specific area enlargement mode, using coordinate conversion and UIBC.

As shown in FIG. 37, the display device 200 according to the embodiment may transmit/receive video data and/or audio data by performing data communication with the mobile terminal 100. In addition, an image or picture displayed in the mobile terminal 100 may be displayed, through mirroring, on the entire screen of the display device 200 after a letter box area is removed from the display device 200. As described above, the control unit 270 of the display device 200 may receive a user input signal from the remote control device 400. When the user input signal is a control signal, the control unit 270 of the display device 200 may transmit the control signal to the mobile terminal 100 through the UIBC.

As an example for describing this embodiment, it is assumed that the left top end of the mobile terminal 100 has coordinate A1(0, 0, 960, 540), the left bottom end of the mobile terminal 100 has coordinate B1(0, 540, 960, 540), the right top end of the mobile terminal 100 has coordinate C1(960, 0, 960, 540), and the right bottom end of the mobile terminal 100 has coordinate D1(960, 540, 960, 540). In addition, it is assumed that the left top end of the display device 200 has coordinate A2(0, 0, 1920, 1080), the left bottom end of the display device 200 has coordinate B2(0, 1080, 1920, 1080), the right top end of the display device 200 has coordinate C2(1920, 0, 1920, 1080), and the right bottom end of the display device 200 has coordinate D2(1920, 1080, 1920, 1080).

In this case, it is assumed that the mobile terminal 100 displays a control icon of a currently displayed video content at coordinate point F1(480, 10, 960, 540), and correspondingly, the display device 200 displays the same control icon at coordinate point F2(960, 20, 1920, 1080).

A user watching a video content through the display device 200 may select a control icon to control the video content. The user may transmit, to the display device 200, a control input signal for selecting a control icon displayed at coordinate point F2 of the display device 200, using the remote control device 400. The control unit 270 of the display device 200 receiving the control input signal for selecting the control icon may control the display device 200 to transmit coordinate value F2 as a UIBC signal to the mobile terminal 100. Alternatively, the control unit 270 of the display device 200 may control the display device 200 to generate a coordinate mapping table obtained by mapping a coordinate table of the mobile terminal 100 and a coordinate table of the display device 200, convert the coordinate F2 into the coordinate F1 based on the coordinate mapping table, when a control signal for selecting the coordinate F2 is received, and transmit a control input signal for selecting the coordinate F1 to the mobile terminal 100 through UIBC communication.

Figure 38:
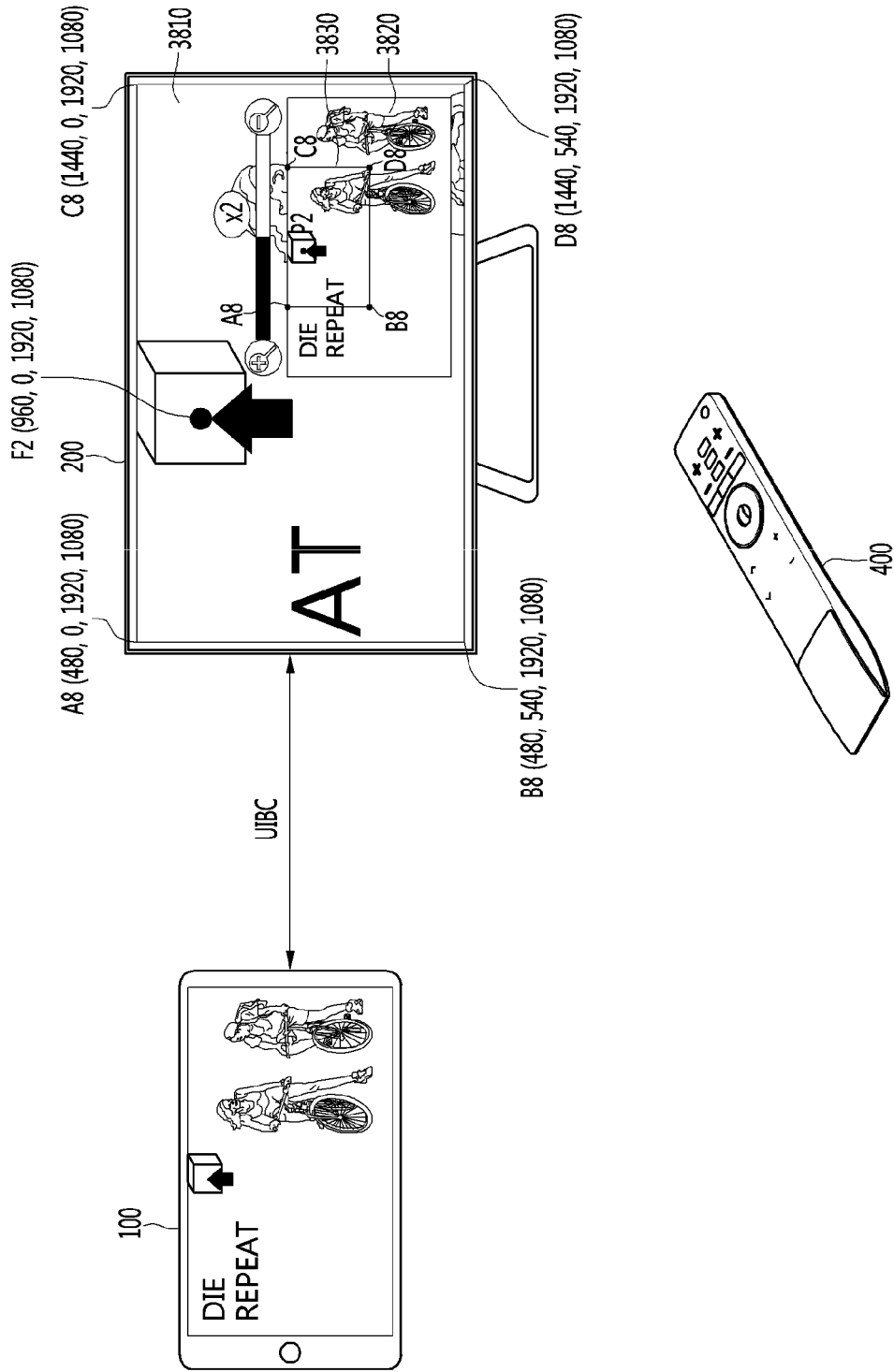

When the specific area enlargement mode is executed, the control unit 270 of the display device 200 according to the embodiment may control the display device 200 to output original video data of an original video content on a window 3820 and, when a specific area to be enlarged is selected using an indicator 3830, display video data obtained by enlarging only a specific area, instead of the original video data, on a main screen 3810. It is assumed that the video data obtained by enlarging the specific area, which is displayed on the main screen 3810 illustrated in FIG. 38 is a specific area of video data selected by the indicator 3830. In this case, the control unit 270 of the display device 200 may set coordinate values of the display device 200 such that the left top end of the display device 200 has coordinate A8(480, 0, 1920, 1080), the left bottom end of the display device 200 has coordinate B8(480, 540, 1920, 1080), the right top end of the display device 200 has coordinate C8(1440, 0, 1920, 1080), and the right bottom end of the display device 200 has coordinate D8(1440, 540, 1920, 1080). That is, the coordinates A8, B8, C8, and D8 are equal to those of the left/right/top/bottom of the indicator 3830 in the window 3820. When a coordinate table is set as described above, the same coordinate table can be used before and after the specific area enlargement mode without any separate coordinate conversion process. Although not shown in FIG. 38, it is obvious that an embodiment in which different coordinate tables are used in the main screen 3810 and the window 3820 by newly setting a coordinate table of the main screen 3810 in the specific area enlargement mode will belong to the scope of the present disclosure.

If the user a signal for selecting a control icon located at the coordinate F2 displayed on the main screen 3810, the control unit 270 of the display device 200 may control the display device 200 to transmit the signal for selecting the control icon located at the coordinate F2 to the mobile terminal 100 through a coordinate conversion process. In addition, the mobile terminal 100 may perform a control operation of selecting a control icon displayed at a point corresponding to coordinate value F1 corresponding to the coordinate F1. The controller 180 of the mobile terminal 100 may display a control window in a partial area of the display unit 151. It is assumed that the left top end of the control window has coordinate A3(96, 216, 960, 540), the left bottom end of the control window has coordinate B3(96, 486, 960, 540), the right top end of the control window has coordinate C3(384, 216, 960, 540), and the right bottom end of the control window has coordinate D3(384, 486, 960, 540). The controller 180 of the mobile terminal 100 may perform a process of converting coordinate values A3, B3, C3, and D3 to correspond to the display device 200. For example, the coordinate value A3 may be converted into coordinate value A4(192, 432, 1920, 1080), the coordinate value B3 may be converted into coordinate value B4(192, 972, 1920, 1080), the coordinate value C3 may be converted into coordinate value C4(768, 432, 1920, 1080), and the coordinate value D3 may be converted into coordinate value D4(768, 972, 1920, 1080). The controller 180 of the mobile terminal 100 may transmit the converted values A4, B4, C4, and D4 as a UIBC signal to the display device 200.

Figure 39:
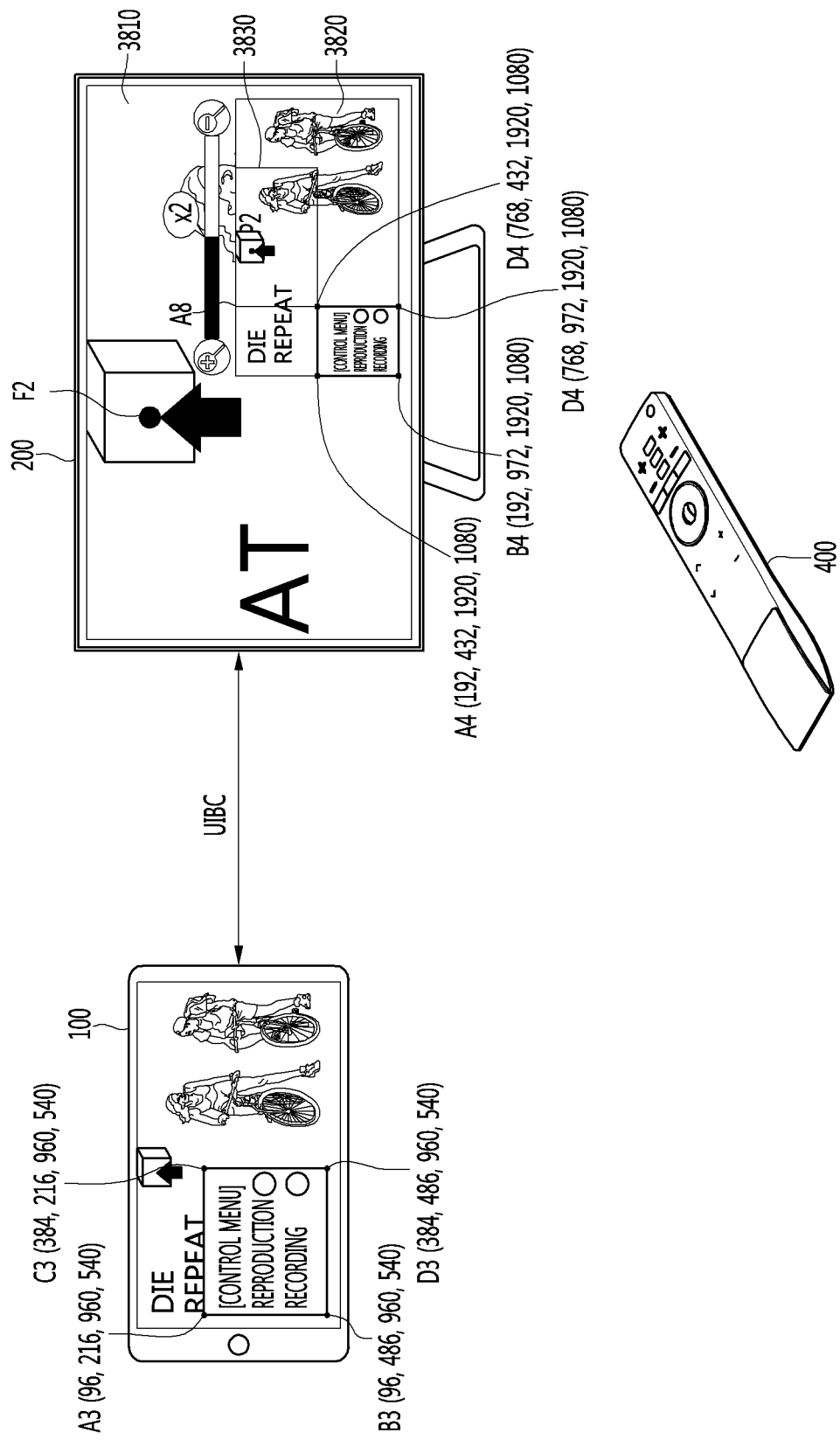

When a control window output signal is received from the mobile terminal 100, the control unit 270 of the display device 200 may control the display device 200 to display the control window at coordinate points A4, B4, C4, and D4 of the window 3820 instead of the main screen 3810. In this case, when the indicator 3830 does not select the control window, the control window may not be displayed on the main screen 3810 as shown in FIG. 39.

Figure 40:
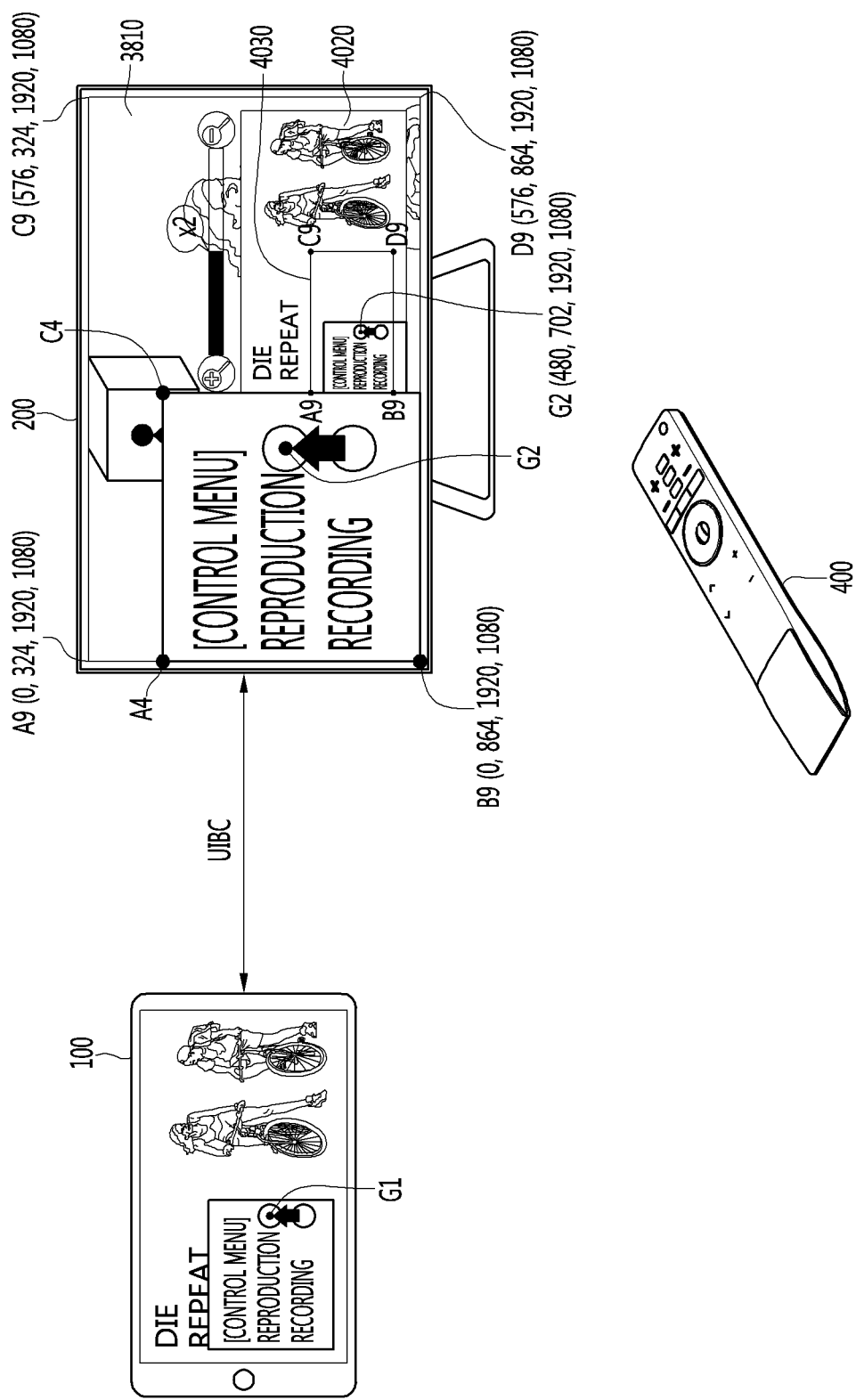

When the user moves an indicator 4030 in a window 4020 to select the control window through the remote control device 400 or the like as shown in FIG. 40, the control unit 270 of the display device 200 may control the indicator 4030 to display video data obtained by enlarging the selected specific area on the main screen 3810. In this case, the control unit 270 of the display device 200 may set coordinate values of the display device 200 such that the left top end of the display device 200 has coordinate A9(0, 324, 1920, 1080), the left bottom end of the display device 200 has coordinate B9(0, 864, 1920, 1080), the right top end of the display device 200 has coordinate C9(576, 324, 1920, 1080), and the right bottom end of the display device 200 has coordinate D9(576, 864, 1920, 1080). That is, the coordinates A9, B9, C9, and D9 are equal to those of the left/right/top/bottom of the indicator 4020 in the window 4020. When a coordinate table is set as described above, the same coordinate table can be used before and after the specific area enlargement mode without any separate coordinate conversion process. Although not shown in FIG. 40, it is obvious that an embodiment in which different coordinate tables are used in the main screen 4010 and the window 4020 by newly setting a coordinate table of the main screen 41010 in the specific area enlargement mode will belong to the scope of the present disclosure.

As shown in FIG. 40, the display device 200 may set a coordinate table of the main screen 4010 and a coordinate table of the window 4020 to have the same value in the specific area enlargement mode. Therefore, when the user inputs a signal for selecting a specific coordinate value (coordinate G2) through the main screen 4010, the control unit 270 of the display device 200 may control the display device 200 to convert coordinated value G2 into coordinate value G1 according to the coordinate mapping table previously generated in FIG. 37 and transmit the converted coordinate value G1 to the mobile terminal 100 through UIBC communication.

As described in FIGS. 37 to 40, the coordinate conversion or the coordinate mapping table is used, so that a signal intended by the user can be transmitted to the mobile terminal without any error even when an image is enlarged through mirroring.

Figure 41:
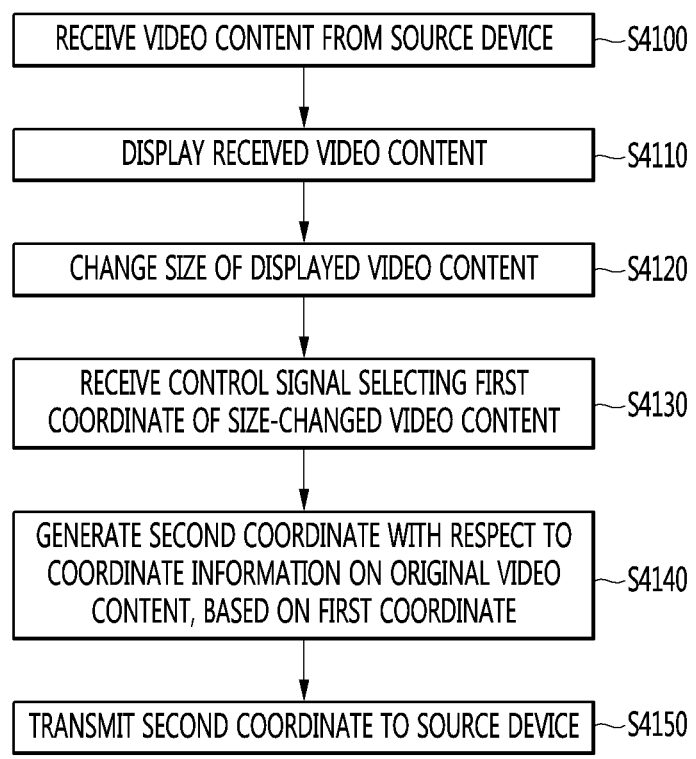
FIG. 41 is a flowchart illustrating an operating method of the display device according to an embodiment.

FIG. 41 is a flowchart illustrating an operating method of the display device according to an embodiment.

Referring to FIG. 41, the display device 200 operated as a sink device may receive a video content from a source device (the mobile terminal 100) (S4100).

As described in FIG. 8, the source device and the sink device may be connected to each other through a wired/wireless network such as a Wi-Fi Direct network. The source device may enter into a content sharing mode such as a mirroring mode or a dual screen dual play (DSDP) mode. As the source device enters into the content sharing mode, the source device may transmit, to the sink device, a video content including a screen being output through the display unit, and the sink device may receive the video content.

The display device 200 may display the received video content (S4110).

The control unit 270 may display the received video content in at least a partial area of the display unit 280, based on a size (e.g., a resolution) of the video content. The resolution of the received video content may correspond to that of the display unit of the source device, and the display unit of the source device may have a first coordinate system based on the resolution. For example, when the resolution of the video content is lower than that of the display unit 280, the control unit 270 may display the video content in a partial area of the display unit 280. In some embodiments, the control unit 270 may automatically scale the video to display the video content in the entire area of the display unit 280. A resolution of the scaled video content may correspond to that of the display unit 280, and the display unit 280 may have a second coordinate system based on the resolution.

On the other hand, when the resolution of the received video content is equal to or higher than that of the display unit 280, the control unit 270 may display at least a portion of the video content in the entire area of the display unit 280.

Meanwhile, coordinate information on a video content displayed on the display unit 280 may correspond to the resolution of the received video content. For example, when the resolution of the received video content is 960*540, the coordinate information (x, y, width, height) may include coordinates corresponding to (0, 0, 960, 540) to (959, 539, 960, 540). When the control unit 270 receives a control signal for selecting a predetermined coordinate of a video content displayed on the display unit 280, the control unit 270 may transmit the selected predetermined coordinate (or a command for selecting the predetermined coordinate) to the source device through the UIBC.

The display device 200 may change the size of a displayed video content (S4120).

For example, the control unit 270 may change the size of the displayed video content to correspond to the size (resolution) of the display unit 280. The control unit 270 may perform an operation of changing the size of the video content (a scaling operation) in response to a resolution control input received from the remote control device 400 or the like. However, the control unit 270 may automatically perform the operation of changing the size of the video content. When the control unit 270 automatically performs the operation of changing the size of the video content, step S4110 may be omitted. That is, the control unit 270 automatically changes the size of the video content received from the source device to the size of the display unit 280, so that the received video content can be displayed in the entire area of the display unit 280.

That is, when the resolution of the display unit of the source device is different from that of the display unit 280 of the sink device, the controller 270 may perform the operation of changing the size of the video content. In this case, a first coordinate of the display unit 280 of the sink device may correspond to a second coordinate having a value different from that of a first coordinate among the coordinates of the display unit of the source device.

Alternatively, the control device 270 may change the size of the displayed video content to a size desired by a user, in response to the resolution control input received from the remote control device 400 or the like. A size changing command may correspond to an input for selecting any one of preset sizes. In some embodiments, the size changing command may correspond to an input for directly selecting the size of a video content within a size range of the display unit 280. This will be described later with reference to FIG. 44.

Meanwhile, when the size (resolution) of the video content displayed on the display unit 280 is changed, the coordinate information may also be changed. For example, when the resolution of the video content is changed to 1820*1080, the coordinate information may be changed to that including coordinates corresponding to (0, 0, 1920, 1080) to (1919, 1079, 1920, 1080).

The display device 200 may receive a control signal for selecting a first coordinate of the size-changed video content (S4130).

For example, the control unit 270 may receive, from the remote control device 400 or the like, a control signal for selecting a control menu (or a control icon) located at the first coordinate of the size-changed video content being displayed on the display unit 280. In some embodiments, the control signal may include a third coordinate selected through the touch pad 3654 provided in the remote control device 400 as shown in FIG. 36, and the control unit 270 may generate the first coordinate by converting the third coordinate.

The display device 200 may generate a second coordinate with respect to the coordinate information on the original video content, based on the selected first coordinate (S4140).

The first coordinate may correspond to the changed coordinate information. Therefore, when the control unit 270 transmits a command for selecting the first coordinate to the source device through the UIBC, the source device does not have the changed coordinate information, and hence the received command may not be correctly processed.

Accordingly, the control unit 270 may generate a second coordinate corresponding to the first coordinate, based on information representing how much the size of the video content displayed on the display unit 280 has been changed from the size of the video content received from the source device, i.e., size changing information (or scaling information). The original video content is a video content before its size is changed, and may mean a video content displayed on the display unit of the source device.

The display device 200 may transmit the generated second coordinate to the source device (S4150).

For example, the controller 270 may transmit a command for selecting the second coordinate to the source device through the UIBC. The source device may correctly perform an operation of selecting a control menu (or control icon) located at the second coordinate of the video content, using the second coordinate included in the received command.

Hereinafter, various embodiments related to the operating method of the display device, described in FIG. 41, will be described with reference to FIGS. 42 to 44.

Figure 42:
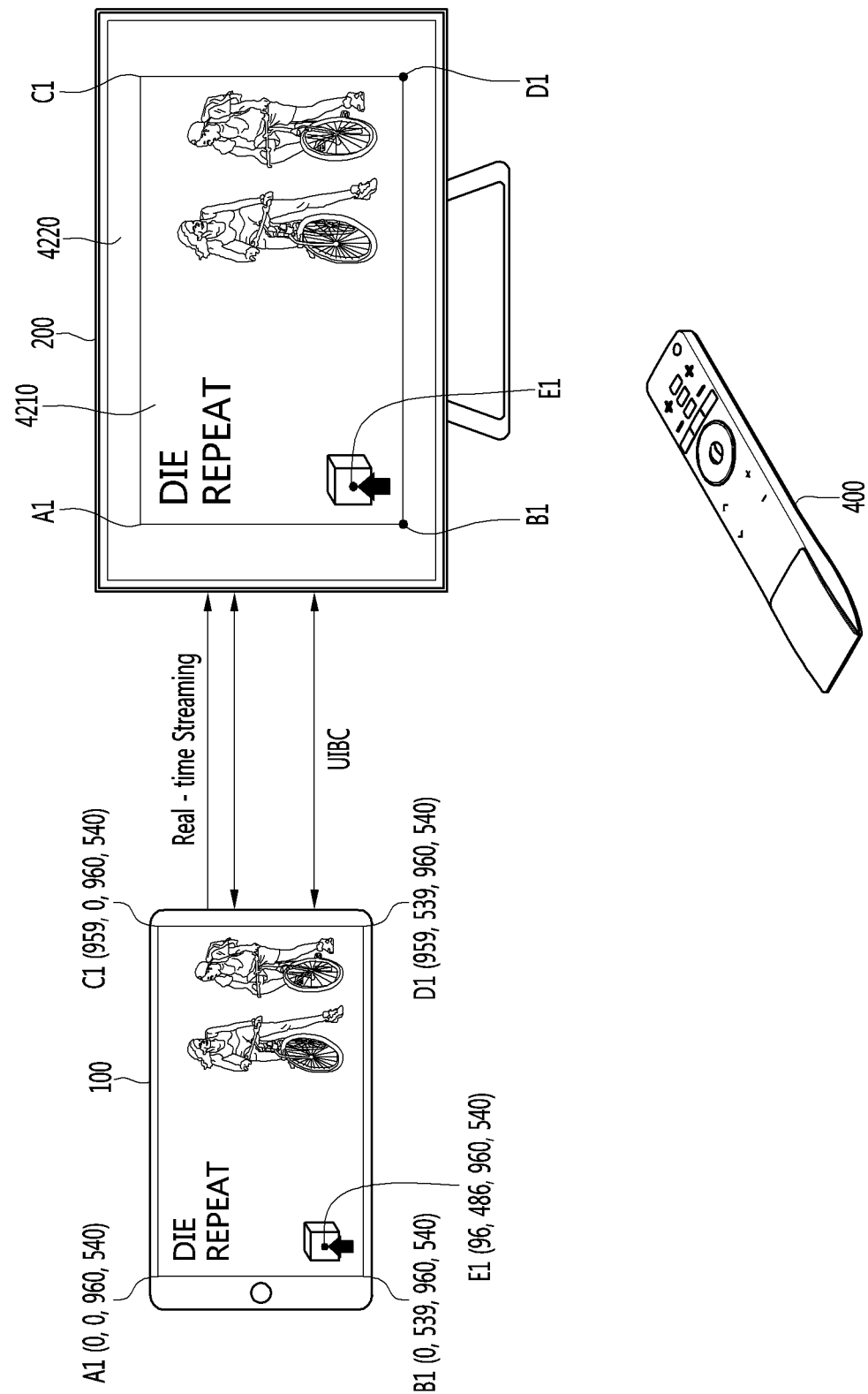
Figure 43:
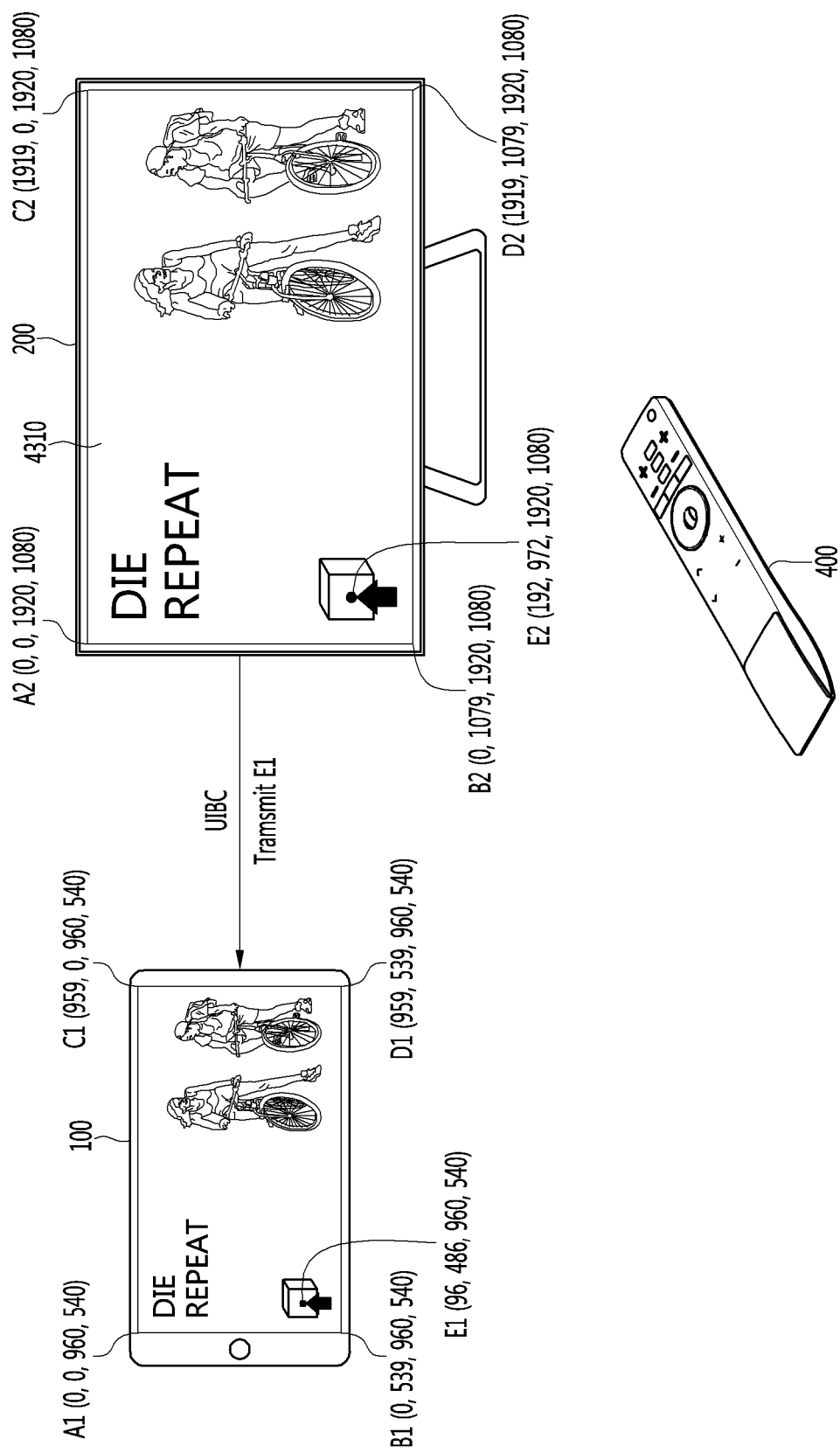

FIGS. 42 to 44 are exemplary views illustrating a control method of the display device according to the embodiment of FIG. 41.

Referring to FIG. 42, the display device 200 according to the embodiment may transmit/receive video data and/or audio data by performing data communication with the mobile terminal 100. In addition, when the mobile terminal 100 and the display device 200 enter into the mirroring mode, the display device 200 may receive in real time a video content including a screen displayed in the mobile terminal 100 (real-time streaming).

In addition, as described above, the control unit 270 of the display device 200 may receive a user input signal from the remote control device 400 or the like. When the received user input signal is a control signal of the video content or the mobile terminal 100, the control unit 270 may transmit the control signal or a command corresponding to the control signal to the mobile terminal 100 through the UIBC.

The control unit 270 may display a video content received in real time from the mobile terminal 100 through the display unit 280. The size of a video content 4210 displayed on the display unit 280 may correspond to that of the received video content. The size may correspond to a resolution. As shown in FIG. 42, when the resolution of the video content is lower than that of the display unit 280, the control unit 270 may display the video content 4210 in a partial area of the display unit 280. In this case, the remaining area of the display unit 280 may correspond to a letter box area 4220.

Coordinate information on the video content 4210 displayed on the display unit 280 may correspond to the resolution of the video content 4210. That is, the coordinate information may include coordinates of A1(0, 0, 960, 540) to D1(959, 539, 960, 540).

Referring to FIG. 43, the control unit 270 may change the size of a video content to correspond to that of the display unit 280, and display a video content 4310 having the changed size through the display unit 280.

The control unit 270 may receive a resolution control input from the remote control device 400 or the like, and change the size of the video content to correspond to that of the display unit 280, in response to the received resolution control input. In some embodiments, the control unit 270 may automatically change the size of the video content to correspond to that of the display unit 280.

For example, when the display unit 280 has a full HD resolution (1920*1080), the coordinate information on the video content 4310 may be changed to include coordinates of A2(0, 0, 1920, 1080) to D2 (1919, 1079, 1920, 1080).

In this case, a control icon of the video content received from the mobile terminal 100 is located at a coordinate point E1(96, 486, 960, 540), the control icon of the size-changed video content 4310 may be located at a coordinate point E2(192, 972, 1920, 1080).

The control unit 270 may receive a control signal for selecting the control icon located at the coordinate point E2 from the remote control device 400. The control unit 270 may generate the coordinate point E1 corresponding to the coordinate point E2, based on the coordinate information on the original video content. As described above, the original video content may mean a video content before its size is changed. In some embodiments, the control unit 270 may recognize a control icon corresponding to the coordinate point E2.

For example, the control unit 270 may generate the coordinate point E1, based on a ratio of the size of the original video content and the size of the changed video content (or the size of the display unit 280). When the size of the original video content is 960*540 and the size of the changed video content is 1920*1080, each of x and y coordinate values of the coordinate point E1 may correspond to ½ of each of x and y coordinate values of the coordinate point E2.

Based on the generated coordinate point E1, the control unit 270 may transmit a command for selecting the coordinate point E1 to the mobile terminal 100 through the UIBC. In some embodiments, the control unit 270 may transmit information on the recognized control icon to the mobile terminal 100 together with the command. The mobile terminal 100 may perform an operation of selecting the control icon located at the coordinate point E1 of the video content, in response to the received command.

Referring to FIG. 44, the control unit 270 may change the size of a video content to various sizes.

The control unit 270 may receive a size changing command for selecting any one of a plurality of preset sizes from the remote control device 400. The control unit 270 may change the size of a video content 4410 to the selected size, in response to the received command.

In some embodiments, the display device 200 may provide a function of allowing a user to directly select a desired size when the size of the video content 4410 is changed. That is, the display device 200 may receive a size changing command for selecting any one size within a size range of the display unit 280 from the remote control device 400, and change the size of the video content 4410 to the selected size.

For example, the control unit 270 may receive, from the remote control device 400, the size changing command including a command for selecting a corner or vertex of the video content 4410 and a command for dragging and dropping the selected corner or vertex. The control unit 270 may change the size of the video content 4410, based on a position at which the selected corner or vertex is dropped. In this case, the size of the video content 4410 may be freely changed within the size of the display unit 280.

As shown in FIG. 44, the size of the video content 4410 may be changed to correspond to coordinate information including A3(0, 0, 1280, 720) to D3(1279, 719, 1280, 720), or be changed to correspond to coordinate information including A4(0, 0, 1600, 900) to D4(1599, 899, 1600, 900).

Only an embodiment in which the ratio of width to height is constantly maintained when the size of the video content 4410 is changed is illustrated in FIG. 44. However, in some embodiments, the control unit 270 may change the ratio of width to height of the video content 4410.

According to the embodiments shown in FIGS. 41 to 44, when the size of a video content displayed in the display device is changed during mirroring, coordinates selected with respect to the size-changed video content are changed to those of the video content having the original size, and the changed coordinates are transmitted to the source device. Thus, the user can control the source device through the display device, regardless of the size of a video content displayed in the display device.

According to the embodiment, the above-described method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium may also include implementations in the form of carrier waves or signals (e.g., transmission via the Internet).

Although some embodiments of the present disclosure are described for illustrative purposes, it will be apparent to those skilled in the art that various modifications and changes can be made thereto within the scope of the disclosure without departing from the essential features of the disclosure.

Accordingly, the aforementioned embodiments should be construed not to limit the technical spirit of the present disclosure but to be provided for illustrative purposes so that those skilled in the art can fully understand the spirit of the present disclosure.

The scope of the present disclosure should not be limited to the aforementioned embodiments but defined by appended claims. The technical spirit within the scope substantially identical with the scope of the present disclosure will be considered to fall in the scope of the present disclosure defined by the appended claims.

What is claimed is:

1. A sink device comprising:
    a network transceiver configured to communicate with a source device;
    a display; and
    a controller configured to:
    receive video content from the source device via the network transceiver, wherein a source display of the source device corresponds to original display coordinates;
    cause the display to display a plurality of content including the received video content, wherein the display corresponds to changed display coordinates;
    receive a control signal for selecting a first coordinate of the display;
    determine whether the selected first coordinate is included in a coordinate range of the displayed received video content;
    generate a second coordinate with respect to the original display coordinates based on the selected first coordinate being included in the coordinate range of the displayed received video content, wherein the second coordinate corresponds to the first coordinate; and
    cause the network transceiver to transmit the second coordinate to the source device, wherein the controller is further configured to:
    cause the display to display the video content on a window which corresponds to a first area of the display when an enlargement mode of a specific area of the video content is executed;
    cause the display to display an enlargement of the specific area of the video content on a second area larger than the first area;
    change coordinate information of the enlargement of the specific area displayed on the second area to be equal to coordinates of the specific area within the video content;
    generate and display a first enlargement area in which a first point of the first area is centered on the second area in response to a command for selecting the first point of the first area; and
    generate and display a second enlargement area in which a second point of the second area is centered on the second area in response to a command for selecting the second point of the second area.

2. The sink device of claim 1, wherein:
    a display resolution of the source device is less than a display resolution of the display of the sink device; and
    the controller is further configured to scale the received video content for full screen display on the display corresponding to the changed display coordinates.

3. The sink device of claim 2, wherein the controller is further configured to cause the display to display the received video content in an unscaled size before the video content is displayed full screen display on the display.

4. The sink device of claim 3, wherein the controller is further configured to cause the display to switch to full screen display of the video content from displaying the video content in the unscaled size in response to a resolution control input.

5. The sink device of claim 2, wherein the second coordinate is generated using scaling information of the received video content.

6. The sink device of claim 1, wherein the controller is further configured to identify an object of an image of the displayed video content, the object corresponding to the selected first coordinate.

7. The sink device of claim 6, wherein the controller is further configured to cause the network transceiver to transmit the second coordinate and the identified object to the source device when the identified object is a source device-based object.

8. The sink device of claim 6, wherein the controller is further configured to perform a control operation corresponding to the identified object when the identified object is a sink device-based object.

9. The sink device of claim 1, wherein the control signal is received from a remote control device associated with the sink device.

10. The sink device of claim 9, wherein:
    the control signal is for selection of a third coordinate of a touch pad of the remote control device wherein a position of the third coordinate of the touch pad corresponds to a position of the first coordinate of the display; and
    the second coordinate is generated by converting the third coordinate to the first coordinate with respect to the changed coordinates and generating the second coordinate based on the first coordinate for transmitting to the source device.

11. The sink device of claim 1, wherein the controller is further configured to:
    receive, via the network transceiver, at least one original menu display coordinate from the source device for displaying a menu in response to the selection of the first coordinate of the displayed video content;
    generate at least one changed menu display coordinate with respect to the changed display coordinates, wherein the at least one changed menu display coordinate corresponds to the at least one original menu display coordinate; and
    cause the display to display a menu at the at least one changed menu display coordinate.

12. A sink device comprising:
    a network transceiver configured to communicate with a source device;
    a memory;
    a display; and
    a controller configured to:
    receive video content from the source device via the network transceiver;
    generate a first coordinate mapping table by mapping a coordinate table of the source device and a coordinate table of the sink device;
    store the first coordinate mapping table in the memory;
    cause the display to display a plurality of content including the received video content;
    receive a control signal for selecting a first coordinate of the display;
    determine whether the selected first coordinate is included in a coordinate range of the displayed received video content;
    identify a second coordinate with respect to the original display coordinates using the first coordinate mapping table based on the selected first coordinate being included in the coordinate range of the displayed received video content, wherein the second coordinate corresponds to the first coordinate; and
    cause the network transceiver to transmit the second coordinate to the source device,
    wherein the controller is further configured to:
    cause the display to display the received video content on a window which corresponds to a first area of the display when an enlargement mode of a specific area of the received video content is executed;

cause the display to display an enlargement of the specific area of the received video content on a second area larger than the first area;

change coordinate information of the enlargement of the specific area displayed on the second area to be equal to coordinates of the specific area within the received video content;

generate and display a first enlargement area in which a first point of the first area is centered on the second area in response to a command for selecting the first point of the first area; and generate and display a second enlargement area in which a second point of the second area is centered on the second area in response to a command for selecting the second point of the second area.

13. The sink device of claim 12, wherein:
a display resolution of the source device is less than a display resolution of the display of the sink device; and
the controller is further configured to scale the received video content for full screen display on the display corresponding to the changed display coordinates.

14. The sink device of claim 13, wherein the controller is further configured to cause the display to display the received video content in an unscaled size before the video content is displayed full screen display on the display.

15. The sink device of claim 14, wherein the controller is further configured to cause the display to switch to full screen display of the video content from displaying the video content in the unscaled size in response to a resolution control input.

16. The sink device of claim 12, wherein the controller is further configured to identify an object of an image of the displayed video content, the object corresponding to the selected first coordinate.

17. The sink device of claim 16, wherein the controller is further configured to cause the network transceiver to transmit the second coordinate and the identified object to the source device when the identified object is a source device-based object.

18. The sink device of claim 16, wherein the controller is further configured to perform a control operation corresponding to the identified object when the identified object is a sink device-based object.

19. The sink device of claim 12, wherein the control signal is received from a remote control device associated with the sink device.

20. The sink device of claim 19, wherein:
the control signal is for selection of a third coordinate of a touch pad of the remote control device wherein a position of the third coordinate of the touch pad corresponds to a position of the first coordinate of the display; and
the controller is further configured to:
receive a touch pad coordinate table of the remote control device;
generate a second coordinate mapping table by mapping the touch pad coordinate table and the coordinate table of the sink device; and
identify the first coordinate as a selection based on the second coordinate mapping table.

21. The sink device of claim 12, wherein the controller is further configured to:
receive, via the network transceiver, at least one original menu display coordinate from the source device for displaying a menu in response to the selection of the first coordinate of the displayed video content;
identify at least one changed menu display coordinate with respect to the changed display coordinates using the first coordinate mapping table, wherein the at least one changed menu display coordinate corresponds to the at least one original menu display coordinate; and
cause the display to display a menu at the at least one changed menu display coordinate.

22. The sink device of claim 12, wherein the controller is further configured to:
receive orientation change information from the source device via the network transceiver when a display orientation of the video content at the source device is changed; and
update the stored first coordinate mapping table using the received orientation change information.

* * * * *